US008928552B2

(12) United States Patent
Aono et al.

(10) Patent No.: US 8,928,552 B2
(45) Date of Patent: Jan. 6, 2015

(54) PERSONAL DIGITAL ASSISTANT, AND DISPLAY CONTROL METHOD AND DISPLAY CONTROL PROGRAM THEREOF

(75) Inventors: Tatsuhito Aono, Tokyo (JP); Tetsuya Kobayashi, Tokyo (JP); Yuji Fukaya, Tokyo (JP); Shin Takanashi, Kanagawa (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 787 days.

(21) Appl. No.: 13/180,795

(22) Filed: Jul. 12, 2011

(65) Prior Publication Data
US 2012/0139815 A1 Jun. 7, 2012

Related U.S. Application Data

(60) Provisional application No. 61/418,731, filed on Jan. 12, 2010.

(51) Int. Cl.
G09G 5/00 (2006.01)
G06F 1/16 (2006.01)

(52) U.S. Cl.
CPC ............ *G06F 1/1677* (2013.01); *G06F 1/1616* (2013.01); *G06F 1/1624* (2013.01); *G06F 1/1641* (2013.01)
USPC ........ 345/1.3; 345/1.1; 345/650; 361/679.04; 455/566

(58) Field of Classification Search
CPC ... G06F 1/1641; G06F 3/0488; G06F 1/1616; G06F 3/1423
See application file for complete search history.

(56) References Cited

U.S. PATENT DOCUMENTS

| 2005/0285811 | A1* | 12/2005 | Kawase et al. | 345/1.1 |
| 2008/0247128 | A1* | 10/2008 | Khoo | 361/681 |
| 2010/0041439 | A1* | 2/2010 | Bullister | 455/566 |
| 2010/0060664 | A1* | 3/2010 | Kilpatrick et al. | 345/650 |

FOREIGN PATENT DOCUMENTS

JP 3133091 6/2007

* cited by examiner

*Primary Examiner* — Gerald Johnson
(74) *Attorney, Agent, or Firm* — Oblon, Spivak, McClelland, Maier & Neustadt, L.L.P.

(57) ABSTRACT

An information processing device including a plurality of rectangular-shaped casings each including a first principal surface, and a second principal surface opposing the first principal surface and including a display panel having a predetermined aspect ratio. The information processing device including a connecting portion connecting each of the plurality of rectangular-shaped casings in a closed state in which each of the plurality of rectangular-shaped casings are mutually overlaid and a display panel of at least one of the plurality of rectangular-shaped casings is externally exposed, and in an open state in which wall portions of mutually adjacent rectangular-shaped casings abut and the display panels of each of the plurality of rectangular-shaped casings face a similar direction. The information processing device further includes a terminal state detecting unit that detects the closed state and the opened state, and a display control unit that controls display of each of the display panels.

15 Claims, 51 Drawing Sheets

MD

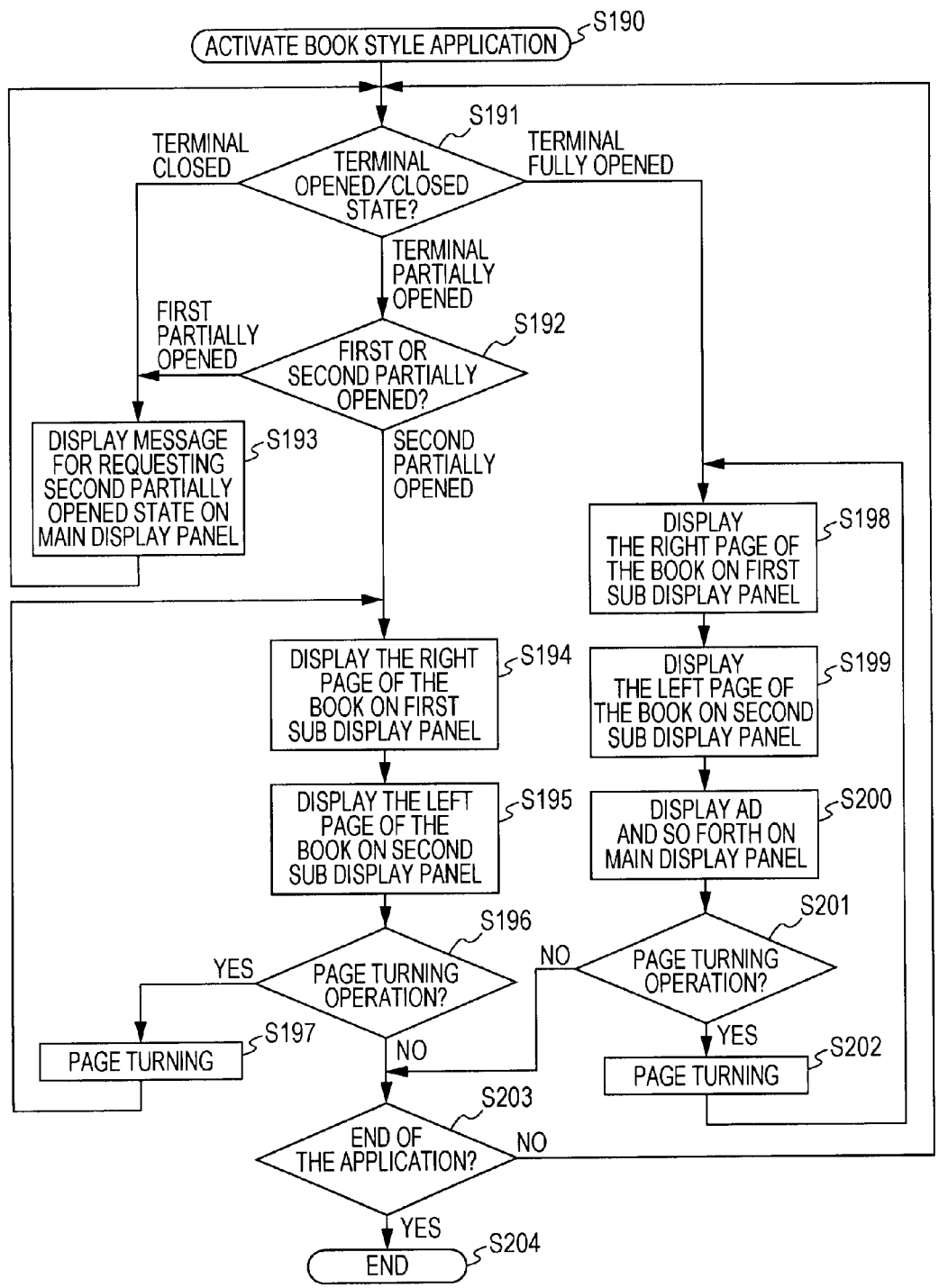

FIG. 64

| | E1 | E2 | E3 | E4 | E5 | E6 | E7 | E8 | E9 | E10 | E11 |
|---|---|---|---|---|---|---|---|---|---|---|---|
| THREE-SCREEN-FOLDING-TYPE PERSONAL DIGITAL ASSISTANT | Y | Y | Y | Y *1.78 | Y | Y | Y | Y | Y | Y | Y |
| THREE-SCREEN-SLIDE-TYPE PERSONAL DIGITAL ASSISTANT | Y | Y | Y | Y *1.78 | P | Y | Y | Y | Y | Y | N |
| THREE-SCREEN-DOUBLE-DOORS TERMINAL | Y | Y | N | — | N | N | N | Y | Y | N | P |
| THREE-SCREEN-INVERSE-DOUBLE-DOORS TERMINAL | Y | Y | Y | Y *1.78 | P | N | Y | Y | N | N | P |
| 9.7-INCH TOUCH PANEL TERMINAL | Y | N | N | — | N | — | — | Y | N | Y | N |
| 3.5-INCH TOUCH PANEL TERMINAL | N | Y | Y | — | N | — | — | Y | — | Y | N |
| TWO-SCREEN-FOLDING TERMINAL | Y | Y | N | — | N | Y | N | Y | Y | Y | P |
| TWO-SCREEN-SLIDE TERMINAL | Y | Y | Y | N *1.1 | N | Y | Y | Y | Y | Y | N |
| TWO-SCREEN-INVERSE-FOLDING TERMINAL | Y | Y | Y | N *1.1 | N | N | Y | Y | N | Y | P |
| FOUR-SCREEN-FOLDING TERMINAL | Y | Y | Y | Y *2 | N | N | Y | N | N | P | P |
| TWO-SCREEN-SLIDE + THREE-SCREEN-FOLDING TERMINAL | Y | Y | Y | Y *2 | N | N | Y | N | Y | P | P |
| FOUR-SCREEN SLIDE TERMINAL | Y | Y | Y | Y *2 | N | N | Y | N | Y | P | N |

PERSONAL DIGITAL ASSISTANT, AND DISPLAY CONTROL METHOD AND DISPLAY CONTROL PROGRAM THEREOF

CROSS REFERENCE TO RELATED APPLICATION

The present application claims the benefit of the earlier filing date of U.S. Provisional Patent Application Ser. No. 61/418,731 filed on Dec. 1, 2010, the entire contents of which is incorporated herein by reference.

BACKGROUND OF THE DISCLOSURE

1. Field of the Disclosure

The present disclosure relates to a personal digital assistant having multiple screens, and a display control method and display control program of the personal digital assistant.

2. Description of the Related Art

In recent years, personal digital assistants having a large screen display or two-screen display panel have been commercially produced. With these personal digital assistants, using a large screen display or two-screen display panel enables a great number of information to be displayed at the same time, or enables information to be enlarged and displayed.

Note that, with Japanese Registered Utility Model No. 3133091 (FIGS. 1 to 4), a personal digital assistant having a two-screen or three-screen display panel has been disclosed. Specifically, this personal digital assistant described in this publication includes folding or slide-type movable opening/closing multi-windows, and a display screen is provided to each of the movable opening/closing multi-windows.

SUMMARY

Incidentally, personal digital assistants according to the related art having a large screen display panel or two-screen display panel each have their advantages and disadvantages, and it is difficult to say that these perform optimal display as to various contents while satisfying a user's various applications and requests.

For example, a personal digital assistant having a large screen display panel is capable of displaying a great number of information within one screen at the same time using this large area display panel, and is also capable of realizing an easily viewable display by enlarging detailed information. However, this personal digital assistant includes a drawback, in that it is difficult to reduce the size of a device having such a large screen display panel, and accordingly portability is poor.

Also, for example, with a personal digital assistant having a two-screen display panel, for example, when carrying this personal digital assistant, high portability is realized by storing the casing using folding storage or slide storage or the like. Also, during use this personal digital assistant is capable of displaying a great number of information at the same time by unfolding the two-screen display panel to display the information on both display panels. However, with this personal digital assistant, the aspect ratio of one screen of display panel differs from an aspect ratio at the time of adding two screens of display panels. Therefore, in the case of this personal digital assistant, for example, in the event of displaying a content having a fineness ratio optimized to the aspect ratio of a display panel of one screen using a display panel of two screens, this aspect ratio of two screens does not match the fineness ratio of the content. Conversely, for example, in the event of displaying a content having a fineness ratio optimized to the aspect ratio obtained by adding the two screens on the display panel of one screen, the aspect ratio of this one screen does not match the fineness ratio of the content.

Now, for example, with a cellular phone having a three-screen display panel described in Japanese Registered Utility Model No. 3133091, the aspect ratio of one screen is allowed to match an aspect ratio when adding three screens.

However, with the case of the cellular phone having a three-screen display panel described in this publication, for example, an arrangement is made wherein folding movable opening/closing multi-windows are closed by mutually facing the surfaces of the two display panels at the left and right as to the central display panel surface. However, in this case, when the windows are closed, the user of this cellular phone is not capable of viewing display on the display screen. Also, in the case of this folding movable opening/closing multi-windows, there operations have to be performed wherein at the time of opening/closing the windows, the user opens or closes one of the two windows to the left and right, and then opens or closes the other window, and accordingly, operability is far from good.

Also, with the cellular phone having a three-screen display according to this publication, for example, in the event of including slide movable opening/closing multi-windows, the user can view at least one display screen even in a state in which the windows are closed. However, with this slide movable opening/closing multi-windows, at the time of unfolding the display panels of three screens so as to be generally flattened, a complex slide mechanism has to be used, and accordingly, increase in cost and increase in terminal size are unavoidable. Also, with the cellular phone according to this publication, the slide movable opening/closing multi-windows are opened/closed by relatively sliding the two display panels at the left and right as to the central display panel. Therefore, in the event of opening/closing the slide movable opening/closing multi-windows, the user has to perform operations for sliding one of the two windows to the left and right and then sliding the other window, and accordingly, operability is far from good.

It has been found desirable to provide a personal digital assistant which enables display or enlarged display of a great number of information using multiple screens, enables optimal display as to various contents while satisfying a user's various applications and requests, realizes screen opening/closing by simple operations, and further enables these using a low-cost and small and thin configuration without using a complex mechanism, and also to provide a display control method and display control program of the personal digital assistant.

According to an exemplary embodiment, the present disclosure is directed to an information processing device including a plurality of rectangular-shaped casings each including a first principal surface, and a second principal surface opposing the first principal surface and including a display panel having a predetermined aspect ratio. The information processing device including a connecting portion connecting each of the plurality of rectangular-shaped casings in a closed state in which each of the plurality of rectangular-shaped casings are mutually overlaid and a display panel of at least one of the plurality of rectangular-shaped casings is externally exposed, and in an open state in which wall portions of mutually adjacent rectangular-shaped casings abut and the display panels of each of the plurality of rectangular-shaped casings face a similar direction. The information processing device further includes a terminal state detecting unit that detects the closed state and the opened state, and a display control unit that controls display of each of the display panels.

BRIEF DESCRIPTION OF THE DRAWINGS

FIG. 63 is a flowchart illustrating a flow of processing at the time of the personal digital assistant executing an application program for realizing thirteenth operation control, and specifically illustrating a flow of processing at the time of execution of a book-style application program; and FIG. 64 is a diagram illustrating a list for comparing each effect to be realized by the personal digital assistant according to the present embodiment, and a realizable or unrealizable effect by various types of personal digital assistants according the related art.

DESCRIPTION OF THE PREFERRED EMBODIMENTS

Figure 1:
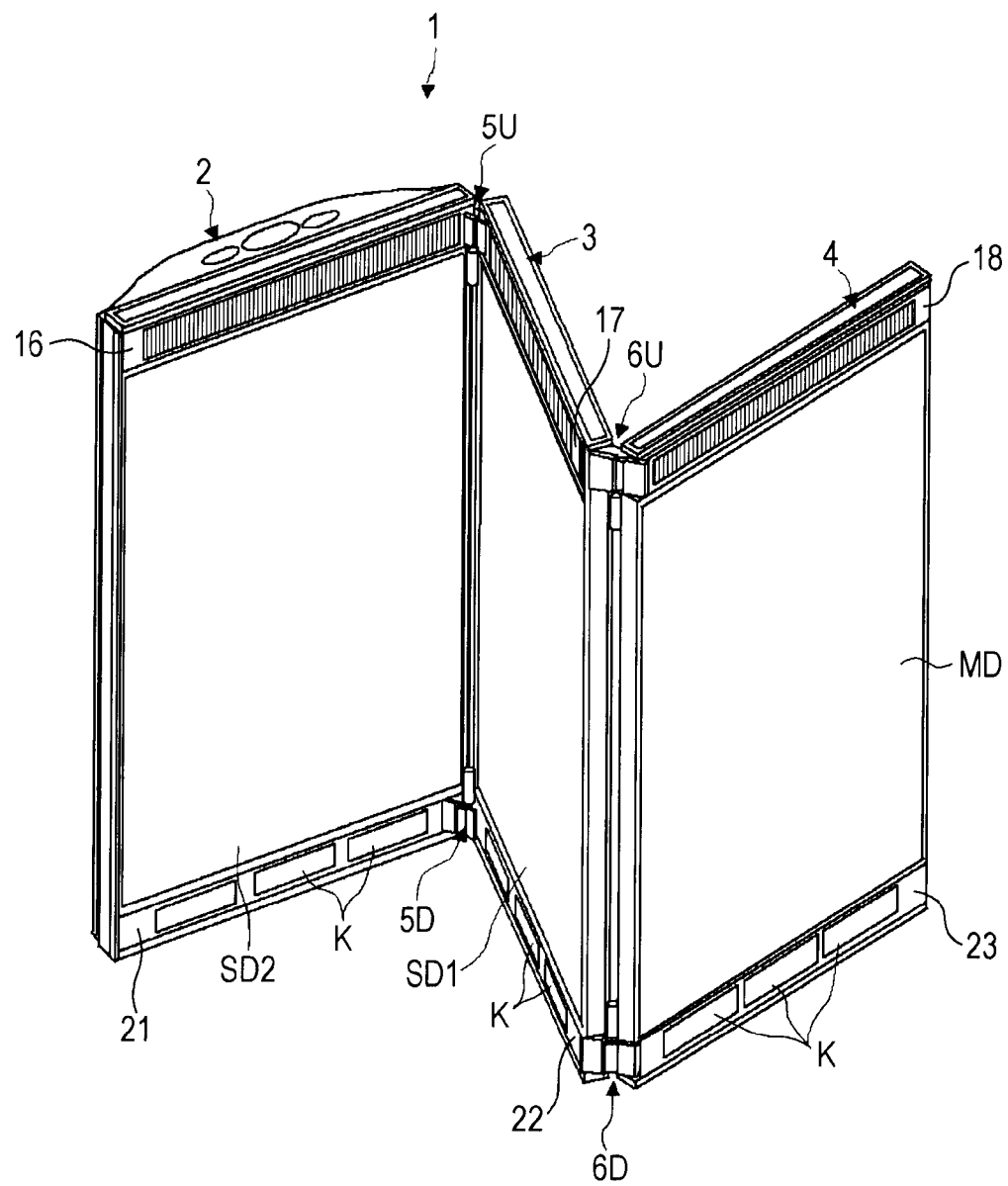
FIG. 1 is a schematic external perspective view of a personal digital assistant according to the present embodiment, and is specifically a view of this terminal in a terminal opened state at the time of each of a first casing, a second casing, and a third casing having a relative placement relation of generally 90 degrees as viewed from a display panel side.

Hereafter, an embodiment of the present disclosure will be described while referring to the drawings.

Note that, with the present embodiment, a personal digital assistant such as a cellular phone terminal having three screen display panels will be given as an example to which the present disclosure is applied. It goes without saying that the content described in the present embodiment is consistently an example, the number of display panels is not restricted to three surfaces, how to fold and unfold a casing and a display panel is not restricted to folding and unfolding of a later-described folding screen type, and further the shapes and number of components making up the personal digital assistant are also not restricted.

Schematic External Configuration of Personal Digital Assistant According to Present Embodiment FIGS. 1 through 5 illustrate a schematic external configuration example of a personal digital assistant 1 according to the present embodiment.

As illustrated in FIGS. 1 through 5, the personal digital assistant 1 according to the present embodiment is configured so as to have three casings of a first casing 2, a second casing 3, and a third casing 4. Each of these first casing 2, second casing 3, and third casing 4 has a rectangular plate shape including a first principal surface, and a second principal surface mutually facing this first principal surface. Also, each of the first casing 2, second casing 3, and third casing 4 has a display panel of a predetermined aspect ratio on the first principal surface side, and has a texture panel on the second principal surface side.

More specifically, the first casing 2 has the first and second two principal surfaces which mutually face, and also has predetermined thickness, which makes up, for example, a rectangular plate shape, and includes for example, a second sub display panel SD2 of 3.6 inch size with an aspect ratio of 16:9 on the first principal surface side, and a main texture panel MP on the second principal surface side. Also, the first casing 2 also includes a shooting lens 7 for digital cameras, light 8 for emitting extra light for shooting, and a release button 7S available for releasing at the time of camera shooting, on the main texture panel MP side. The second sub display panel SD2 is made up of a flat display panel such as a liquid crystal display or organic Electro Luminescent (EL) or the like. Also, a transparent touch sensor panel of which the size covers generally the entire surface of the panel thereof is provided to the front surface of this second sub display panel SD2. Note that, in the case of the present embodiment, the main texture panel MP has a shape wherein the longer direction has a linear shape, and the shorter direction has a convexly curved shape, but it goes without saying that this may have another shape.

Also, the second casing 3 has the first and second two principal surfaces which mutually face, and also has predetermined thickness, which makes up, for example, a rectangular plate shape, and includes for example, a first sub display panel SD1 of 3.6 inch size with an aspect ratio of 16:9 on the first principal surface side, and a first texture panel TP1 on the second principal surface side. The first sub display panel SD1 is made up of a flat display panel such as a liquid crystal display or organic EL or the like, and also, a transparent touch sensor panel of which the size covers generally the entire surface of the panel thereof is provided to the front surface of this first sub display panel SD1. The first texture panel TP1 has a generally flat plane shape.

Similarly, the third casing 4 has the first and second two principal surfaces which mutually face, and also has predetermined thickness, which makes up, for example, a rectangular plate shape, and includes for example, a main display panel MD of 3.6 inch size with an aspect ratio of 16:9 on the first principal surface side, and a second texture panel TP2 on the second principal surface side. The main display panel MD is made up of a flat display panel such as a liquid crystal display or organic EL or the like, and also, a transparent touch sensor panel of which the size covers generally the entire surface of the panel thereof is provided to the front surface of this main display panel MD. The second texture panel TP2 has a generally flat plane shape.

Note that, with the main texture panel MP, and the first and second texture panels TP1 and TP2, various pictures or photos or the like may be adhered thereto, or various ornaments or patterns may be provided thereto. In addition, with the present embodiment, all or some of the main texture panel MP and the first and second texture panels TP1 and TP2 may have a display panel.

Also, with the present embodiment, the first casing 2, second casing 3, and third casing 4 include, for example, pressing keys K with three keys as a set in the neighborhood of edge portions 21, 22, and 23 of one of the longer sides of each display panel provided surface. Each of the pressing keys K with three keys as a set has, for example, a rectangular-shaped key top, where the long side direction of each key top is parallel to the shorter direction of the display panel provided surface, and is arrayed linearly. A predetermined function is assigned to each of the pressing keys K by the application program under execution. Note that the number of the pressing keys K provided to each casing is not restricted to three, and may be other numbers, and also, the number or shapes of the pressing keys K may differ for each casing, and the installed place of the pressing keys K is not restricted to the example of the present embodiment.

Further, with the personal digital assistant 1 according to the present embodiment, a speaker for any one channel of left and right channels for stereo audio output is provided to, for example, the first casing 2, and a speaker for the other channel is provided to, for example, the third casing 4. Note that an arrangement may be made wherein, with the personal digital assistant 1 according to the present embodiment, a speaker for left and right two channels for stereo audio output is provided to the first casing 2 and third casing 4, and also a speaker for the center channel is provided to the second casing 3. These speakers for audio output are provided to, for example, the neighborhood of the longer side edge portions 21, 22, and 23 of each of the casings.

Note that, in the event that the personal digital assistant 1 according to the present embodiment is a cellular phone terminal, for example, a speaker for receiver is provided to the neighborhood of an edge portion 18 of one of the longer sides of the main display panel MD of the third casing 4, and a microphone for transmitter is provided to the neighborhood of the edge portion 23 of the other longer side.

In addition, the personal digital assistant 1 according to the present embodiment may include various types of devices to one of the first casing 2 through the third casing 4 in the same way as with a common personal digital assistant, such as a cable connection terminal, an external memory slot, an LED lamp for sending-and-receiving notifications, an antenna for receiving television broadcasting, and so forth.

Also, the personal digital assistant 1 according to the present embodiment includes a connecting portion which enables transition between a first terminal placement state in which the casings 2 through 4 are mutually overlaid by predetermined principal surfaces of the casings 2 through 4 mutually fully facing, and a second terminal placement state in which, for example, the first principal surfaces or second principal surfaces of the casings 2 through 4 are arrayed in parallel generally in the same lateral direction.

Here, in the case of the personal digital assistant 1 according to the present embodiment illustrated in FIGS. 1 through 5, the connecting portion rotatably connects the long wall portions of adjacent casings of the casings 2 through 4 as to the rotary shaft in the long direction thereof. Specifically, with the personal digital assistant 1 according to the present embodiment, turning position relationship between adjacent casings can be changed from the first terminal placement state in which the first principal surfaces or second principal surfaces of adjacent casings connected by the connecting portion mutually face, to the second placement state in which the first principal surfaces or second principal surfaces of both of the adjacent casings are arrayed generally in parallel generally in the same lateral direction.

More specifically, the first casing 2 and second casing 3 are disposed so that ones of the side wall surfaces of the long side wall surfaces of each thereof adjoin each other, and also the adjacent both side wall surfaces are rotatably connected by a set of connecting portions made up of a first connecting portion 5U and a second connecting portion 5D. Specifically, the first connecting portion 5U rotatably connects the side wall surface in the neighborhood of one of the edge portions 16 on the long side of the first casing 2, and the side wall surface in the neighborhood of one of the edge portions 17 on the long side of the second casing 3 facing thereto, and similarly, the second connecting portion 5D rotatably connects the side wall surface in the neighborhood of one of the edge portions 21 on the long side of the first casing 2, and the side wall surface in the neighborhood of one of the edge portions 22 on the long side of the second casing 3 facing thereto.

Also, the second casing 3 and third casing 4 are disposed so that the other side wall surface of this second casing 3 and one of the side wall surfaces of the third casing 4 adjoin each other, and also both adjacent side wall surfaces are rotatably connected by a set of connecting portions made up of the first connecting portion 6U and the second connecting portion 6D. Specifically, the first connecting portion 6U rotatably connects the side wall surface in the neighborhood of one of the edge portions 17 on the long side of the second casing 3, and the side wall surface in the neighborhood of one of the edge portions 18 on the long side of the third casing 4 facing thereto, and similarly, the second connecting portion 6D rotatably connects the side wall surface in the neighborhood of one of the edge portions 22 on the long side of the second casing 3, and the side wall surface in the neighborhood of one of the edge portions 23 on the long side of the third casing 4 facing thereto. Note that the detailed configurations of a set of the first and second connecting portions 5U and 5D, and a set of the first and second connecting portions 6U and 6D will be described later.

With the personal digital assistant 1 according to the present embodiment, as described above, the first casing 2 and second casing 3 are rotatably connected by a set of the first and second connecting portions 5U and 5D, and also, the second casing 3 and third casing 4 are rotatably connected by a set of the first and second connecting portions 6U and 6D. Therefore, the personal digital assistant according to the present embodiment can take a state in which the first casing 2 through the third casing 4 are completely overlaid as illustrated in FIG. 3, and a state in which the first casing 2 through the third casing 4 are not completely overlaid as illustrated in FIGS. 1, 2, 4, and 5. With the above description, as illustrated in FIG. 3, the first terminal placement state in which the first casing 2, second casing 3, and third casing 4 are generally completely overlaid by the second sub display panel SD2 of the first casing 2, and the first sub display panel SD1 of the second casing 3 mutually generally fully facing, and also the first texture panel TP1 of the second casing 3, and the second texture panel TP2 of the third casing 4 mutually generally fully facing, will specifically be referred to as "terminal closed state". Also, for example, as illustrated in FIGS. 1, 2, 4, and 5, in the event that the display panels of the first casing 2 and second casing 3 do not mutually fully face, and the texture panels of the second casing 3 and third casing 4 do not mutually fully face, with the following description, such a state in which none of the first casing 2, second casing 3, and third casing 4 is overlaid will specifically be referred to as "terminal opened state". Note that, specifically, the terminal opened state illustrated in FIG. 5 is in the second terminal placement state in which the first principal surfaces or second principal surfaces of both adjacent casings are arrayed generally in parallel generally in the same lateral direction.

That is to say, the personal digital assistant 1 according to the present embodiment is, in the terminal closed state, in a compact folded state in which the first casing 2 through the third casing 4 are each overlaid. Also, with the personal digital assistant 1 according to the present embodiment, in the terminal closed state, the screen of the main display panel MD constantly externally exposed is in a visible state as viewed from the user. On the other hand, with the personal digital assistant 1 according to the present embodiment, in the terminal opened state, all of the three screens of the main display panel MD, first sub display panel SD1, and second sub display panel SD2 are in a visible state as viewed from the user. Particularly, in the terminal opened state illustrated in FIG. 5, the three screens are arrayed generally in parallel generally in the same lateral direction, and a generally flat screen can be realized by these three screens.

Also, the personal digital assistant 1 according to the present embodiment is configured so as to be opened/closed such as a folding screen. Accordingly, the user who uses the personal digital assistant 1 according to the present embodiment can change this personal digital assistant 1 from the terminal closed state to the terminal opened state, for example, by performing an operation such as opening the first casing 2, second casing 3, and third casing 4 one at a time. Also, in the case of the present embodiment, the user can change this personal digital assistant from the terminal closed state to the terminal opened state not only by such a terminal opening operation, but also by a one action operation such as opening the first casing 2 and third casing 4 of the personal digital assistant 1 in the terminal closed state which is a landscape screen as viewed from this user herself/himself, in the up-and-down direction of the vertically longitudinal direction at once. Similarly, this personal digital assistant 1 can be changed from the terminal closed state to the terminal opened state by one action operation such as opening the first casing 2 and third casing 4 of the personal digital assistant 1 in the terminal closed state which is a portrait screen as viewed from this user herself/himself, in the left-and-right direction of the horizontally lateral direction at once. Conversely, with the present embodiment, the user can change the personal digital assistant 1 from the terminal opened state to the terminal closed state by performing an operation such as closing the first casing 2, second casing 3, and third casing 4 one at a time. Also, in the case of the present embodiment, the user can change the personal digital assistant 1 from the terminal opened state to the terminal closed state not only by such a terminal closing operation but also by one action operation such as closing the first casing 2 and third casing 4 of the personal digital assistant 1 in the terminal opened state in which the three screens are arrayed in the horizontally lateral direction as viewed from this user herself/himself, from the left-and-right direction of the horizontally lateral direction at once. Similarly, the user can change the personal digital assistant 1 from the terminal opened state to the terminal closed state by one action operation such as closing the first casing 2 and third casing 4 of the personal digital assistant 1 in the terminal opened state in which the three screens are arrayed in the vertically longitudinal direction as viewed from this user herself/himself, from the up-and-down direction of the vertically longitudinal direction at once.

Also, with the personal digital assistant 1 according to the present embodiment, each of the main, first, second sub display panels MD, SD1, and SD2 has a 3.6-inch size with an aspect ratio of 16:9. Accordingly, with the personal digital assistant 1 according to the present embodiment, in the event that the three screens made up of the three display panels in the terminal opened state is regarded as one screen, the screen size made up of the three screens thereof is around 6.4 inch in size with an aspect ratio of 16:9 (i.e., $16:9 \times 3 = 16:27 \cong 9:16$). That is to say, with the personal digital assistant 1 according to the present embodiment, the number of the display panels is arranged to be a number so that an aspect ratio obtained by adding all of the display panels crossly arrayed in parallel with generally the same direction in the terminal opened state generally matches the predetermined aspect ratio of 16:9.

Note that, with the present embodiment, the rotatable angular ranges of the first and second connecting portions 5U and 5D are, as illustrated in FIG. 3, from an angle (generally 0 degree) where both display panel surfaces are generally parallel by both display panel surfaces of the first casing 2 and second casing 3 fully facing each other, as illustrated in FIG. 5 for example, to an angle where both display panel surfaces of the first casing 2 and second casing 3 are generally lined up sideways (generally 180 degrees). Similarly, the rotatable angular ranges of the first and second connecting portions 6U and 6D are, as illustrated in FIG. 3, from an angle (generally 0 degree) where both texture panel surfaces are generally parallel by both texture panel surfaces of the second casing 3 and third casing 4 fully facing each other, as illustrated in FIG. 5 for example, to an angle where both texture panel surfaces of the first casing 2 and second casing 3 are generally lined up sideways (generally 180 degrees). It goes without saying that the rotatable angular ranges of the first and second connecting portions 5U and 5D, and the first and second connecting portions 6U and 6D may be 180 degrees or more, respectively. Also, with the present embodiment, an example has been described wherein the first and second connecting portions 5U and 5D, and the first and second connecting portions 6U and 6D are each a set made up of two, but the number of each set is not restricted to the above example, for example, such as a set made up of three, a set made up of four, or the like.

Figure 2:
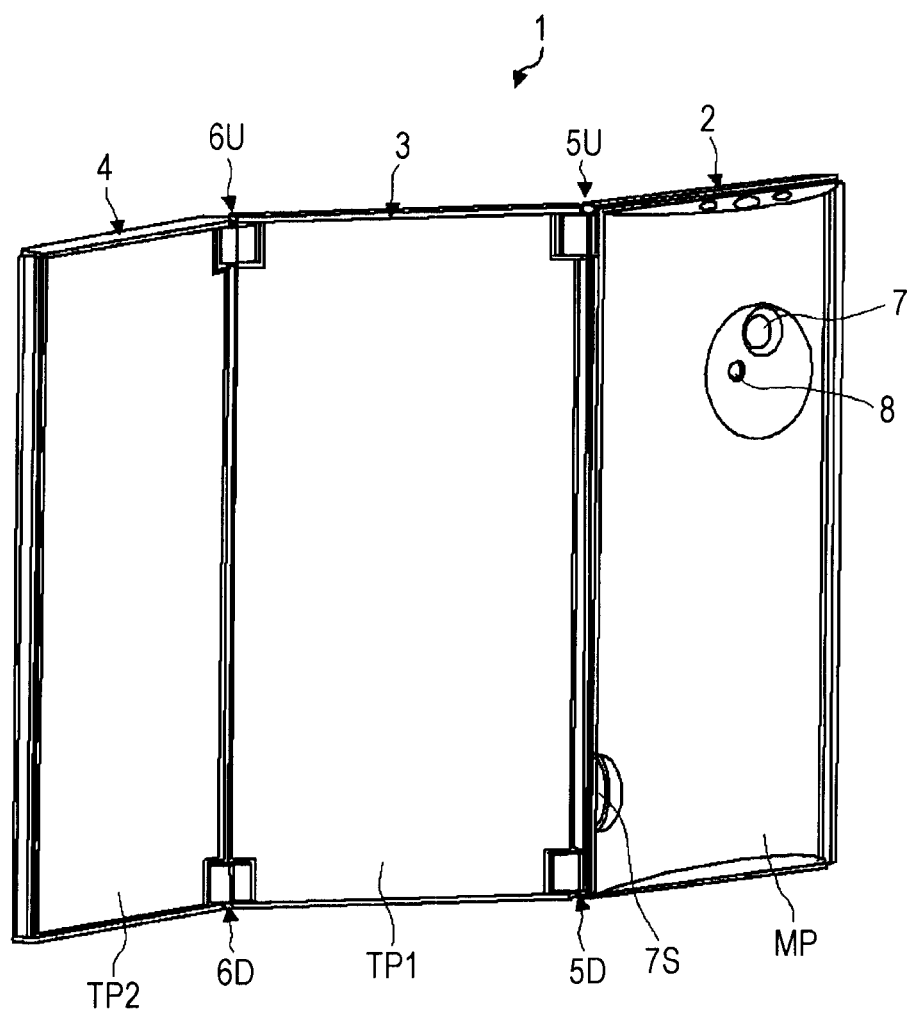
FIG. 2 is a schematic external perspective view of the personal digital assistant according to the present embodiment, and is specifically a view of this terminal in a terminal opened state at the time of the first casing, second casing, and third casing being disposed so as to have a fully unfolded state, as viewed from a texture panel side.
Figure 3:
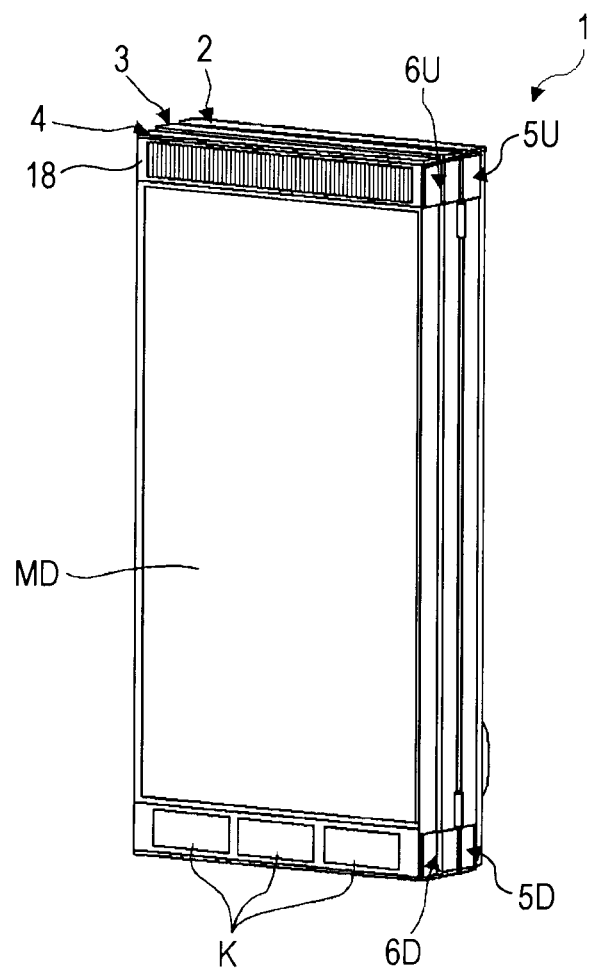
FIG. 3 is a schematic external perspective view of the personal digital assistant according to the present embodiment, and is specifically a view of this terminal in a terminal closed state as viewed from a main display panel side.
Figure 4:
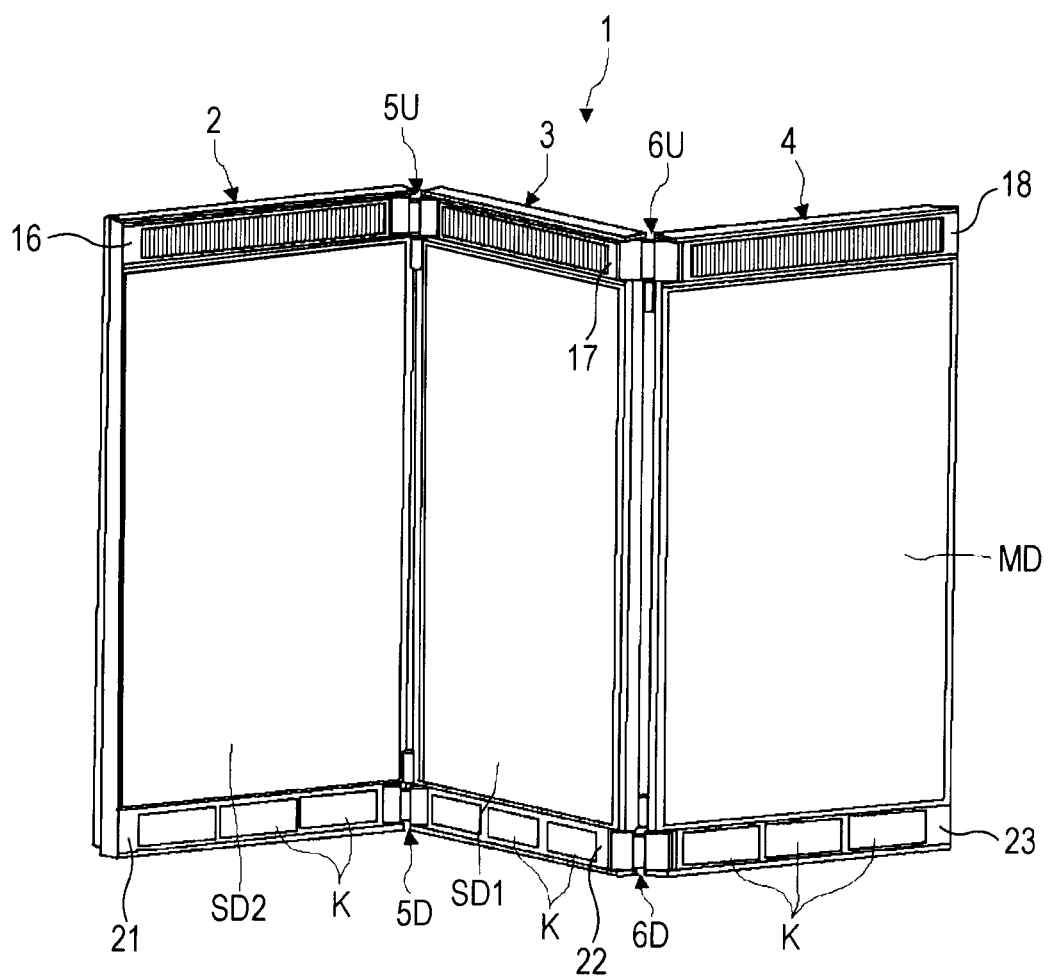
FIG. 4 is a schematic external perspective view of the personal digital assistant according to the present embodiment, and is specifically a view of this terminal in a terminal opened state at the time of the first casing, second casing, and third casing being disposed so as to have a fully unfolded state, as viewed from the display panel side.
Figure 5:
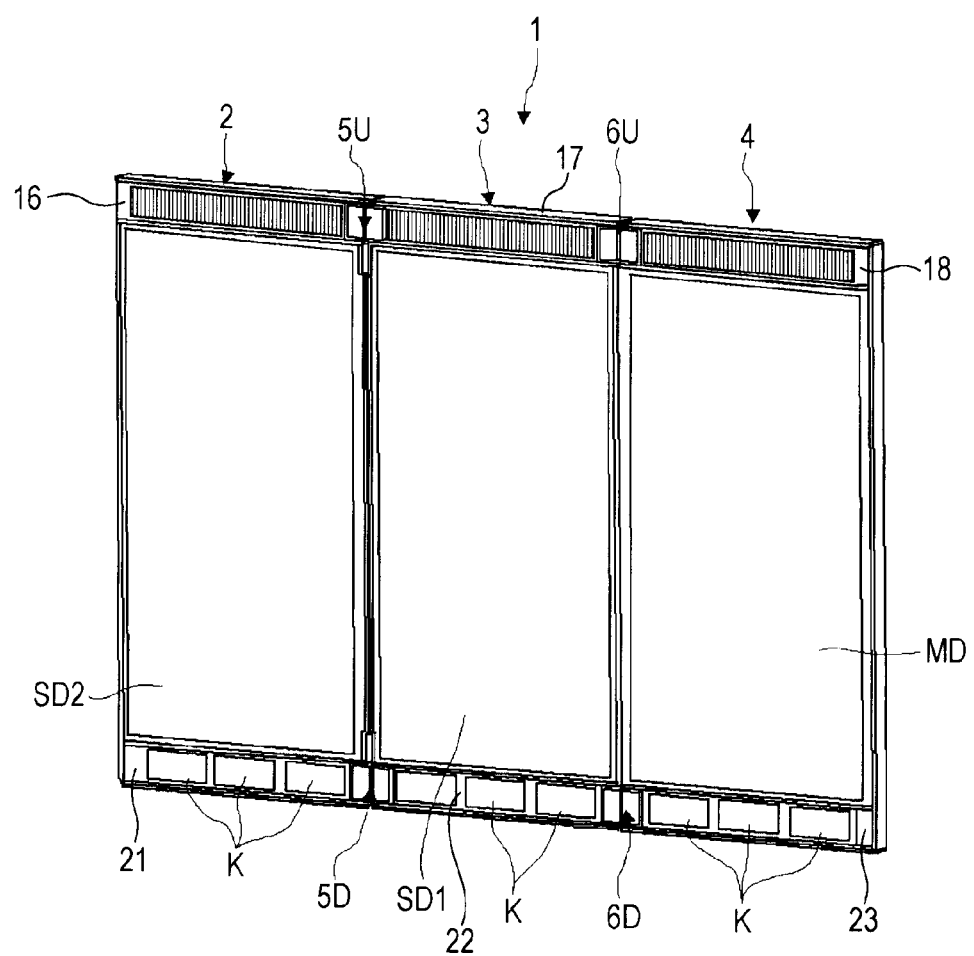
FIG. 5 is a schematic external perspective view of the personal digital assistant according to the present embodiment, and is specifically view of this terminal in a terminal opened state at the time of each display panel surface of the first casing, second casing, and third casing being unfolded so as to have a generally flat alignment, as viewed from the display panel side.

Also, with the personal digital assistant 1 according to the present embodiment, if we say that the first casing 2, second casing 3, and third casing 4 are in an opened state, for example, such as FIGS. 1, 2, and 4, and for example, one edge portions 21, 22, and 23 of the first casing 2 through third casing 4 are disposed on, for example, a table or the like, so as to be contacted, the personal digital assistant 1 can stand alone.

Detailed Configuration of Connecting Portion and Adjacent Casing Portions Thereof Next, the detailed configurations of the first and second connecting portions 5U and 5D, and the first and second connecting portions 6U and 6D will be described with reference to FIGS. 6 through 24.

Figure 6:
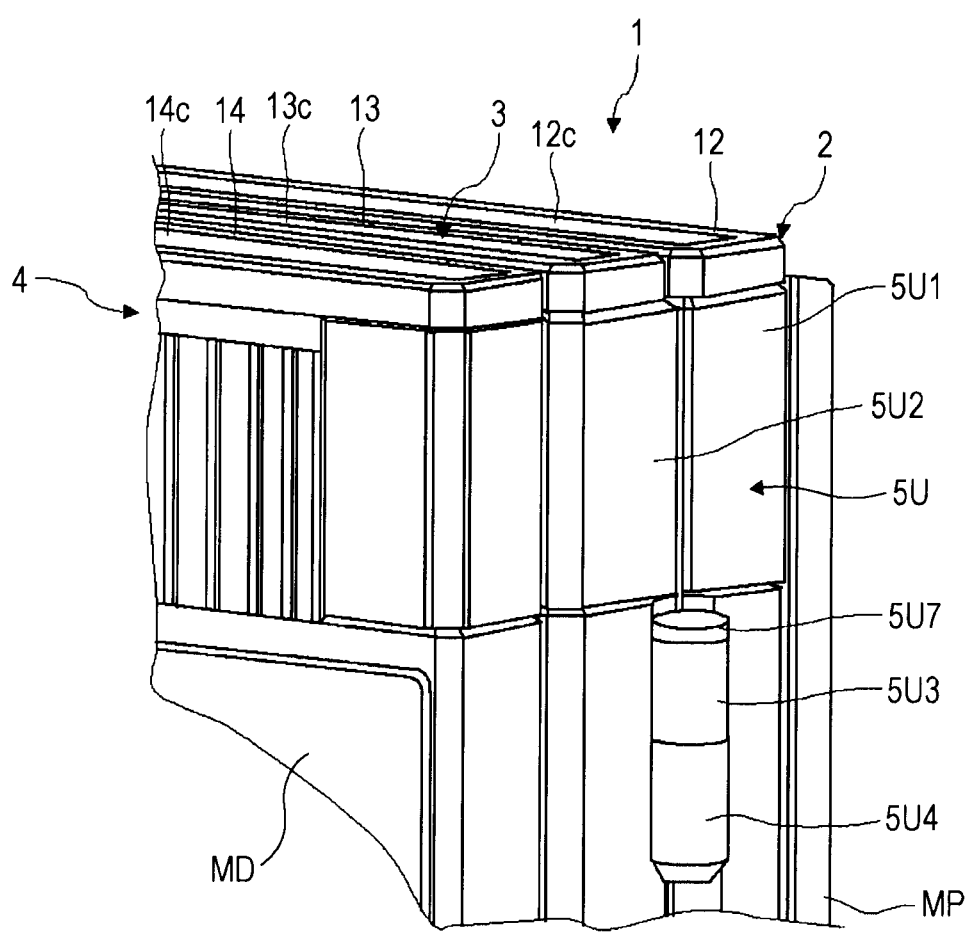
FIG. 6 is a perspective view enlarging and illustrating the neighborhood of a first connecting portion for connecting the first casing and the second casing of the personal digital assistant according to the present embodiment in the terminal closed state illustrated in FIG. 3.
Figure 7:
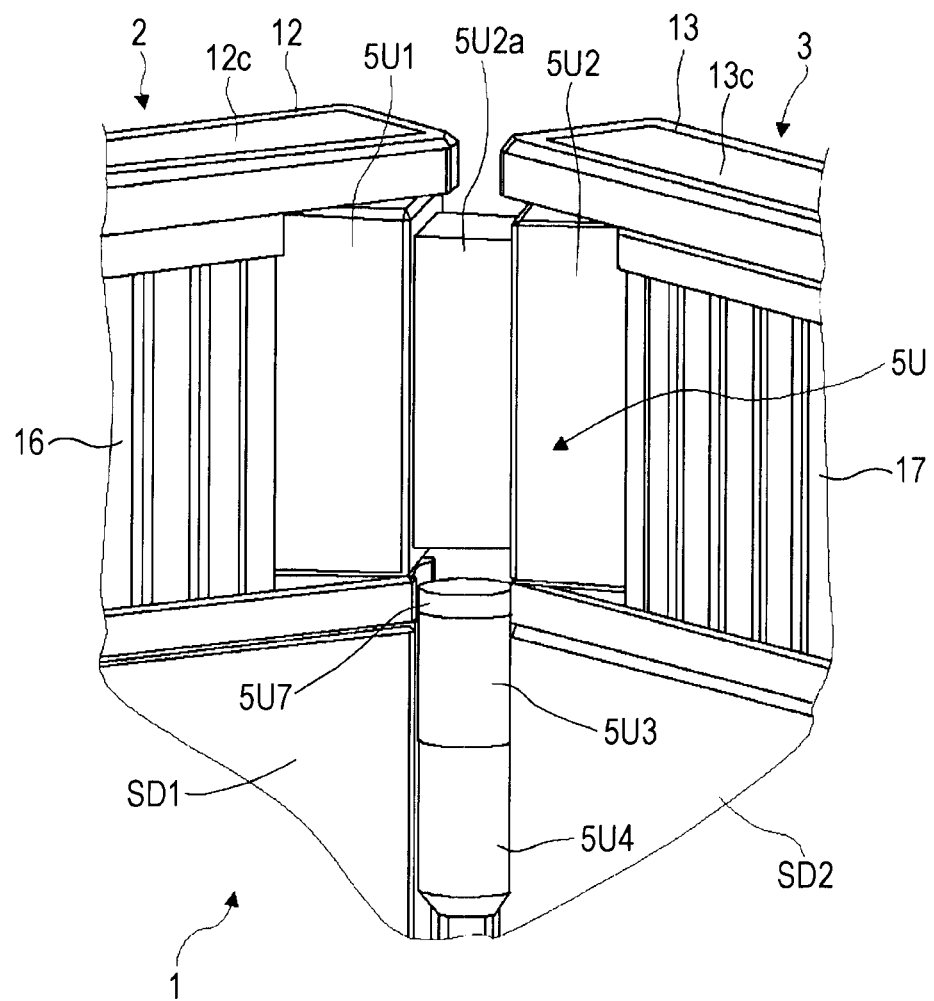
FIG. 7 is an enlarged perspective view of the neighborhood of the first connecting portion for connecting the first casing and the second casing of the personal digital assistant according to the present embodiment in the terminal opened state illustrated in FIG. 4, as viewed from the display panel side.
Figure 8:
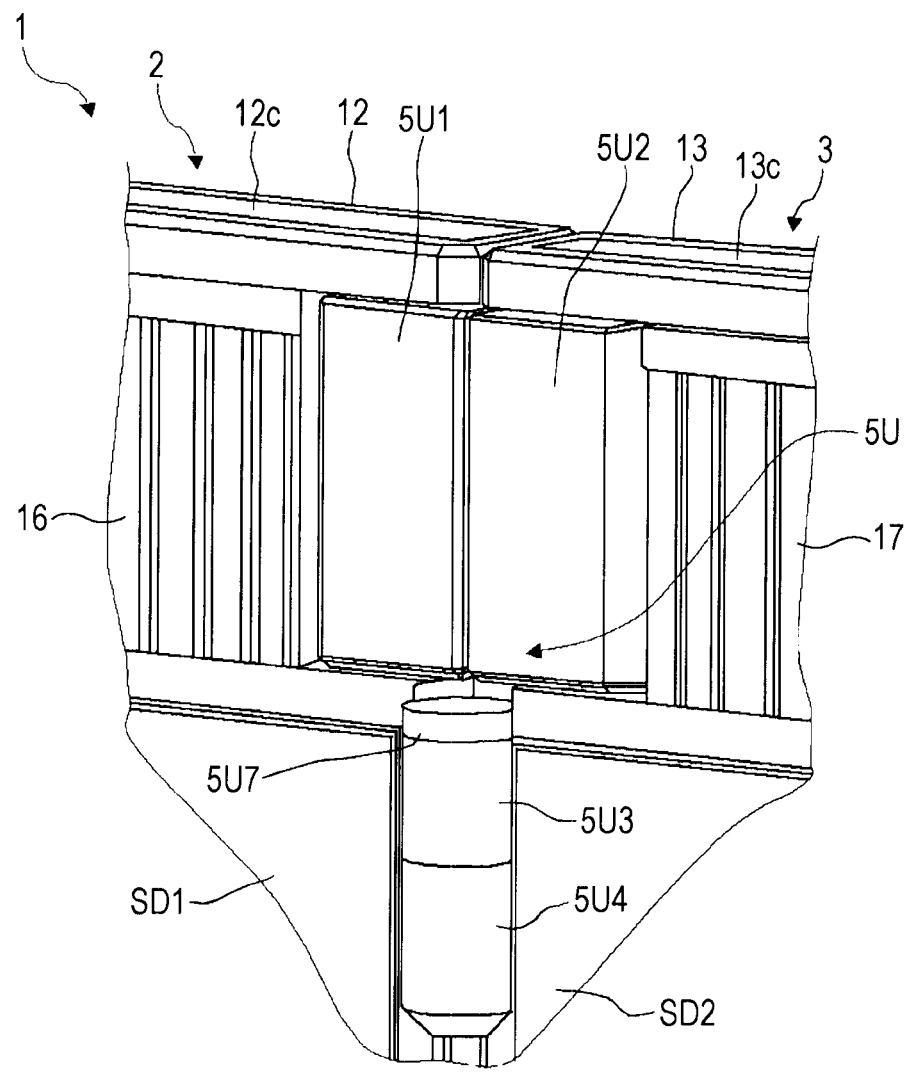
FIG. 8 is an enlarged perspective view of the neighborhood of the first connecting portion for connecting the first casing and the second casing of the personal digital assistant according to the present embodiment in the terminal opened state illustrated in FIG. 5, as viewed from the display panel side.
Figure 9:
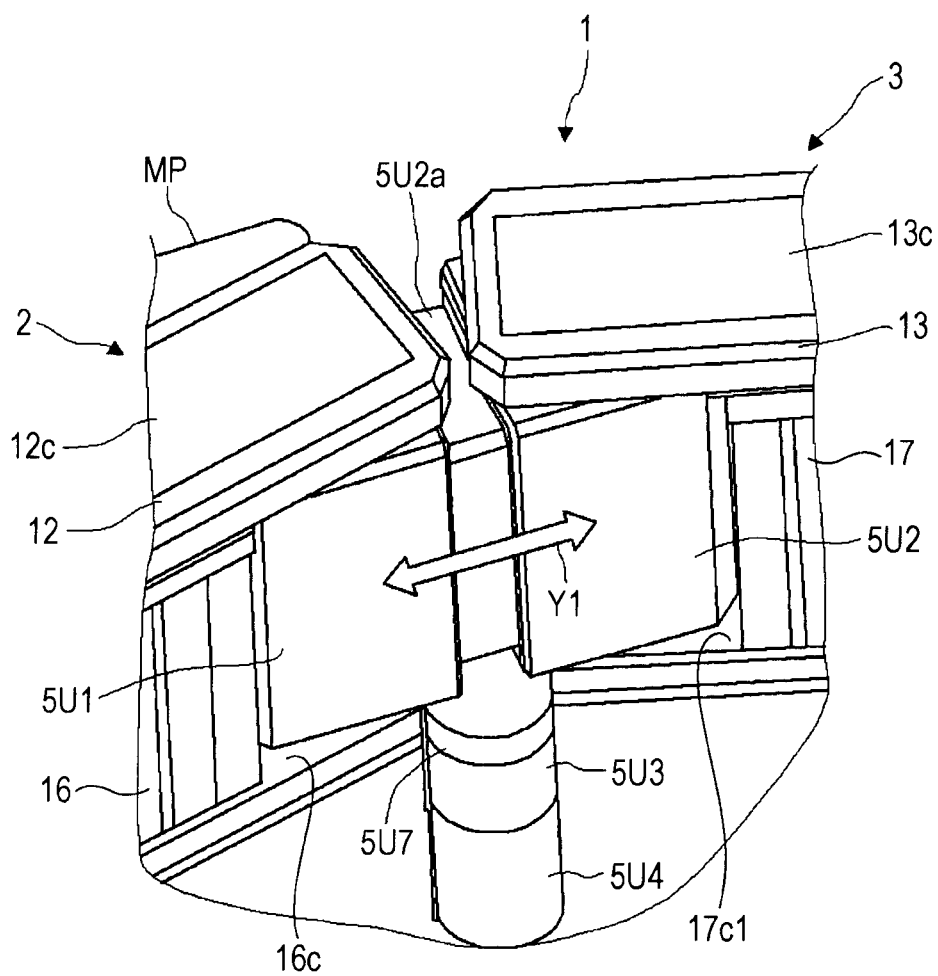
FIG. 9 is an enlarged perspective view of the neighborhood of the first connecting portion for connecting the first casing and the second casing of the personal digital assistant according to the present embodiment in the terminal opened state illustrated in FIG. 4, as viewed from the display panel side, and is specifically a view used for operational description of this first connecting portion at the time of relatively turning the first and second casings.
Figure 10:
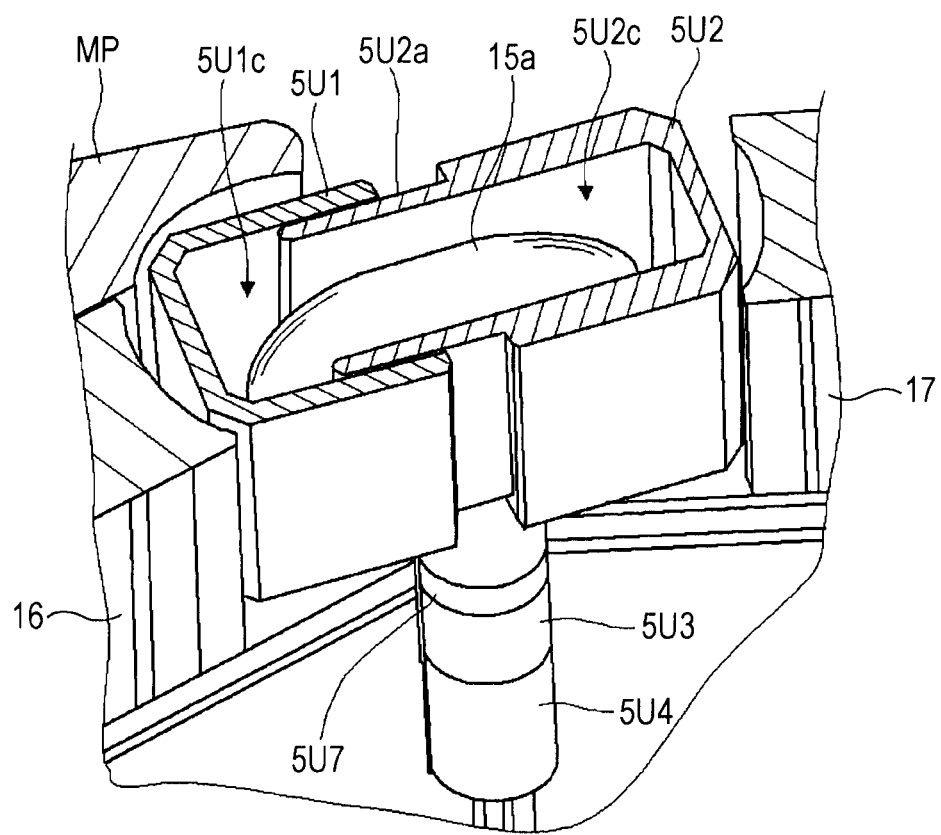
FIG. 10 is a cross-sectional view enlarging and illustrating the neighborhood of the first connecting portion for connecting the first casing and the second casing of the personal digital assistant according to the present embodiment in the terminal opened state illustrated in FIG. 4, and also illustrating the neighborhood of a first harness cover portion and a second harness cover portion by being cut away in a terminal shorter direction orthogonal to the terminal principal surface.
Figure 11:
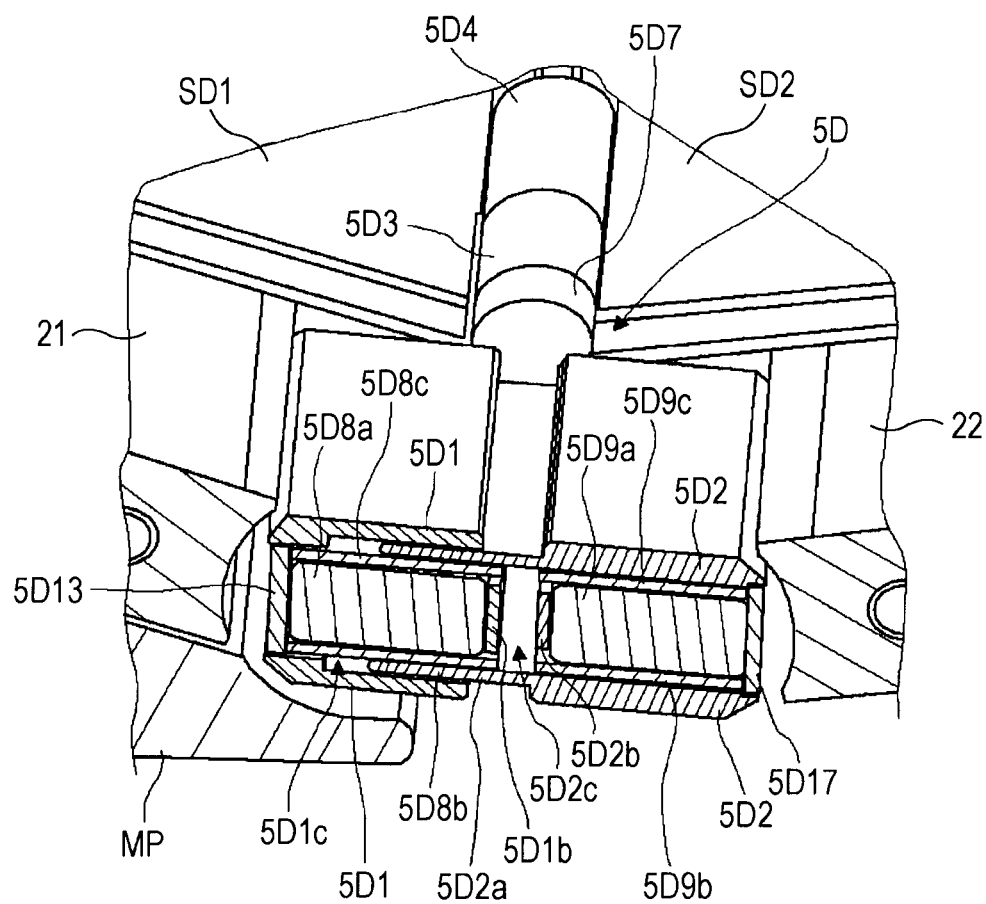
FIG. 11 is a cross-sectional view enlarging and illustrating the neighborhood of a second connecting portion for connecting the first casing and the second casing of the personal digital assistant according to the present embodiment in the terminal opened state illustrated in FIG. 4, and also illustrating the neighborhood of a first tension element cover portion and a second tension element cover portion by being cut away in a terminal shorter direction orthogonal to the terminal principal surface.
Figure 12:
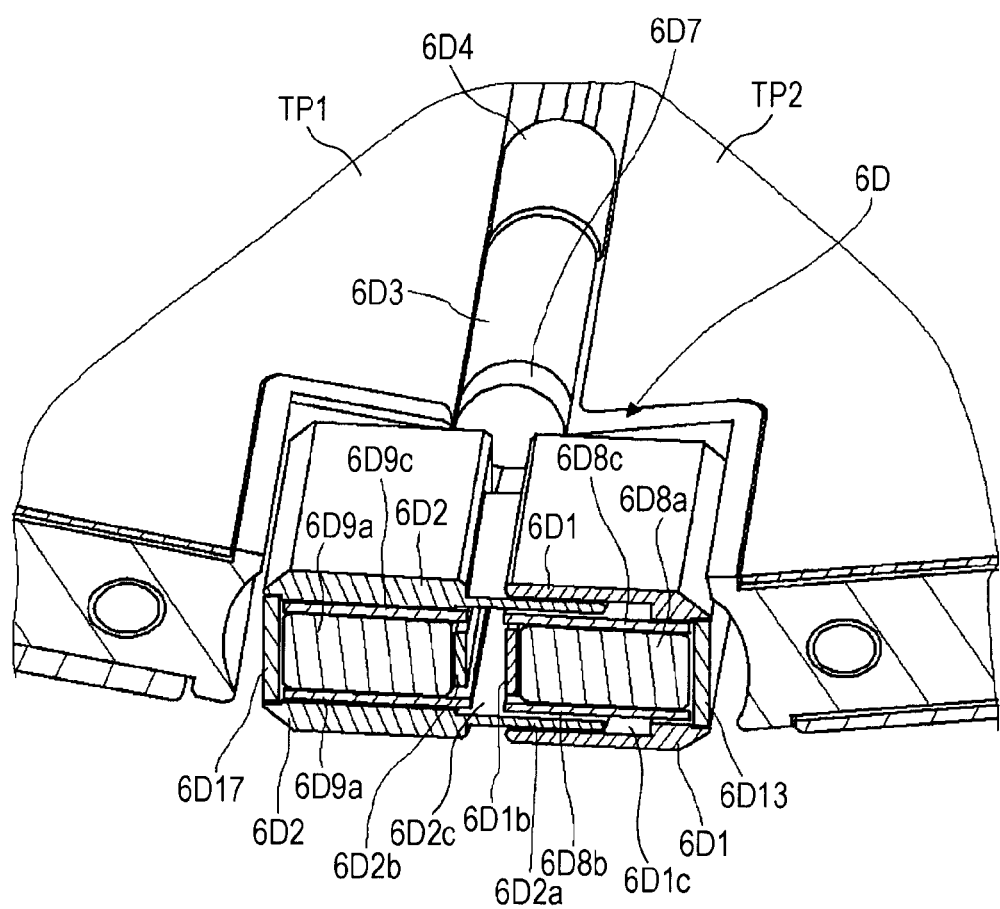
FIG. 12 is a cross-sectional view enlarging and illustrating the neighborhood of a second connecting portion for connecting the second casing and the third casing of the personal digital assistant according to the present embodiment in the terminal opened state illustrated in FIG. 4, and also illustrating the neighborhood of the first tension element cover portion and the second tension element cover portion by being cut away in a terminal shorter direction orthogonal to the terminal principal surface.
Figure 13:
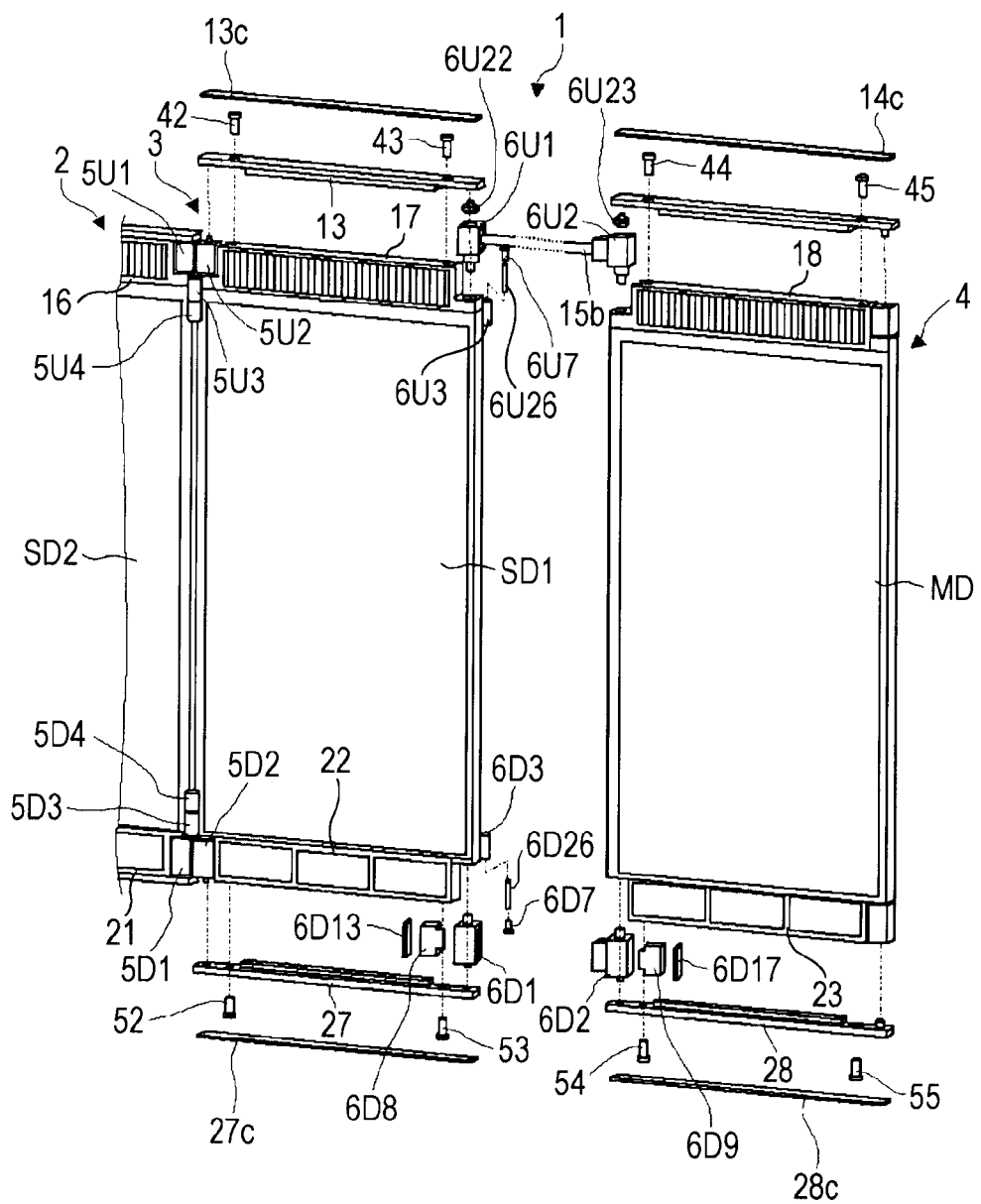
FIG. 13 is an exploded perspective view of the first connecting portion and second connecting portion for connecting the second casing and the third casing, and the circumferential portion thereof at the personal digital assistant in the terminal opened state illustrated in FIG. 5 as viewed from the display panel side.
Figure 14:
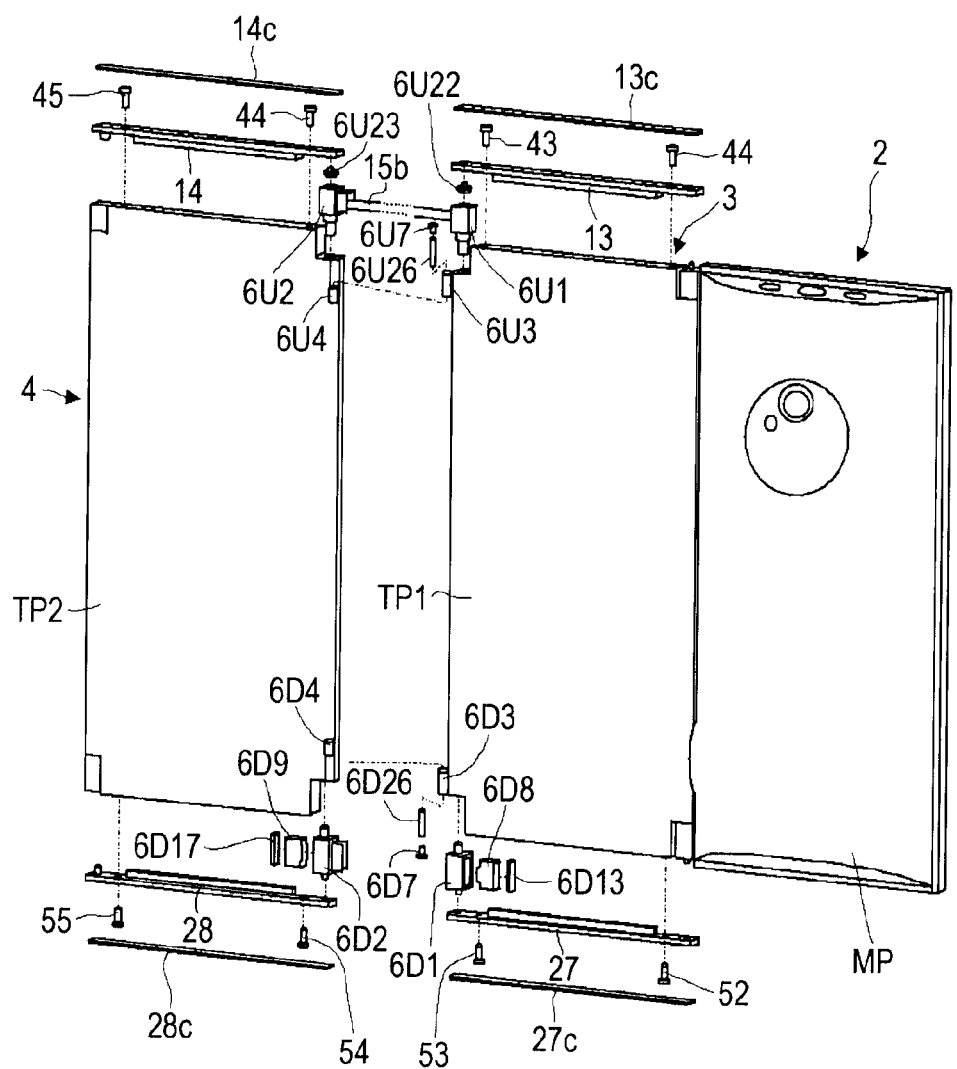
FIG. 14 is an exploded perspective view of the first connecting portion and second connecting portion for connecting the second casing and the third casing, and the circumferential portion thereof at the personal digital assistant in the terminal opened state illustrated in FIG. 5 as viewed from the texture panel side.
Figure 15:
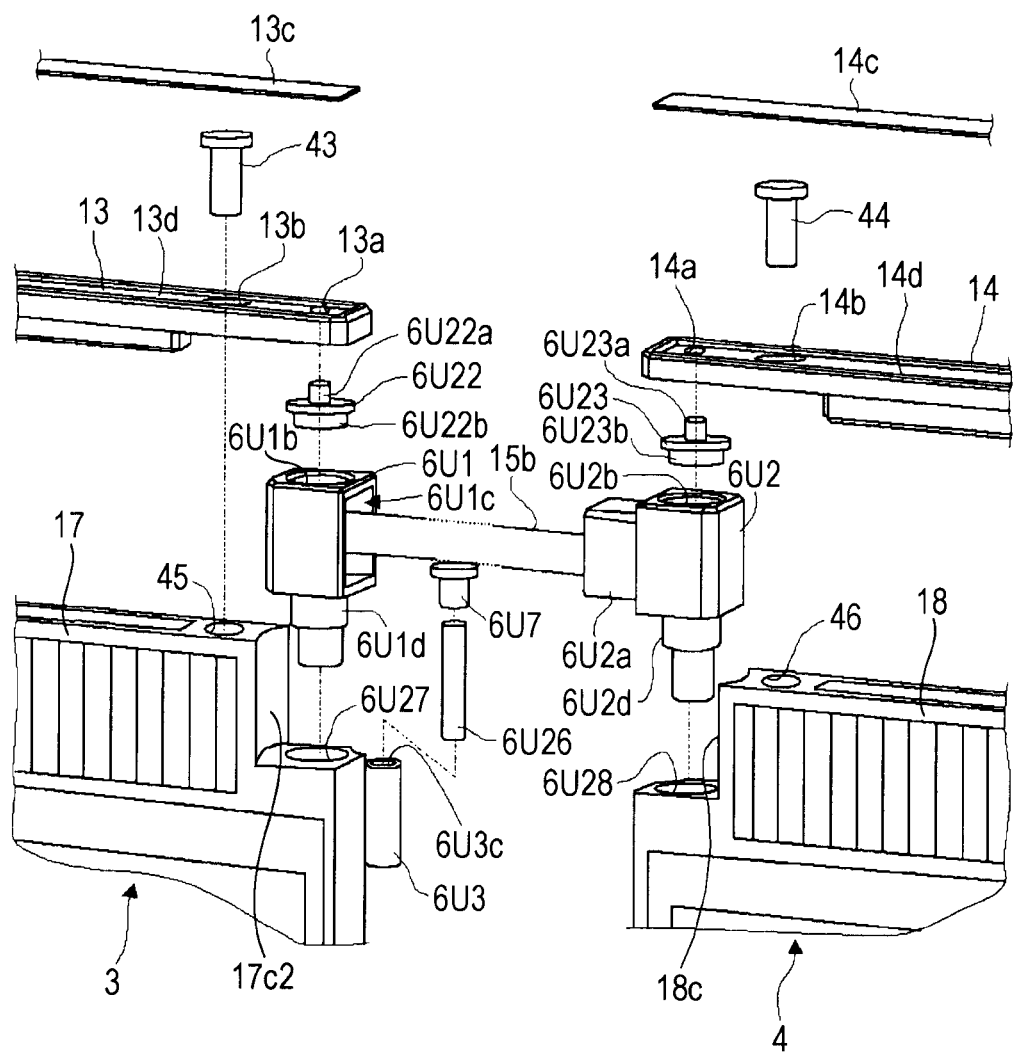
FIG. 15 is a view enlarging the first connecting portion and circumferential portion thereof alone of the exploded perspective view illustrated in FIG. 13.
Figure 16:
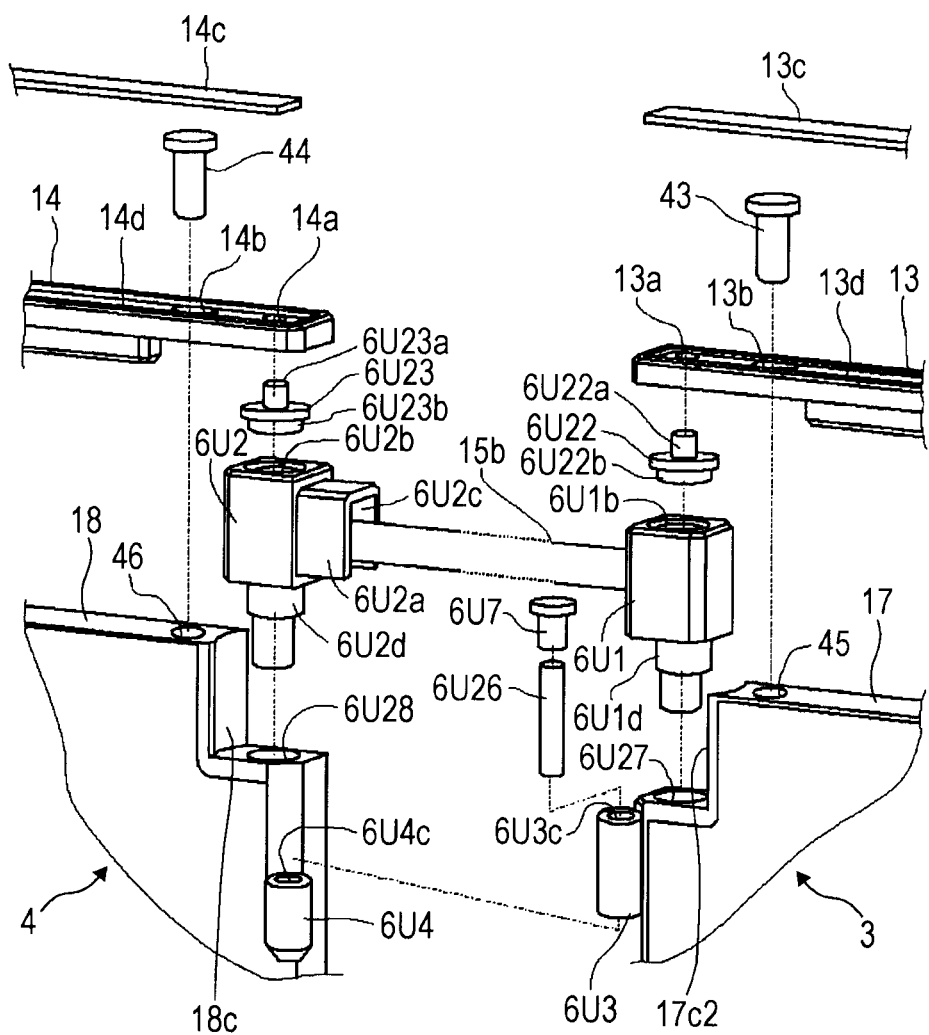
FIG. 16 is a view enlarging the first connecting portion and circumferential portion thereof alone of the exploded perspective view illustrated in FIG. 14.
Figure 17:
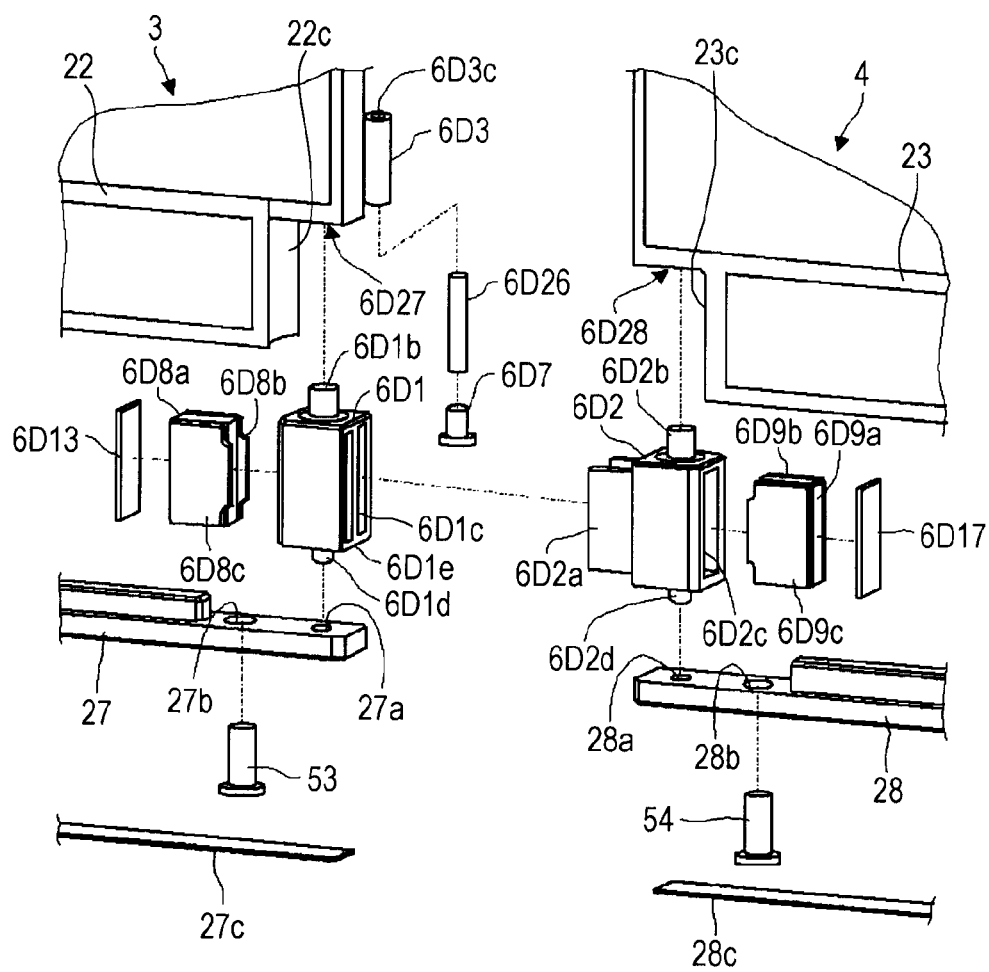
FIG. 17 is a view enlarging the second connecting portion and circumferential portion thereof alone of the exploded perspective view illustrated in FIG. 13.
Figure 18:
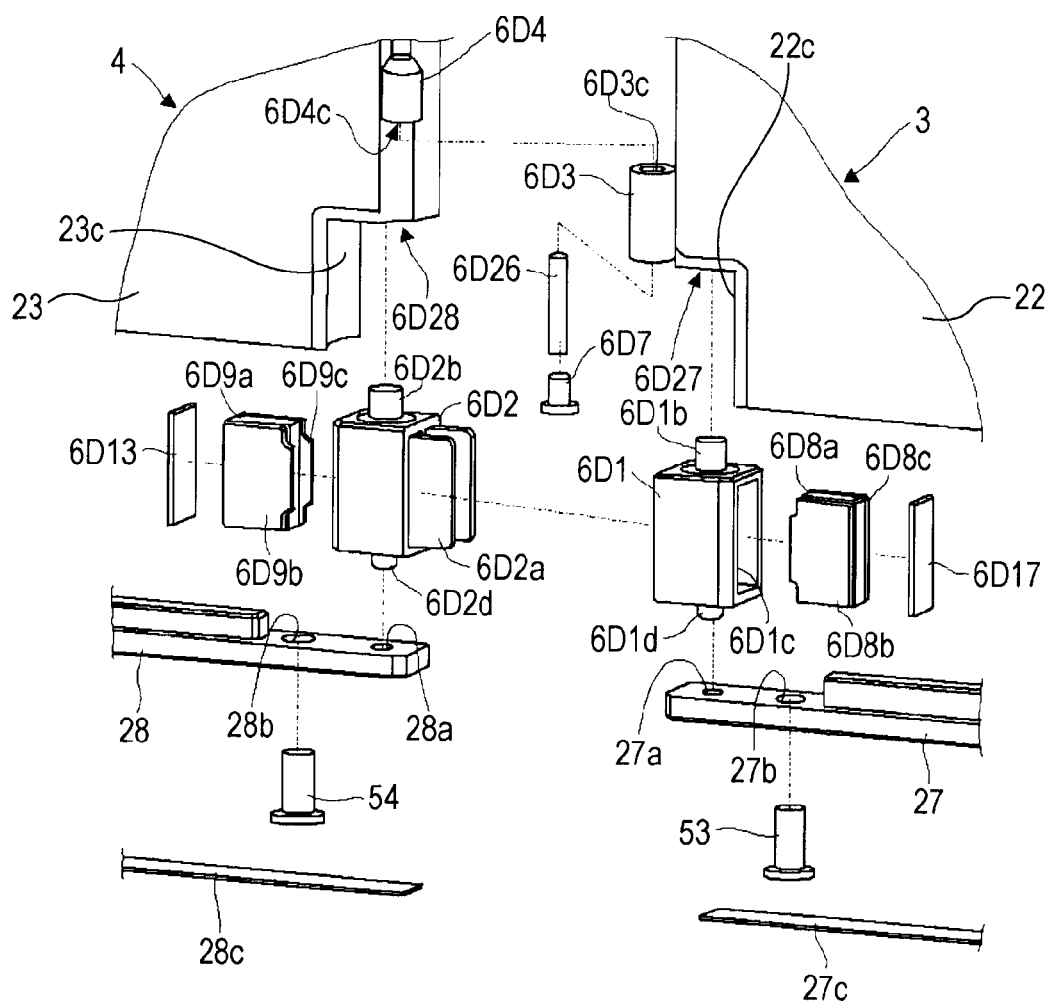
FIG. 18 is a view enlarging the second connecting portion and circumferential portion thereof alone of the exploded perspective view illustrated in FIG. 14.
Figure 19:
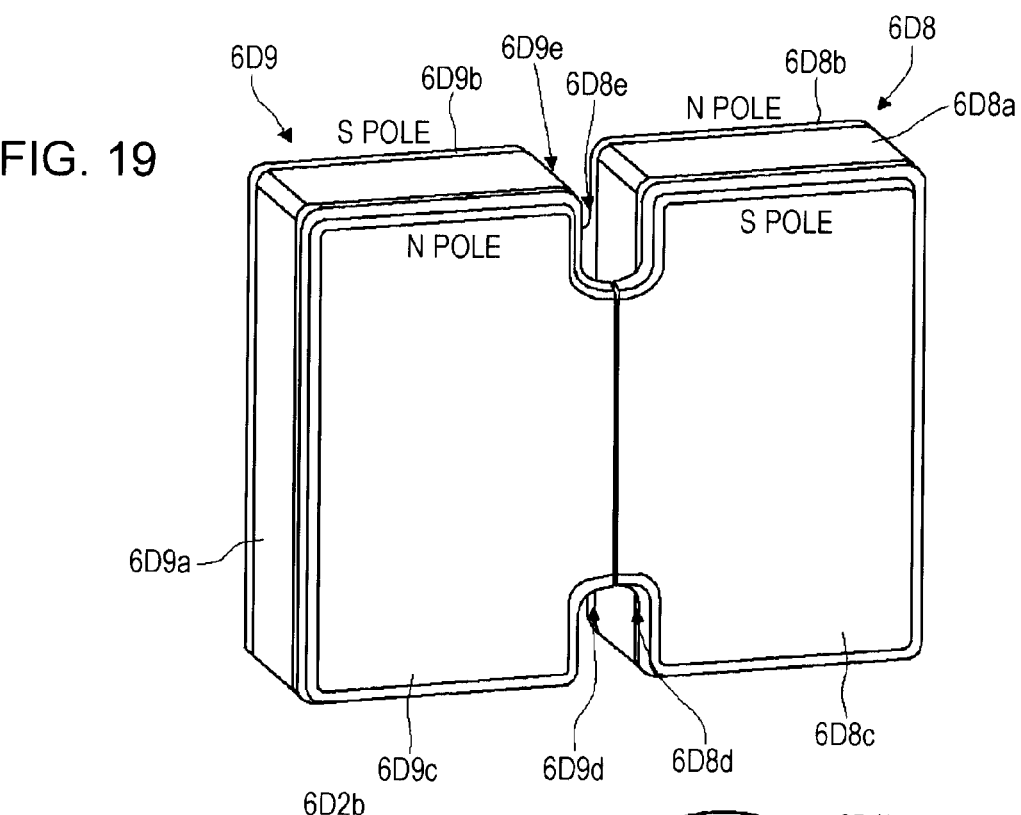
FIG. 19 is a view illustrating the schematic appearance of the first and second tension element portions provided to the inside of the second connecting portion.
Figure 20:
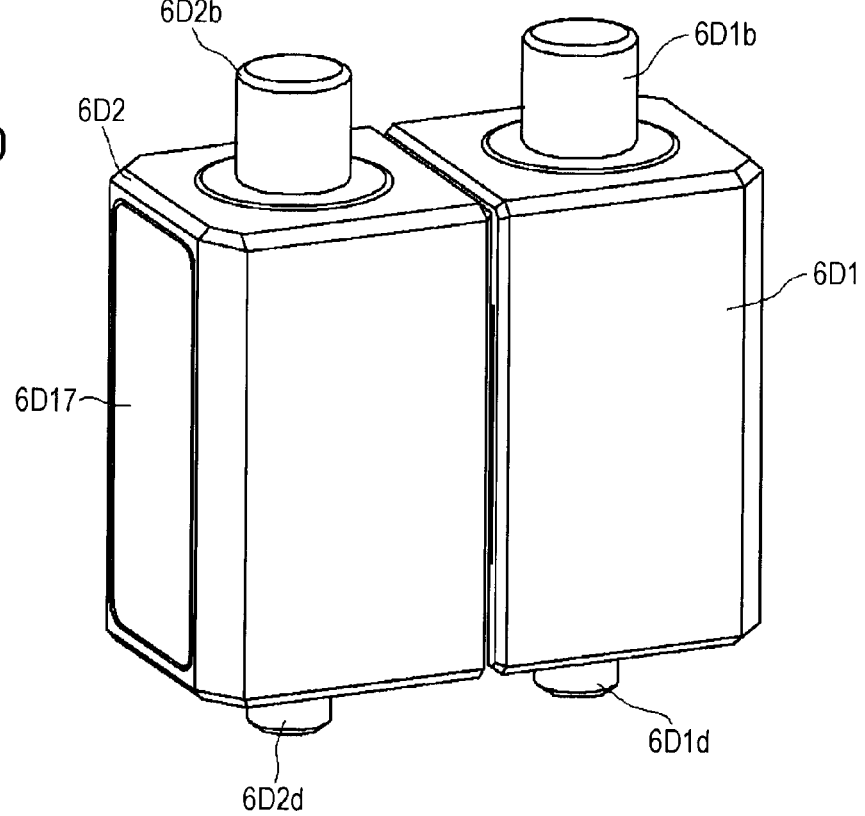
FIG. 20 is a view extracting and enlarging the second connecting portion alone in the terminal opened state as illustrated in FIG. 5.
Figure 21:
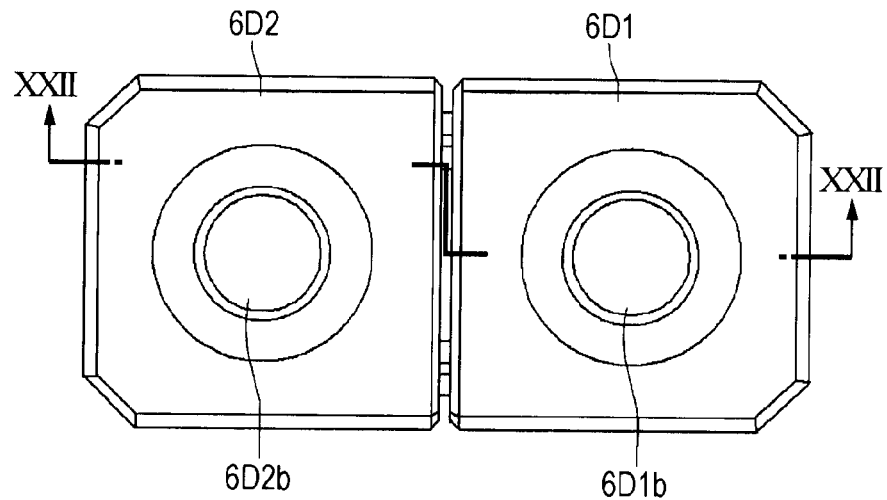
FIG. 21 is a view of the second connecting portion illustrated in FIG. 20, for example, as viewed from above.
Figure 22:
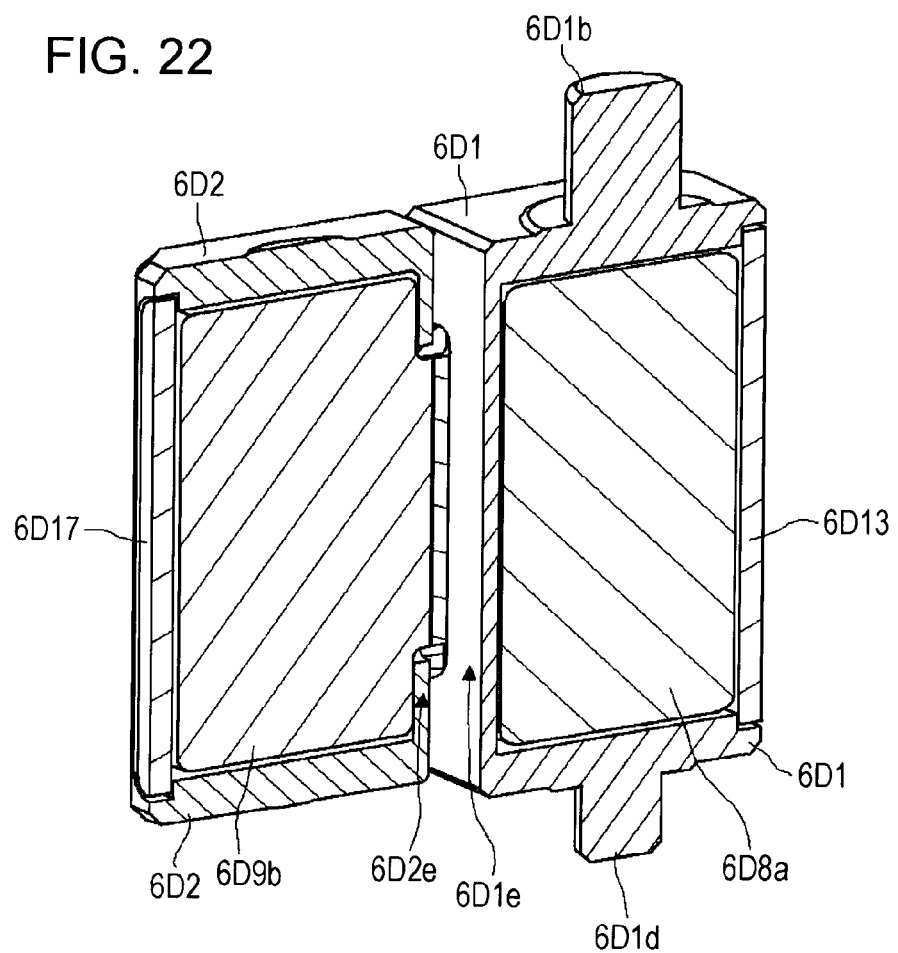
FIG. 22 is a cross-sectional view of the second connecting portion in FIG. 20 by being cut away along a dashed-two dotted line in FIG. 21, as viewed from an arrow XXII-XXII direction.
Figure 23:
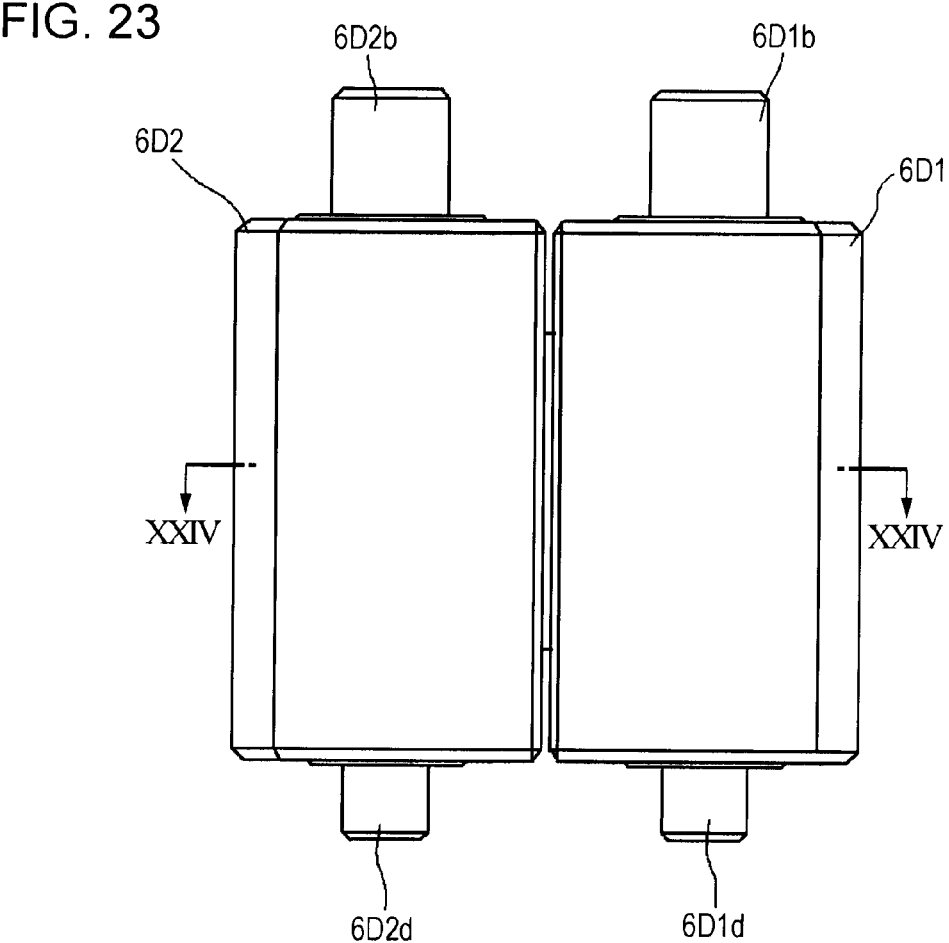
FIG. 23 is a view of the second connecting portion illustrated in FIG. 20, for example, as viewed from the front side.
Figure 24:
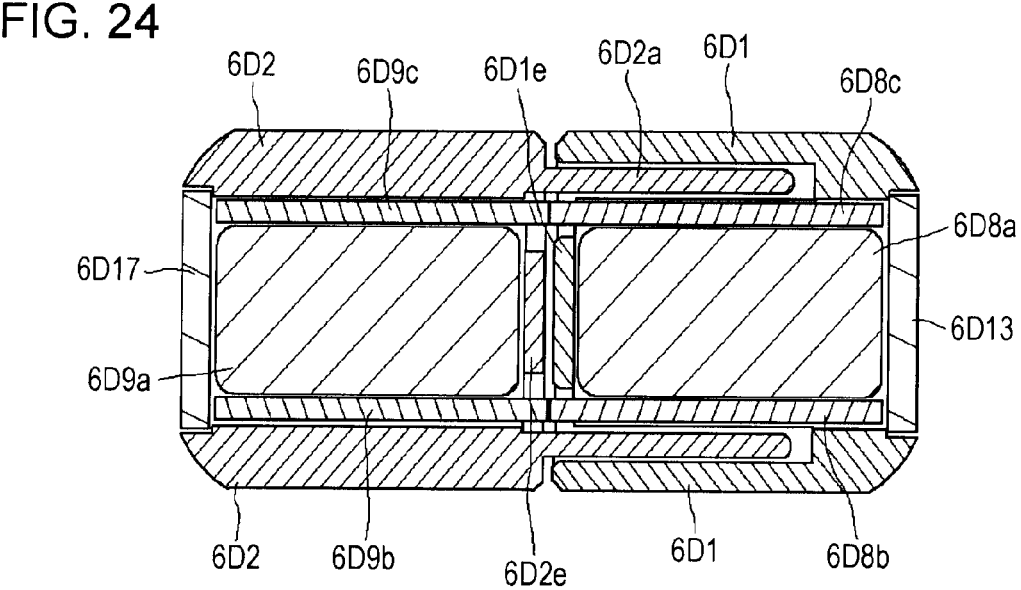
FIG. 24 is a cross-sectional view of the second connecting portion in FIG. 23 by being cut away along a dashed-two dotted line in FIG. 23, as viewed from an arrow XXIV-XXIV direction.

Here, FIG. 6 enlarges and illustrates the neighborhood of the first connecting portion 5U at the time of the personal digital assistant 1 according to the present embodiment being set to the terminal closed state illustrated in FIG. 3. Also, FIG. 7 illustrates an enlarged view of the neighborhood of the first connecting portion 5U at the time of the personal digital assistant 1 according to the present embodiment being set to the terminal opened state illustrated in FIG. 4 as viewed from the display panel side, and FIG. 8 illustrates an enlarged view of the neighborhood of the first connecting portion 5U at the time of the personal digital assistant 1 according to the present embodiment being set to the terminal opened state illustrated in FIG. 5 as viewed from the display panel side. Also, FIG. 9 illustrates the neighborhood of the first connecting portion 5U in the terminal opened state in FIG. 4 by further enlarging this as compared to the example in FIG. 7, and also illustrates the motion of the first connecting portion 5U at this time. FIG. 10 illustrates, with the example in FIG. 9, a cross section at the time of cutting away the neighborhood of the first connecting portion 5U in the casing short direction and also in the vertical direction as to the casing principal surface. FIG. 11 illustrates a cross section of the neighborhood of the second connecting portion 5D as viewed from the display panel side in the event that the first connecting portion 5U is set to the state in FIG. 9, and at the time of cutting away the neighborhood of the second connecting portion 5D in the casing short direction and also in the vertical direction as to the casing principal surface. Also, FIG. 12 illustrates a cross section of the neighborhood of the second connecting portion 6D as viewed from the texture panel side in the terminal opened state in FIG. 4, and at the time of cutting away the neighborhood of the second connecting portion 6D in the casing short direction and also in the vertical direction as to the casing principal surface. Also, FIG. 13 illustrates, in the terminal opened state as illustrated in FIG. 5, the second casing 3, third casing 4, first connecting portion 6U, second connection portion 6D, and the circumferential portion thereof as exploded and viewed from the display panel side. FIG. 14 illustrates, in the terminal opened state as illustrated in FIG. 5, the second casing 3, third casing 4, first connecting portion 6U, second connection portion 6D, and the circumferential portion thereof as exploded and viewed from the texture panel side. Also, FIG. 15 enlarges and illustrates the neighborhood of the first connecting portion 6U illustrated in FIG. 13, and on the other hand, FIG. 16 enlarges and illustrates the neighborhood of the first connecting portion 6D illustrated in FIG. 14. Also, FIG. 17 enlarges and illustrates the neighborhood of the second connecting portion 6D illustrated in FIG. 13, and FIG. 18 enlarges and illustrates the neighborhood of the second connecting portion 6D illustrated in FIG. 14. Further, FIG. 19 illustrates schematic outer appearances of later-described first and second tension element portions 6D8 and 6D9 provided to the inside of the second connecting portion 6D. Also, FIG. 20 illustrates a diagram extracting and enlarging the second connecting portion 6D alone in the terminal opened state as illustrated in FIG. 5. Further, FIG. 21 illustrates a diagram of the second connecting portion 6D illustrated in FIG. 20 as viewed from above, and FIG. 22 illustrates a cutaway view by cutting away the second connecting portion 6D in FIG. 20 along a dashed-two dotted line in FIG. 21 as viewed from an arrow XXII-XXII direction. Also, FIG. 23 illustrates a diagram of the second connecting portion 6D illustrated in FIG. 20 as viewed from the front side for example, and FIG. 24 illustrates a cutaway view by cutting away the second connecting portion 6D in FIG. 23 along a dashed-two dotted line in FIG. 23 as viewed from an arrow XXIV-XXIV direction. Note that the first connecting portion 5U is configured generally in the same way as the first connecting unit 6U, and the second connecting portion 5D is configured generally in the same way as the second connecting unit 6D, and accordingly, the exploded views of the first and second connecting portions 5U and 5D and description thereof will be omitted.

As illustrated in FIGS. 6 through 24, with the personal digital assistant 1 according to the present embodiment, the first connecting portion 6U is configured of a first harness cover portion 6U1 and a second harness cover portion 6U2, a first turning lid portion 6U22 and a second turning lid portion 6U23, a first hinge portion 6U3 and a second hinge portion 6U4, and a hinge screw portion 6U7 and a hinge shaft portion 6U26. Similarly, the first connecting portion 5U is configured of a first harness cover portion 5U1 and a second harness cover portion 5U2, an unshown first turning lid portion and an unshown second turning lid portion, a first hinge portion 5U3 and a second hinge portion 5U4, and a hinge screw portion 5U7 and an unshown hinge shaft portion.

Also, with the personal digital assistant 1 according to the present embodiment, the second connecting portion 6D is configured of a first tension element cover portion 6D1 and a second tension element cover portion 6D2, a first cover lid portion 6D13 and a second cover lid portion 6D17, a first hinge portion 6D3 and a second hinge portion 6D4, a hinge screw portion 6D7 and a hinge shaft portion 6D26, and a first tension element portion 6D8 and a second tension element portion 6D9. Similarly, the second connecting portion 5D is configured of a first tension element cover portion 5D1 and a second tension element cover portion 5D2, a first cover lid portion 5D13 and a second cover lid portion 5D17, a first hinge portion 5D3 and a second hinge portion 5D4, a hinge screw portion 5D7 and an unshown hinge shaft portion, and a first tension element portion 5D8 and a second tension element portion 5D9.

Here, the first hinge portion 6U3 has a cylindrical shape including an intra-cylinder space 6U3c, and the second hinge portion 6U4 has a cylindrical shape including an intra-cylinder space 6U4c. Also, the intra-cylinder outer diameters of both of the first hinge portion 6U3 and the second hinge portion 6U4 are generally the same diameter. Further, the lengths in the cylinder shaft directions of both of the first hinge portion 6U3 and the second hinge portion 6U4 are generally the same length for example. The first hinge portion 6U3 is disposed so that the cylinder shaft direction thereof is parallel in the long direction of the second casing 3, and also, a portion of the cylinder outer circumference thereof is fixedly formed integral with the side wall surface of the neighborhood of the long side edge portion 17 of the second casing 3. On the other hand, the second hinge portion 6U4 is disposed so that the cylinder shaft direction thereof is parallel in the long direction of the third casing 4, and also, a portion of the cylinder outer circumference thereof is fixedly formed integral with the side wall surface of the neighborhood of the long side edge portion 18 of the third casing 4 in a position shifted by the length in the cylinder shaft direction of this first hinge portion 6U3 as to the placement position of the first hinge portion 6U3.

The hinge shaft portion 6U26 has a cylindrical shape. The cylinder outer diameter of this hinge shaft portion 6U26 is somewhat smaller than both the intra-cylinder inner diameters of the first hinge portion 6U3 and the second hinge portion 6U4. Also, the length of the cylinder shaft direction of this hinge shaft portion 6U26 is shorter than length obtained by adding the length of the cylinder shaft direction of the first hinge portion 6U3, and the length of the cylinder shaft direction of the second hinge portion 6U4, but on other hand, longer than the lengths in the cylinder shaft directions of the first hinge portion 6U3 and the second hinge portion 6U4. That is to say, the hinge shaft portion 6U26 places the shaft between the first hinge portion 6U3 and the second hinge portion 6U4 by being inserted into both the cylinder spaces 6U3c and 6U4c in a state in which the mutually corresponding cylinder edge portions of the first hinge portion 6U3 and the second hinge portion 6U4 are in contact with each other, and also both cylinder shafts match.

The hinge screw portion 6U7 is screwed, for example, from the open side cylinder edge portion side of the first hinge portion 6U3 to the cylinder space 6U3c after the hinge shaft portion 6U26 is inserted into the cylinder spaces 6U3c and 6U4c of the first hinge portion 6U3 and the second hinge portion 6U4. Note that of both the cylinder edge portions which the second hinge portion 6U4 has, the cylinder edge portion serving as the opposite side as to the cylinder edge portion which is in contact with the first hinge portion 6U3 is closed, which prevents the inserted hinge shaft portion 6U26 from protruding. Also, the screw-thread head diameter of the hinge screw portion 6U7 is generally the same diameter as the cylinder outer diameters of the first hinge portion 6U3 and the second hinge portion 6U4 or a smaller diameter than those.

Also, the first hinge portion 6D3 has a cylindrical shape including an intra-cylinder space 6D3c, and the second hinge portion 6D4 has a cylindrical shape including an intra-cylinder space 6D4c. Also, the intra-cylinder inner diameters of both of the first hinge portion 6D3 and the second hinge portion 6D4 are generally the same diameter. Further, the lengths in the cylinder shaft directions of both of the first hinge portion 6D3 and the second hinge portion 6D4 are generally the same length for example. Also, the first hinge portion 6D3 is disposed so that the cylinder shaft direction thereof is parallel in the long direction of the second casing 3, and also, a portion of the cylinder outer circumference thereof is fixedly formed integral with the side wall surface in the neighborhood of the long side edge portion 22 of the second casing 3. On the other hand, the second hinge portion 6D4 is disposed so that the cylinder shaft direction thereof is parallel in the long direction of the third casing 4, and also, a portion of the cylinder outer circumference thereof is fixedly formed integral with the side wall surface of the neighborhood of the long side edge portion 23 of the third casing 4 in a position shifted by the length in the cylinder shaft direction of this first hinge portion 5D3 as to the placement position of the first hinge portion 6D3.

The hinge shaft portion 6D26 has a cylindrical shape. The cylinder outer diameter of this hinge shaft portion 6D26 is somewhat smaller than both the intra-cylinder inner diameters of the first hinge portion 6D3 and the second hinge portion 6D4. Also, the length of the cylinder shaft direction of this hinge shaft portion 6D26 is shorter than length obtained by adding the length of the cylinder shaft direction of the first hinge portion 6D3, and the length of the cylinder shaft direction of the second hinge portion 6D4, but on other hand, longer than the lengths in the cylinder shaft directions of the first hinge portion 6D3 and the second hinge portion 6D4. That is to say, the hinge shaft portion 6D26 places the shaft between the first hinge portion 6D3 and the second hinge portion 6D4 by being inserted into both the cylinder spaces 6D3c and 6D4c in a state in which the mutually corresponding cylinder edge portions of the first hinge portion 6D3 and the second hinge portion 6D4 are in contact with each other, and also both cylinder shafts match.

The hinge screw portion 6D7 is screwed, for example, from the open side cylinder edge portion side of the first hinge portion 6D3 to the cylinder space 6D3c after the hinge shaft portion 6D26 is inserted into the cylinder spaces 6D3c and 6D4c of the first hinge portion 6D3 and the second hinge portion 6D4. Note that of both the cylinder edge portions which the second hinge portion 6D4 has, the cylinder edge portion serving as the opposite side as to the cylinder edge portion which is in contact with the first hinge portion 6D3 is closed, which prevents the inserted hinge shaft portion 6D26 from protruding. Also, the screw-thread head diameter of the hinge screw portion 6D7 is generally the same diameter as the cylinder outer diameters of the first hinge portion 6D3 and the second hinge portion 6D4 or a smaller diameter than those.

With the present embodiment, at the time of the second casing 3 and the third casing 4 being connected by this first connecting portion 6U, the shaft is placed between the first hinge portion 6U3 and the second hinge portion 6U4 by the hinge shaft portion 6U26 being inserted into the cylinder inner space 6U3c and the cylinder inner space 6U4c, and also, the mutually corresponding edge portions in the cylinder shaft directions thereof are rotatably in slide contact with each other. Similarly, the shaft is placed between the first hinge portion 6D3 and the second hinge portion 6D4 by the hinge shaft portion 6D26 being inserted into the cylinder inner space 6D3c and the cylinder inner space 6D4c, and also, the mutually corresponding edge portions in the cylinder shaft directions thereof are rotatably in slide contact with each other.

As described above, according to the personal digital assistant 1 according to the present embodiment, the second casing 3 and the third casing 4 are connected by the first connecting portion 6U and the second connecting portion 6D, and also mutually turned. Note that the configurations of the first connecting portion 5U and the second connecting portion 5D are generally the same as the configurations of the first connecting portion 6U and the second connecting portion 6D.

Also, with the personal digital assistant 1 according to the present embodiment, the first harness cover portion 6U1 has a generally rectangular parallelepiped shape of which the inner portion is a hollow portion 6U1c. With this first harness cover portion 6U1, a portion equivalent to one face of six faces making up the rectangular parallelepiped is completely opened. Also, with this first harness cover portion 6U1, a circular hole portion 6U1b to which the cylinder portion 6U22b of the first turning lid portion 6U22 is rotatably loosely fixed is provided to one face side orthogonal to an imaginary face of the opened portion, and a cylinder portion 6U1d is provided to the other face side.

The cylinder portion 6U1d is provided so that the cylinder shaft direction thereof is orthogonal to the disposed surface of this first harness cover portion 6U1, and also protruded from the disposed surface to the outer direction. That is to say, the inner hollow portion 6U1c of the first harness cover portion 6U1 is connected to outer space via the opened portion, and also connected to outer space via the intra-cylinder space of the cylinder portion 6U1d. With the present embodiment, the inner hollow portion 6U1c of this first harness cover portion 6U1, the opened portion, and the intra-cylinder space of the cylinder portion 6U1d are provided to lay a harness 15b for electrically connecting the second casing 3 and the third casing 4.

The circular hole portion 6U1b is provided to the face side of the opposite side mutually corresponding to the disposed face of the cylinder portion 6U1d, and is configured so that the center axis of the hole portion thereof is orthogonal to the disposed face of the first harness cover portion 6U1. Note that the cylinder shaft of the cylinder portion 6U1d is disposed so as to match the center axis of the circular hole portion 6U1b. Also, the circular hole portion 6U1b may be connected to the inner hollow portion 6U1c of the first harness cover portion 6U1, or may be provided as a hollow portion on the disposed face of the first harness cover portion 6U1 without connecting to the inner hollow portion 6U1c.

This first harness cover portion 6U1 is stored inside of a first harness cover storage portion 17c2 provided to the side wall face serving as the third casing 4 side of the long side edge portion 17 of the second casing 3. This first harness cover storage portion 17c2 includes a cylinder through-hole portion 6U27 into which the cylinder portion 6U1d of the first harness cover portion 6U1 is inserted so as to turn in the cylinder shaft turning direction thereof, and also includes space sufficient for enabling the first harness cover portion 6U1 to be turned. Also, the cylinder through-hole portion 6U27 also has a role for guiding a harness 15b electrically connected to the inner circuit substrate of this second casing 3 to the outside.

Also, an interposition mounting portion 13 for interposition mounting of the first harness cover portion 6U1 in a state in which the cylinder portion 6U1d is inserted into the cylinder through-hole portion 6U27 via the first turning lid portion 6U22 so as to be turned is provided to the long side edge portion 17 of the second casing 3. This interposition mounting portion 13 has generally the same lateral length as the short length of the second casing 3, and also has a generally rectangular shape generally having the same vertical length as the thickness of the second casing 3, and also includes a cylinder insertion portion 13a to which the cylinder portion 6U22a of the first turning lid portion 6U22 is loosely fixed so as to be turned. Also, this interposition mounting portion 13 is fixed to the long side edge portion 17 of the second casing 3 via fixing screws 42 and 43. In addition, the interposition mounting portion 13 also includes a slot portion 13d into which a decorative laminated sheet 13c, for preventing the screw-thread head portions of the fixing screws 42 and 43 and the cylinder insertion portion 13a from being exposed, is fitted.

In this way, with the present embodiment, the first harness cover portion 6U1 is stored in the first harness cover storage portion 17c2 of the long side edge portion 17 of this second casing 3 in a state in which the cylinder portion 6U1d is inserted into the cylinder through-hole portion 6U27, and further, the circular hole portion 6U1b is mounted in an inter-positioned manner on the interposition mounting portion 13 via the first turning lid portion 6U22 so as to be turned. Also, the harness 15b electrically connected to the inner circuit substrate of the second casing 3 is disposed in the inner space of the first harness cover portion 6U1, passing through the cylinder inner space of the cylinder portion 6U1d inserted into the cylinder through-hole portion 6U27.

Also, with the present embodiment, the second harness cover 6U2 has a generally rectangular parallelepiped shape of which the inner portion is a hollow portion 6U2c. Also, with this second harness cover portion 6U2, a loosely insertable portion 6U2a having a shape capable of passing through the opened portion of the first harness cover portion 6U1 and also loosely inserting into the inner hollow portion 6U1c is provided to a portion equivalent to one face of six faces making up the rectangular parallelepiped. This loosely insertable portion 6U2a has a rectangular cylindrical shape of which the two face sides orthogonal to the disposed face of the second harness cover portion 6U2 are generally completely opened, and also has cylinder length where this loosely insertable portion 6U2a protrudes as to the disposed face of the second harness cover portion 6U2 by predetermined length. Note that, even in the event that the personal digital assistant 1 according to the present embodiment is set to, for example, various states such as the above FIGS. 1 through 5, the cylinder length of this loosely insertable portion 6U2a is set to a predetermined length whereby the tip of this loosely insertable portion 6U2a is prevented from being dropped out from the opened portion of the first harness cover portion 6U1, and also prevented from running into the inner wall face of the first harness cover portion 6U1.

Also, with the second harness cover portion 6U2, a circular hole portion 6U2b to which the cylinder portion 6U23b of the second turning lid portion 6U23 is loosely fixed so as to be turned is provided to one face side orthogonal to the disposed face of the loosely insertable portion 6U2a, and a cylinder portion 6U2d is disposed to the other face side. The cylinder portion 6U2d is provided so that the cylinder axial direction thereof is orthogonal to the disposed face of the second harness cover portion 6U2, and is also provided so as to protrude from this disposed face toward the outside. That is to say, the inner hollow portion 6U2c of the second harness cover portion 6U2 is connected to external space via the rectangular intra-cylinder space of the loosely insertable portion 6U2a, and also connected to external space via the intra-cylinder space of the cylinder portion 6U2d. Note that, with the loosely insertable portion 6U2a, a face side corresponding to the cylinder portion 6U2d may be opened. With the present embodiment, the inner hollow portion 6U2c of the second harness cover portion 6U2, the rectangular intra-cylinder space of the loosely insertable portion 6U2a, and the intra-cylinder space of the cylinder portion 6U2d are provided to lay the harness 15b for electrically connecting the second casing 3 and the third casing 4.

The circular hole portion 6U2b is provided to the face side of the opposite side mutually corresponding to the disposed face of the cylinder portion 6U2d, and the center axis of the hole portion thereof is orthogonal to the disposed face of the second harness cover portion 6U2. Note that the cylinder shaft of the cylinder portion 6U2d is disposed so as to match the center axis of the circular hole portion 6U2b. Also, the circular hole portion 6U2b may be connected to the inner hollow portion 6U2c of the second harness cover portion 6U2, or may be provided as a hollow portion on the disposed face of the second harness cover portion 6U2 without connecting to the inner hollow portion 6U2c.

This second harness cover portion 6U2 is stored in a second harness cover storage portion 18c provided to the side wall face serving as the second casing 3 side of the long side edge portion 18 of the third casing 4. This second harness cover storage portion 18c includes a cylinder through-hole portion 6U28 into which the cylinder portion 6U2d of the second harness cover portion 6U2 is inserted so as to turn in the cylinder shaft turning direction thereof, and also includes space sufficient for enabling the second harness cover portion 6U2 to be turned. Also, the cylinder through-hole portion 6U28 also has a role for guiding the harness 15b electrically connected to the inner circuit substrate of this third casing 4 to the outside.

Also, an interposition mounting portion 14 for interposition mounting of the second harness cover portion 6U2 in a state in which the cylinder portion 6U2d is inserted into the cylinder through-hole portion 6U28 via the second turning lid portion 6U23 so as to be turned is provided to the long side edge portion 18 of the third casing 4. This interposition mounting portion 14 has generally the same lateral length as the short length of the third casing 4, and also has a generally rectangular plate shape generally having the same vertical length as the thickness of the third casing 4, and also includes a cylinder insertion portion 14a to which the cylinder portion 6U23a of the second turning lid portion 6U23 is loosely fixed so as to be turned. Also, this interposition mounting portion 14 is fixed to the long side edge portion 18 of the third casing 4 via fixing screws 44 and 45. In addition, the interposition mounting portion 14 also includes a slot portion 14d into which a decorative laminated sheet 14c, for preventing the screw-thread head portions of the fixing screws 44 and 45 and the cylinder insertion portion 14a from being exposed, is fitted.

In this way, with the present embodiment, the second harness cover portion 6U2 is stored in the second harness cover storage portion 18c of the long side edge portion 18 of this third casing 4 in a state in which the cylinder portion 6U2d is inserted into the cylinder through-hole portion 6U28, and further, the circular hole portion 6U2b is mounted in an interpositioned manner on the interposition mounting portion 14 via the second turning lid portion 6U23 so as to be turned. Also, the harness 15b electrically connected to the inner circuit substrate of the third casing 4 is disposed in the inner space of the second harness cover portion 6U2, passing through the cylinder inner space of the cylinder portion 6U2d inserted into the cylinder through-hole portion 6U28.

As described above, according to the personal digital assistant 1 according to the present embodiment, the inner circuit substrate of the second casing 3, and the inner circuit substrate of the third casing 4 are electrically connected by the harness 15b via the inner space of each of the first harness cover portion 6U1 and the second harness cover portion 6U2. Also, according to the personal digital assistant 1 according to the present embodiment, the first harness cover portion 6U1 and the second harness cover portion 6U2 are each capable of turning in the cylinder shaft turning direction within the corresponding the first harness cover storage portion 17c2 and the second harness cover storage portion 18c. Further, according to the present embodiment, the loosely insertable portion 6U2a of the second harness cover portion 6U2 is loosely inserted into the opened portion of the first harness cover portion 6U1. Similarly, according to the personal digital assistant 1 according to the present embodiment, the inner circuit substrate of the first casing 2, and the inner circuit substrate of the second casing 3 are electrically connected by the harness 15a via the inner space of each of the first harness cover portion 5U1 and the second harness cover portion 5U2. Also, according to the personal digital assistant 1 according to the present embodiment, the first harness cover portion 5U1 and the second harness cover portion 5U2 are capable of turning in the cylinder shaft turning direction within the corresponding first harness cover storage portion 16c and the second harness cover storage portion 17c1, respectively. Further, according to the present embodiment, the loosely insertable portion 5U2a of the second harness cover portion 5U2 is loosely inserted in the opened portion of the first harness cover portion 5U1. Therefore, even when relative distance between the first harness cover portion 5U1 and the second harness cover portion 5U2 is changed to, for example, an arrow Y direction in FIG. 9 by this personal digital assistant 1 being set to various states such as the above FIGS. 1 through 5, the harness 15a is not externally exposed. This is also the same between the first harness cover portion 6U1 and the second harness cover portion 6U2, even when relative distance between the first harness cover portion 6U1 and the second harness cover portion 6U2 is changed, the harness 15b is not externally exposed.

Also, with the personal digital assistant 1 according to the present embodiment, the first tension element portion 6D8 is configured of a generally rectangular-parallelepiped-shaped magnet portion 6D8a made up of, for example, a neodymium magnet, and sheet-metal portions 6D8b and 6D8c made up of, for example, ferromagnetic such as SUS430 or the like. The sheet-metal portions 6D8b and 6D8c are disposed so as to sandwich the magnetic portion 6D8a between the N pole side and the S pole side. Also, the sheet-metal portions 6D8b and 6D8c include, on a predetermined one edge portion, magnetic-flux concentration portions 6D8d and 6D8e for concentrating the magnetic flux of the magnetic portion 6D8a on the sheet-metal edge face of this edge portion, respectively.

Similarly, the second tension element portion 6D9 is configured of a generally rectangular-parallelepiped-shaped magnet portion 6D9a made up of, for example, a neodymium magnet, and sheet-metal portions 6D9b and 6D9c made up of, for example, ferromagnetic such as SUS430 or the like. The sheet-metal portions 6D9b and 6D9c are disposed so as to sandwich the magnetic portion 6D9a between the N pole side and the S pole side. Also, the sheet-metal portions 6D9b and 6D9c include, on a predetermined one edge portion, magnetic-flux concentration portions 6D9d and 6D9e for concentrating the magnetic flux of the magnetic portion 6D9a on the sheet-metal edge face of this edge portion, respectively.

With the present embodiment, these first tension element portion 6D8 and second tension element portion 6D9 are disposed so that the magnetic pole directions thereof are determined so as to be mutually adsorbed. Note that the magnetic portions of these tension element portions are not restricted to the above neodymium magnet, and also the sheet-metal portions are not restricted to the above SUS430, may be other materials. Also, the first tension element portion 6D8 and second tension element portion 6D9 may be configured of any other material, such as an electromagnet to be driven so as to generate desired adsorption power only in the terminal opened state and the terminal closed state, a tension spring for generating desired tension force only in the terminal opened state and the terminal closed state, or the like. Note that the first tension element portion 5D8 and the second tension element portion 5D9 are configured in the same way as with the first tension element portion 6D8 and the second tension element portion 6D9.

Also, with the present embodiment, the first tension element cover portion 6D1 has a generally rectangular parallelepiped shape of which the inner portion is a hollow portion 6D1c. Also, with this first tension element cover portion 6D1, a portion equivalent to one face of six faces making up the rectangular parallelepiped is completely opened, and the tension element portion 6D8 is configured so as to be stored in the inner portion of the hollow portion 6D1c via this opened portion. Also, with the first tension element cover portion 6D1, a hole portion is provided to the wall face 6D1e of the opposite side mutually corresponding to the opened portion of the six faces making up the rectangular parallelepiped, which protrudes the sheet metal edge face portions 6D8d and 6D8e of the tension element portion 6D8 in a state stored in the hollow portion to the outside, and also into which a later-described loosely insertable portion 6D2a of the second tension element cover portion 6D2 is loosely inserted. Also, with the present embodiment, in the event that the first tension element portion 6D8 is stored in the inner portion of the hollow portion 6D1c of the first tension element cover portion 6D1, the opened portion is closed by a lid portion 6D13.

Also, at the time of a state in which the first tension element portion 6D8 is stored in the inner portion of the first tension element cover portion 6D1, of the inner wall faces of the hollow portion 6D1c of the first tension element cover portion 6D1, a predetermined gap is provided between each of the other inner wall faces except for the lid portion 6D13 and the wall face 6D1e which are provided to the opened portion, and the first tension element portion 6D8.

Also, with this first tension element cover portion 6D1, a cylinder portion 6D1b is provided to one face side orthogonal to the wall face 6D1e. The cylinder portion 6D1b is provided so that the cylinder shaft direction thereof is orthogonal to the disposed face of the first tension element cover portion 6D1, and also so as to protrude from this disposed face to the outer direction. Also, with the first tension element cover portion 6D1, a cylinder portion 6D1d is provided to the face side of the opposite side mutually corresponding to the disposed face of the cylinder portion 6D1b. This cylinder portion 6D1d is provided so that the cylinder shaft direction thereof is orthogonal to the disposed face of the first tension element cover portion 6D1, and also so as to protrude from this disposed face to the outer direction. Note that the cylinder shaft of the cylinder portion 6D1b, and the cylinder shaft of the cylinder portion 6D1d are disposed so as to match.

This first tension element cover portion 6D1b is stored in the first tension element cover storage portion 22c provided to the side wall face serving as the third casing 4 side of the long side edge portion 22 of the second casing 3. With this tension element cover storage portion 22c, the cylinder portion 6D1b of the first tension element cover portion 6D1 includes a cylinder through-hole portion 6D27 into which the cylinder portion 6D1b of the first tension element cover portion 6D1 is inserted so as to turn to the cylinder shaft turning direction, and also includes space sufficient for enabling the first tension element cover portion 6D1 to turn.

Also, provided to the long side edge portion 22 is an interposition mounting portion 27 for interposition mounting of the first tension element cover portion 6D1 in a state in which the cylinder portion 6D1b is inserted into the cylinder through-hole portion 6D27, from the cylinder portion 6D1e side. This interposition mounting portion 27 has generally the same lateral length as the short length of the second casing 3, and also has a generally rectangular plate shape generally having the same vertical length as the thickness of the second casing 3, and also includes a cylinder insertion portion 27a into which the cylinder portion 6D1d of the first tension element cover portion 6D1 is inserted so as to be turned in the cylinder shaft turning direction. Also, this interposition mounting portion 27 is fixed to the long side edge portion 22 of the second casing 3 via fixing screws 52 and 53. In addition, the interposition mounting portion 27 also includes a slot portion 27d into which a decorative laminated sheet 27c for preventing the screw-thread head portions of the fixing screws 52 and 53, and the cylinder insertion portion 27a from being exposed is fitted.

In this way, with the present embodiment, the first tension element cover portion 6D1 is stored in the first tension element cover storage portion 22c of the long side edge portion 22 of this second casing 3 by being interposition mounted by the interposition mounting portion 27 in a state in which the cylinder portion 5D1b is inserted into the cylinder through-hole portion 6D27, and further, the cylinder portion 6D1d is inserted into the cylinder insertion hole portion 27a.

Also, with the present embodiment, the second tension element cover portion 6D2 has a generally rectangular parallelepiped shape of which the inner portion is a hollow portion 6D2c. Also, with this tension element cover portion 6D2, a portion equivalent to one face of six faces making up the rectangular parallelepiped is completely opened, and the tension element portion 6D9 can be stored in the inner portion of the hollow portion 6D2c via this opened portion. With the present embodiment, in the event that the second tension element portion 6D9 is stored in the inner portion of the hollow portion 6D2c of the second tension element cover portion 6D2, the opened portion is closed by the lid portion 6D17.

Also, with the second tension element portion 6D2, a loosely insertable portion 6D2a is provided to the wall face 6D2e of the opposite side mutually corresponding to the opened portion of the six faces making up the rectangular parallelepiped, which protrudes the sheet-metal edge face portions 6D9d and 6D9e of the tension element portion 6D9 in a state stored in the hollow portion to the outside, and is also loosely inserted into the hole portion of the first tension element cover portion 6D1. This loosely insertable portion 6D2a is configured so as to be loosely inserted into a gap between the inner wall face of the first tension element cover portion 6D1, and the first tension element portion 6D8. That is to say, this loosely insertable portion 6D2a has a rectangular cylindrical shape of which the two face sides orthogonal to the disposed face of the second tension element cover portion 6D2 are generally completely opened, and also has cylinder length serving as a predetermined length as to the disposed face of the second tension element cover portion 6D2. Note that, even in the event that the personal digital assistant 1 according to the present embodiment is set to, for example, various states such as the above FIGS. 1 through 5, the cylinder length of this loosely insertable portion 6D2a is set to a predetermined length whereby the tip of this loosely insertable portion 6D2a is prevented from dropping out from the hole portion of the first tension element cover portion 6D1, and also prevented from running into the inner wall face of the first tension element cover portion 6D1.

Further, with the second tension element cover portion 6D2, a cylinder portion 6D2b is provided to one face side orthogonal to the disposed face of the loosely insertable portion 6D2a. The cylinder portion 6D2b is provided so that the cylinder shaft direction thereof is orthogonal to the disposed face of the second tension element cover portion 6D2, and is also provided so as to protrude from this disposed face toward the outside. Note that, with the loosely insertable portion 6D2a, a face side corresponding to the cylinder portion 6D2b may be opened. Also, with this second tension element cover portion 6D2, a cylinder portion 6D2d is provided to the face side of the opposite side mutually corresponding to the disposed face of the cylinder portion 6D2b. This cylinder portion 6D2d is provided so that the cylinder shaft direction thereof is orthogonal to the disposed face of the second tension element cover portion 6D2, and is also provided so as to protrude from this disposed face toward the outside. Note that the cylinder shaft of the cylinder portion 6D2b, and the cylinder shaft of the cylinder portion 6D2d are disposed so as to match.

This second tension element cover portion 6D2 is stored in a second tension element cover storage portion 23c provided to the side wall face serving as the second casing 3 side of the long side edge portion 23 of the third casing 4. This second tension element cover storage portion 23c includes a cylinder through-hole portion 6D28 into which the cylinder portion 6D2b of the second tension element cover portion 6D2 is inserted so as to turn in the cylinder shaft turning direction thereof, and also includes space sufficient for enabling the second tension element cover portion 6D2 to be turned. Also, an interposition mounting portion 28 for interposition mounting of the second tension element cover portion 6D2 in a state in which the cylinder portion 6D2b is inserted into the cylinder through-hole portion 6D28, from the cylinder portion 6D2d side. This interposition mounting portion 28 has generally the same lateral length as the short length of the third casing 4, and also has a generally rectangular plate shape generally having the same vertical length as the thickness of the third casing 4, and also includes a cylinder insertion portion 28a into which the cylinder portion 6D2d of the second tension element cover portion 6D2 is inserted so as to be turned in the cylinder shaft turning direction thereof. Also, this interposition mounting portion 28 is fixed to the long side edge portion 23 of the third casing 4 via fixing screws 54 and 55. In addition, the interposition mounting portion 28 also includes a slot portion 28d into which a decorative laminated sheet 28c for preventing the screw-thread head portions of the fixing screws 54 and 55, and the cylinder insertion portion 28a from being exposed is fitted.

In this way, with the present embodiment, the second tension element cover portion 6D2 is stored in the second tension element cover storage portion 23c of the long side edge portion 23 of this third casing 4 by being interposition mounted by the interposition mounting portion 28 in a state in which the cylinder portion 6D2b is inserted into the cylinder through-hole portion 6D28, and further, the cylinder portion 6D2d is inserted into the cylinder insertion hole portion 28a.

As described above, according to the personal digital assistant 1 according to the present embodiment, the first tension element cover portion 6D1 and the second tension element cover portion 6D2 are configured so as to be turned in the cylinder shaft turning direction within the corresponding first tension cover storage portion 22c and second tension element cover storage portion 23c, respectively. Also, according to the present embodiment, the loosely insertable portion 6D2a of the second tension element cover portion 6D2 is loosely inserted into the hole portion of the first tension element cover portion 6D1, and accordingly, even in the event that relative distance between the first tension element cover portion 6D1 and the second tension element cover portion 6D2 is changed by the personal digital assistant 1 according to the present embodiment being set to, for example, various states such as the above FIGS. 1 through 5, the first tension element cover portion 6D1 and the second tension element cover portion 6D2 are not separated in appearance.

Further, according to the personal digital assistant 1 according to the present embodiment, with the first tension element portion 6D8 within the first tension element cover portion 6D1, and the second tension element portion 6D9 within the second tension element cover portion 6D2, the magnetic pole directions thereof are directed to a mutually adsorbed direction, and also the magnetic flux is concentrated on the plate metal edge faces which mutually face. Accordingly, when this personal digital assistant 1 is, for example, in the terminal closed state such as FIG. 3 or the terminal opened state such as FIG. 5, distance between the first tension element cover portion 6D1 and the second tension element cover portion 6D2 becomes smaller, and accordingly, as illustrated in FIGS. 20 through 24, the first tension element portion 6D8 and the second tension element portion 6D9 are completely adsorbed, and the terminal closed state or terminal opened state can be maintained by the adsorption power thereof. Particularly, in the case of the present embodiment, as described above, the first tension element portion 6D8 and the second tension element portion 6D9 are configured so as to concentrate the magnetic flux on the plate metal edge faces respectively, and the maximum adsorption power can be generated with limited volume, and accordingly, the maximum adsorption power can be generated at the time the distance between the first tension element portion 6D8 and the second tension element portion 6D9 being the minimum. Also, with the present embodiment, when this personal digital assistant 1 is in a state such as FIG. 1, 2, or 4, the adsorption power between the first tension element cover portion 6D1 and the second tension element cover portion 6D2 weakens due to the distance between the first tension element cover portion 6D1 and the second tension element cover portion 6D2 increasing, and the user can readily change this terminal 1. Further, with the present embodiment, in the event that this personal digital assistant 1 gradually changes from the state such as FIG. 1, 2, or 4 to the terminal closed state in FIG. 3 or the terminal opened state in FIG. 5, the distance between the first tension element cover portion 6D1 and the second tension element cover portion 6D2 gradually becomes smaller, and accordingly, the adsorption power between the first tension element portion 6D8 and the second tension element portion 6D9 gradually increases, and finally, the adsorption power drastically increases when reaching the terminal closed state or terminal opened state, whereby a simulated fixing sensation such as a click sensation or snapping sensation can be provided to the user. Conversely, in the event that this personal digital assistant 1 gradually changes from the terminal closed state in FIG. 3 or the terminal opened state in FIG. 5 to the state such as FIG. 1, 2, or 4, the distance between the first tension element cover portion 6D1 and the second tension element cover portion 6D2 increases, and thus, the adsorption power between the first tension element portion 6D8 and the second tension element portion 6D9 drastically weakens, whereby a simulated fixing wide-open sensation can be provided to the user.

Also, according to the present embodiment, with the first tension element cover portion 5D1 and the second tension element cover portion 5D2 as well, in the same way as described above, even in the event that relative distance between the first tension element cover portion 5D1 and the second tension element cover portion 5D2 is changed by the opening/closing operation of the personal digital assistant 1, the first tension element cover portion 5D1 and the second tension element cover portion 5D2 are not separated in appearance. Further, according to the personal digital assistant 1 according to the present embodiment, when the personal digital assistant 1 is in the state in FIG. 3 or FIG. 5, the first tension element portion 5D8 of the first tension element cover portion 5D1, and the second tension element portion 5D9 of the second tension element cover portion 5D2 are completely adsorbed, and the terminal closed state or terminal opened state can be maintained by the adsorption power thereof, and also the maximum adsorption power can be generated when the distance between the first tension element portion 5D8 and the second tension element portion 5D9 is the minimum. Also, with the present embodiment, when this personal digital assistant 1 is in a state such as FIG. 1, 2, or 4, the adsorption power between the first tension element portion 5D8 of the first tension element cover portion 5D1, and the second tension element portion 5D9 of the second tension element cover portion 5D2 weakens, and the user can readily change this terminal 1. Further, with the present embodiment, in the event that this personal digital assistant 1 gradually changes from the state such as FIG. 1, 2, or 4 to the state in FIG. 3 or FIG. 5, the adsorption power between the first tension element portion 5D8 of the first tension element cover portion 5D1, and the second tension element portion 5D9 of the second tension element cover portion 5D2 gradually increases, and finally, the adsorption power drastically increases, whereby a simulated fixing sensation such as a click sensation or snapping sensation can be provided to the user. Conversely, in the event that this personal digital assistant 1 gradually changes from the state in FIG. 3 or FIG. 5 to the state such as FIG. 1, 2, or 4, the adsorption power between the first tension element portion 5D8 of the first tension element cover portion 5D1, and the second tension element portion 5D9 of the second tension element cover portion 5D2 drastically weakens, whereby a simulated fixing wide-open sensation can be provided to the user.

State Detection Sensors of Terminal and Layout Example Thereof

The personal digital assistant 1 according to the present embodiment includes various types of detection sensors for detecting the state of the terminal thereof. The personal digital assistant 1 according to the present embodiment includes, as examples of terminal state detection sensors, an opening/closing detection sensor, a horizontal/vertical detection sensor, a direction detection sensor, a position detection sensor, an acceleration detection sensor, a temperature detection sensor, a humidity detection sensor, an optical detection sensor, an infrared sensor, and further other various sensors.

Note that the opening/closing detection sensor is a sensor for detecting whether the state of this personal digital assistant 1 is in which state, for example, of the terminal closed state in FIG. 3, or the terminal opened state of FIG. 1, 2, 4, or 5, and a sensor made up of a magnet and a hole element or MR (magnetoresistive element), i.e., a limit switch can be exemplified, for example. For example, in the event of employing an opening/closing detection sensor made up of a magnet and a hole element, which can be disposed in a place as illustrated in FIG. 25 as an example.

Figure 25:
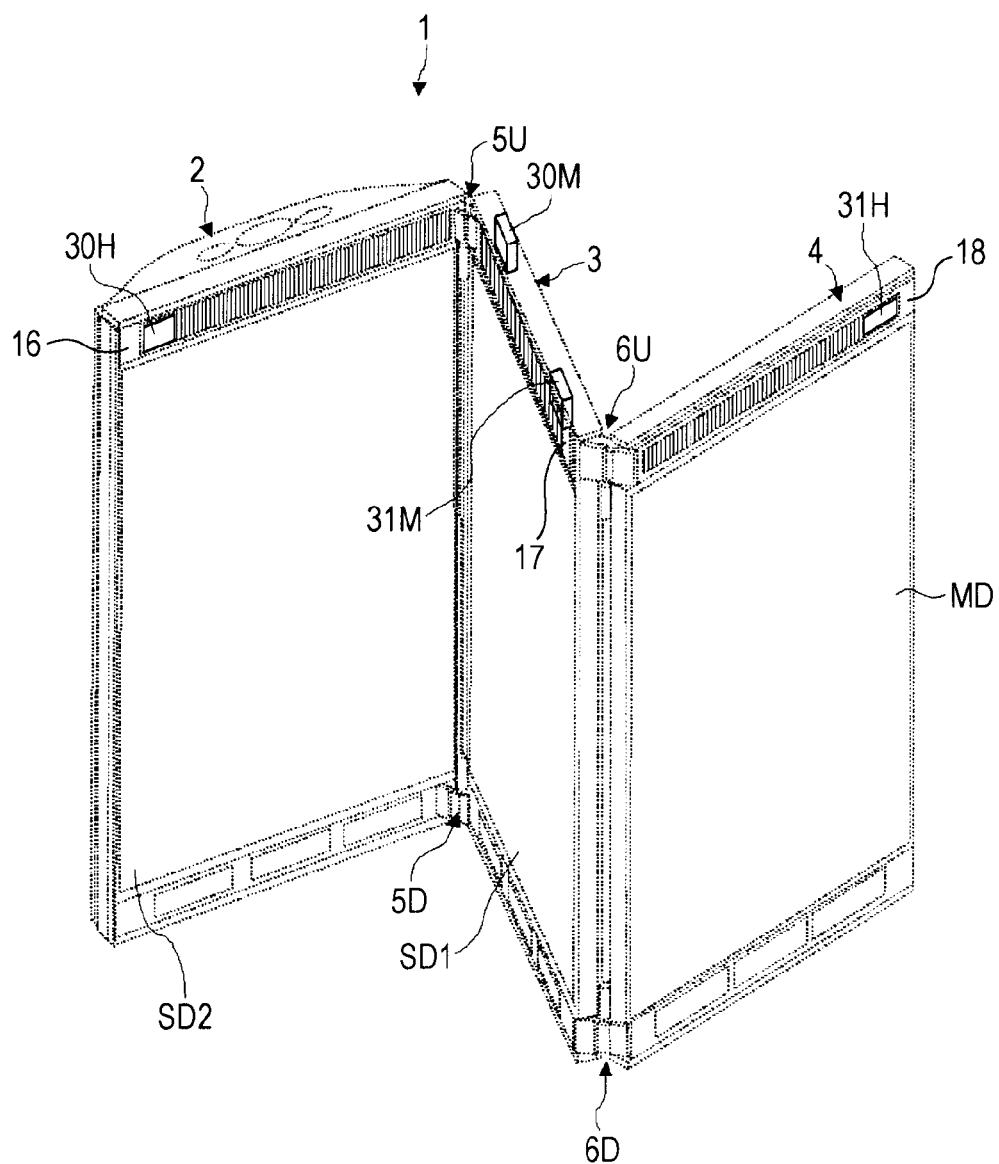
FIG. 25 is a diagram used for description of a layout example of a magnet and a hole element which are an example of an opening/closing detection sensor included in the personal digital assistant according to the present embodiment.

With the example in FIG. 25, as for opening/closing detection between the first casing 2 and the second casing 3, a magnet 31M is disposed in a predetermined position of the long side edge portion 17 of the second casing 3, and also a hole element 30H is disposed in a position on the first casing 2 which mutually corresponds to the magnet 31M when both display panels of the first casing 2 and the second casing 3 fully face and are generally completely overlaid. That is to say, a signal obtained from the hole element 30H differs between a state in which both display panels of the first and second casings 2 and 3 mutually fully face, and a state other than that state, whereby the personal digital assistant 1 according to the present embodiment can detect the opened/closed state between the first casing 2 and the second casing 3 by referring to the signal from this hole element 30H. Similarly, as for opening/closing detection between the second casing 3 and the third casing 4, a magnet 30M is disposed in a predetermined position of the long side edge portion 17 of the second casing 3, and also a hole element 31H is disposed in a position on the third casing 4 which mutually corresponds to the magnet 30M when both texture panels of the second casing 3 and the third casing 4 fully face and are generally completely overlaid. That is to say, a signal obtained from the hole element 31H differs between a state in which both texture panels of the second and third casings 3 and 4 mutually fully face, and a state other than that state, whereby the personal digital assistant 1 according to the present embodiment can detect the opened/closed state between the second casing 3 and the third casing 4 by referring to the signal from this hole element 31H.

Also, for example, as for the horizontal/vertical detection sensor, a gravity sensor or acceleration sensor or the like can be employed, and as for the direction detection sensor, a magnetic field sensor or the like, and as for the position detection sensor, a GPS sensor or the like can be employed.

These various types of sensors may be provided to any one casing of the first through third casings 2 through 4, or may be provided to all casings of the first through third casings 2 through 4, or any two casings thereof. As an example, in the event that a horizontal/vertical detection sensor is provided to all casings of the first through third casings 2 through 4, or an acceleration sensor is provided to all casings, detection of horizontal/vertical or acceleration or the like can be performed for each casing, whereby particular terminal control according to that, or the like can be performed.

Control Example of Terminal Operation According to Terminal State Detection

The personal digital assistant 1 according to the present embodiment is configured so as to perform various types of terminal operation control which will be described later based on the detection results by the terminal state detection sensors. Note that terminal operation control examples described below are only an example, and it goes without saying that embodiments of the present disclosure are not restricted to these alone.

First Operation Control Example

Figure 26:
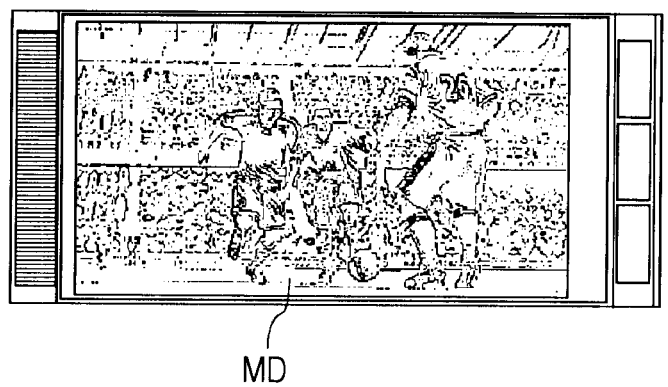
FIG. 26 is a diagram used for description of an operation control example based on the detection result of a terminal state detection sensor, and is a view illustrating an example wherein a landscape video of an aspect ratio of 16:9 as viewed from the user is displayed on the main display panel in the terminal closed state.
Figure 27:
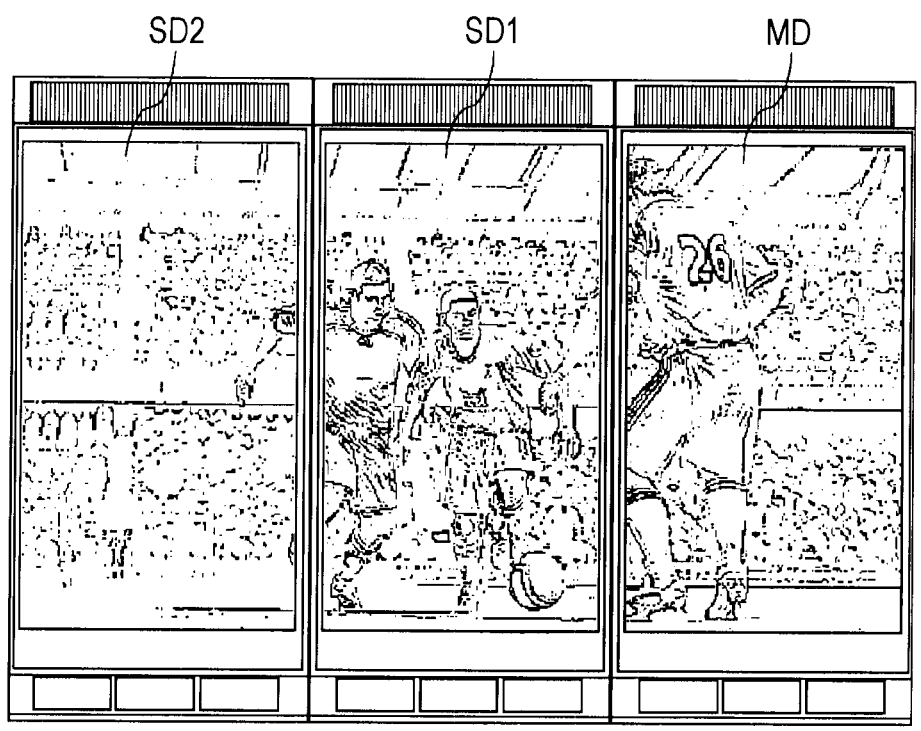
FIG. 27 is a diagram used for description of an operation control example based on the detection result of the terminal state detection sensor, and is a view illustrating an example wherein a video of an aspect ratio of 16:9 is displayed enlarged on three screens of display panels in the terminal opened state.

FIGS. 26 and 27 illustrate a display control example according to the opened/closed state of the terminal as a first operation control example based on the detection result of the terminal state detection sensor.

This first operation control example illustrates a control example wherein, for example, in the event of displaying a television broadcasting video or recording/playback video or the like corresponding an aspect ratio of 16:9, the personal digital assistant 1 according to the present embodiment displays this video on one screen alone of the main display panel MD in the terminal closed state, and on the other hand, at the time of being changed to the terminal opened state, the video thereof is enlarged and displayed using the three screen of the main, first sub, and second sub display panels MD, SD1, and SD2.

Specifically, with this first operation control example, upon detecting transition from the terminal closed state to the terminal opened state based on the detection result of the terminal state detection sensor, the personal digital assistant 1 according to the present embodiment divides the video of an aspect ratio of 16:9 displayed in the terminal closed state into three as to the long direction thereof, which will be described later. The three divided videos obtained by this division into three are videos of which the aspect ratios correspond to generally 9:16. Also, the personal digital assistant 1 according to the present embodiment at this time enlarges these three divided videos to the size of a display panel of one screen. Also, with the personal digital assistant 1 according to the present embodiment, these three divided enlarged videos are distributed and displayed on the main, first sub, second sub display panels MD, SD1, and SD2. Note that division may be performed after enlargement of an image. That is to say, after enlargement of a video is performed, the enlarged image thereof may be divided into three.

In the case of the examples in FIGS. 26 and 27, the personal digital assistant 1 displays the divided enlarged video corresponding to the central portion of the video before division illustrated in FIG. 26 on the screen of the first sub display panel SD1, the left-side divided enlarged video of the video before division on the screen of the second sub display panel SD2, and the right-side divided enlarged video of the video before division on the screen of the main display panel MD.

Note that, in FIGS. 26 and 27, an example is illustrated wherein in the terminal closed state, a landscape video corresponding to an aspect ratio of 16:9 is displayed with the long direction of the main display panel MD as level, and in the terminal opened state, a landscape enlarged video corresponding to an aspect ratio of generally 16:9 is displayed by arraying the three screens in the horizontally lateral direction as viewed from the user. It goes without saying that an example is also the same as with the above wherein in the terminal closed state, a portrait video corresponding to an aspect ratio of 9:16 is displayed with the long direction of the main display panel MD as perpendicular, and in the terminal opened state, a portrait enlarged video corresponding to an aspect ratio of generally 9:16 is displayed by arraying the three screens in the vertically longitudinal direction as viewed from the user. Also, with the present embodiment, in the event that an enlarged video is displayed on the three screens in the terminal opened state, when transition is made from the terminal opened state thereof to the terminal closed state, the personal digital assistant 1 returns to video display using just the one screen of the main display panel MD in the terminal closed state.

Also, in addition to the above-described terminal opened/closed state transition detection, the personal digital assistant 1 according to the present embodiment may perform operation control such as switching to enlarged display of the three screens from the one screen only at the time of transition of the horizontal/vertical state of this terminal based on detection output of, for example, a horizontal/vertical detection sensor, direction detection sensor, acceleration sensor, or the like. That is to say, in this case, for example, an arrangement may be made wherein in the event that the personal digital assistant 1 in the terminal closed state is a landscape screen as viewed from the user, the enlarged display to the three screens is performed only at the time of detecting that the array of the three screens at the time of this terminal opened state is changed to the horizontally lateral direction along with transition to the terminal opened state. Similarly, for example, an arrangement may be made wherein in the event that the personal digital assistant 1 in the terminal closed state is a portrait screen as viewed from the user, the enlarged display to the three screens is performed only at the time of detecting that the array of the three screens at the time of this terminal opened state is changed to the vertically longitudinal direction along with transition to the terminal opened state. Note that the case of transition from the terminal opened state to the terminal closed state is also the same as with the above, i.e., in addition to this transition of the terminal opened/closed state, based on the detection result of transition of the terminal horizontal/vertical state before and after the state transition thereof, operation control may be performed such as switching from the three-screen enlarged display to one-screen display.

As for a user's usage example in the first operation control example such as described above, for example, a case can be exemplified wherein at the time of a large screen being afraid of being viewed such as under train boarding, viewing is performed by one-screen display in the terminal closed state, and then transition to the terminal opened state is performed when viewing with a large screen is available after getting off the train, thereby performing viewing with the three-screen enlarged display. In the event of such a usage, the user can view a video even under movement by a train, and view the video by a large screen immediately after getting off the train. Also, in the event of this usage, a video to be displayed is not interrupted even with a moment for transition from the terminal closed state to the terminal opened state. Therefore, the user can view, even with a moment for a video being enlarged, the video without looking aside from the video thereof.

Details of Image Division and Enlarged Display at the Time of Three-screen Display Hereafter, description will be made regarding division of an image such as described above, and details at the time of these three divided images being enlarged, distributed, and displayed on the main, first sub, and second sub display panels MD, SD1, and SD2, with reference to FIGS. 28 through 32.

With the present embodiment, as for a technique for image division and enlarged display at the time of three-screen display, the following first through third dividing and enlarging methods will be described.

Now, for example, let us say that the long size of the original image is 16q mm, and the short size is 9q mm, and the long size of an image enlarged in accordance with display formed by the three display panels in the terminal opened state is 16r mm, and the short size is 9r mm. Note that the q and r are coefficients determined by the actual display sizes, respectively.

The first dividing and enlarging method is a technique in the event that dividing and enlarging of an image is performed so as to satisfy relationship illustrated in Expression (1). Specifically, this first dividing and enlarging method is a technique for enlarging a divided image so as to match the size of the short direction of the original image to the sizes of the long directions of the display panels, i.e., the size of the short direction of display formed by the three display panels in the terminal opened state.

$$16q=9r \qquad (1)$$

In the event that the relationship of this Expression (1) is satisfied, the scale of an enlarged image as to the original image is as illustrated in Expression (2).

$$16r/16q=r/q=16/9=1.78 \text{ (times)} \qquad (2)$$

Also, the first dividing and enlarging method prevents an image equivalent to the geometric frame width (s) between the display panels MD, SD1, and SD2 in the terminal opened state from being displayed. Therefore, with this first dividing and enlarging method, the original image is divided into three with the percentage illustrated in FIG. 28, and then enlarged to 1.78 times.

Figure 28:
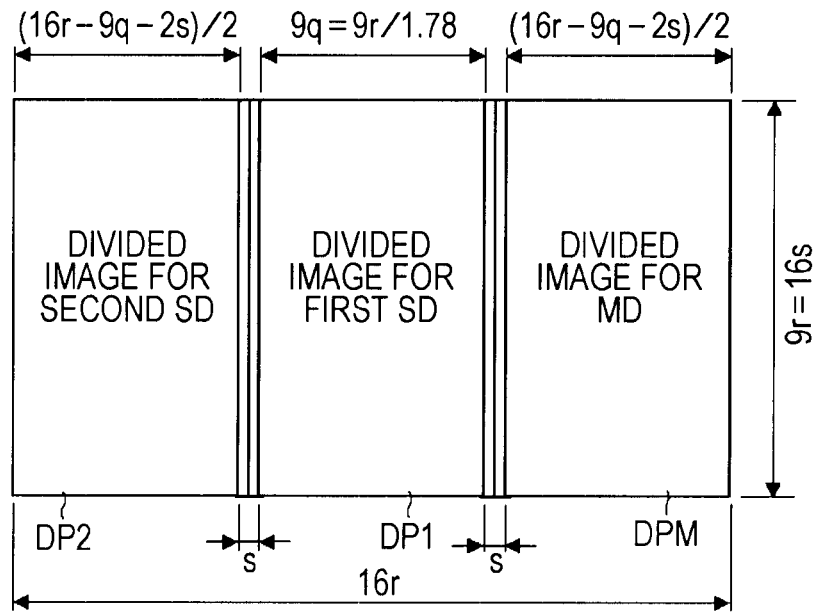
FIG. 28 is a diagram used for description of a division percentage at the time of diving the original image into three by a first dividing and enlarging method while preventing an image equivalent to a geometric frame width between three display panels from being displayed in the terminal opened state.

Specifically, as illustrated in FIG. 28, with the original image, regarding the long direction, the central portion thereof is divided with the percentage illustrated in Expression (3), a portion serving as the left side as to the central portion thereof is divided with the percentage illustrated in Expression (4), and a portion serving as the right side as to the central portion is divided with the percentage illustrated in Expression (5).

$$9q=9r/1.78 \quad (3)$$

$$(16r-9q-2s)/2 \quad (4)$$

$$(16r-9q-2s)/2 \quad (5)$$

Subsequently, with this first diving and enlarging method, these divided images are distributed and displayed on, for example, the three display panels MD, SD1, and SD2 in the terminal opened state.

Figure 29:
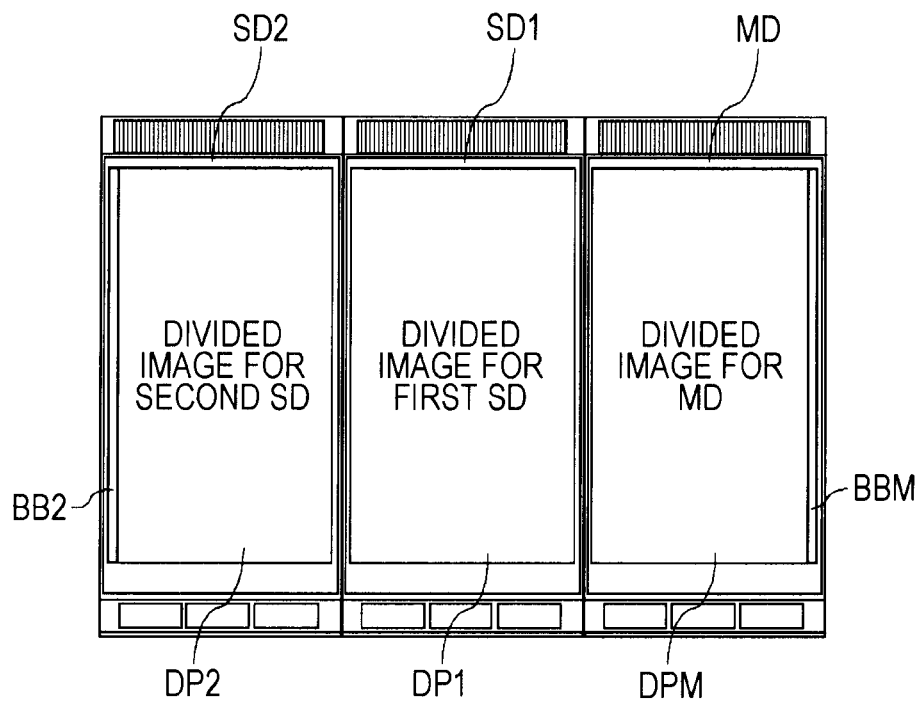
FIG. 29 is a diagram used for description of each divided enlarged image and a black belt image at the time of displaying images obtained by dividing the original image into three and enlarged using the first dividing and enlarging method, on the three display panels.

However, in the event that the above frame width (s) is prevented from being sufficiently reduced in respect of the configuration of the personal digital assistant 1 according to the present embodiment, and this frame width (s) is great to some extent, the geometric size of the long direction of a display made up of the three display panels in the terminal opened state does not match the size on the long side of the enlarged image. In this case, the personal digital assistant 1 according to the present embodiment displays, for example, a black belt image or the like on both edge portions on the long side of the enlarged image. Specifically, the personal digital assistant 1 according to the present embodiment displays, as illustrated in FIG. 29, a black belt image BBM on the edge portion on the main display panel MD side for example, and similarly displays a black belt image BB2 on the edge portion on the second sub display panel SD2 side.

Note that, in the event that the above frame width (s) is sufficiently small, and the relationship in Expression (6) is satisfied for example, the personal digital assistant 1 according to the present embodiment displays the enlarged image without using the above black belt image.

$$9q=(16r-9q-2s)/2, \text{ i.e., } s=(^{13}/_{32})r \quad (6)$$

According to the first dividing and enlarging method, dividing an enlarging of an image is performed so as to satisfy the relationship illustrated in the above Expression (1), and accordingly, the size of the short direction of the original image can match the size of the long direction of a display panel. Also, according to the first dividing and enlarging method, an image equivalent to the geometric frame width (s) between the three display panels in the terminal opened state is prevented from being displayed, and accordingly, the image displayed on the three display panels is an eye-friendly image of which the content linkage is intact. Also, according to the first dividing and enlarging method, the aspect ratio of the enlarged image of the original image is generally maintained by displaying a black belt image or the like on both edge portions on the long side of the enlarged image. Also, according to the first dividing and enlarging method, particularly in the event that the frame width (s) is sufficiently small, and the relationship of Expression (6) is satisfied, the enlarged image including no black belt image can be displayed.

Next, the second dividing and enlarging method is how to determine a division percentage and an enlargement scale in the event that the above frame width (s) and the above coefficient (r) have the relationship of Expression (7), i.e., in the event that the above frame width (s) is smaller than a predetermined size based on the above coefficient (r). Note that, with this second dividing and enlarging method as well, in the same way as with the first dividing and enlarging method, an image equivalent to the geometric frame width (s) between the display panels MD, SD1, and SD2 in the terminal opened state is not displayed.

$$s<(^{13}/_{32})r \quad (7)$$

Figure 32:
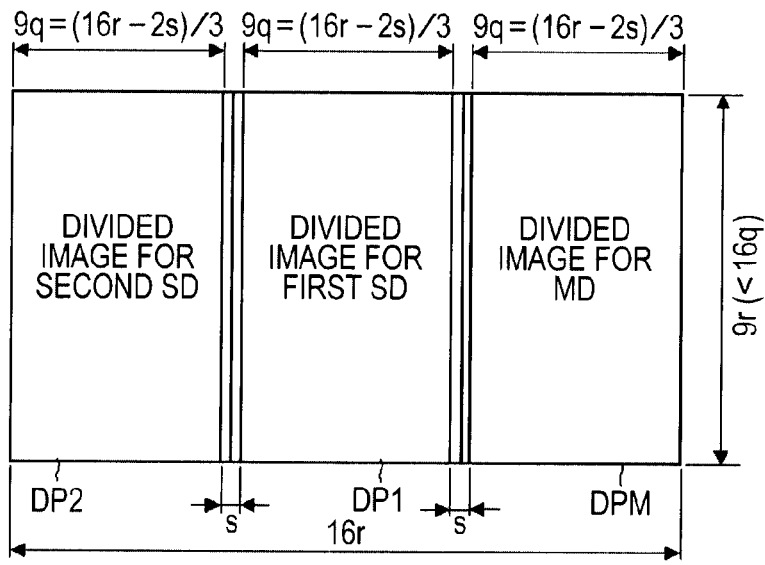
FIG. 32 is a diagram used for description of a division percentage at the time of dividing the original image into three using the second dividing and enlarging method.

With this second dividing and enlarging method, the original image is divided with the percentage illustrated in FIG. 32. Specifically, as illustrated in FIG. 32, the original image is divided into three with the percentage illustrated in Expression (8) regarding each of the long directions.

$$9q=(16r-2s)/3 \quad (8)$$

Also, with this second dividing and enlarging method, the scale at the time of enlargement of each of the divided images is represented by Expression (9) using a coefficient (q) determined by the actual display size. In the case of this Expression (9), the above scale is around 1.69 times when s=0, for example.

$$r/q=27/16+s/8q \quad (9)$$

Figure 31:
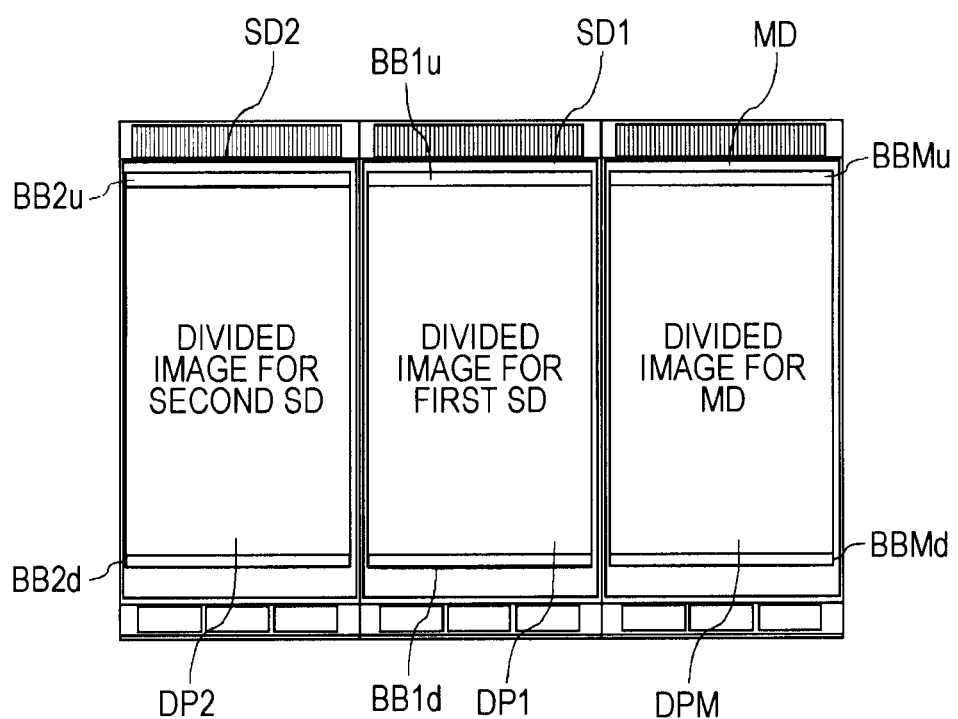
FIG. 31 is a diagram used for description of each divided enlarged image and a black belt image at the time of displaying images obtained by dividing the original image into three and enlarged using a second dividing and enlarging method and the third dividing and enlarging method, on the three display panels.

Subsequently, with this second dividing and enlarging method, the above divided images are enlarged based on the above scale. Note that, in the case of this second dividing and enlarging method, the sizes of the three display panels in the terminal opened state do not match the sizes of the short sides of the above enlarged image. In this case, the personal digital assistant 1 according to the present embodiment displays, for example, a black belt image or the like on both edge portions on the short sides of the enlarged image. Specifically, the personal digital assistant 1 according to the present embodiment displays, as illustrated in FIG. 31, a black belt image BB2u on the upper side edge portions of the three display panels MD, SD1, and SD2, and similarly displays a black belt image BB2d on the lower side edge portions, for example.

According to this second dividing and enlarging method, image division is performed with trisected division, and accordingly, the load of processing at the time of division is lighter. Also, according to the second dividing and enlarging method, an image equivalent to the geometric frame width (s) between the three display panels is not displayed, and accordingly, the image displayed on the three display panels is an eye-friendly image of which the content linkage is intact. Also, according to the second dividing and enlarging method, the aspect ratio of the enlarged image of the original image can generally be maintained by displaying a black belt image or the like on the upper and lower edge portions on the short sides of the enlarged image.

Next, the third dividing and enlarging method is how to determine a division percentage and an enlargement scale in the event that an image equivalent to the geometric frame width (s) between the three display panels in the terminal opened state is not displayed.

Figure 30:
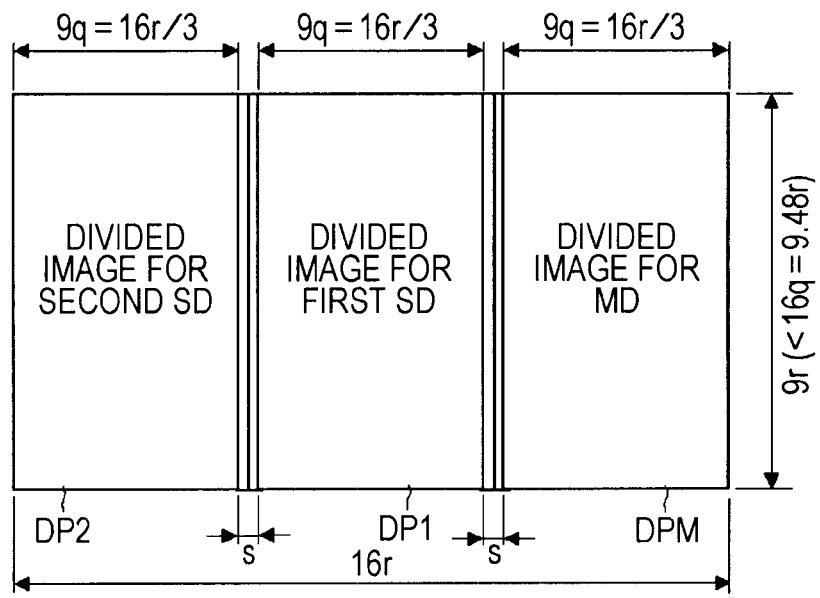
FIG. 30 is a diagram used for description of a division percentage at the time of dividing the original image into three using a third dividing and enlarging method.

In the case of this third dividing and enlarging method, the original image is divided into three with the percentage illustrated in FIG. 30. Specifically, as illustrated in FIG. 30, the original image is divided into three with the percentage illustrated in Expression (10) regarding each of the long directions.

$$91q=16r/3 \quad (10)$$

Also, with this third dividing and enlarging method, the scale at the time of enlargement of the divided images is represented by Expression (11) using coefficients (q, r) determined by the actual display sizes. Also, this matches the scale when s=0 in Expression (9).

According to 9q=16r/3, $$r/q=27/16\approx1.69 \text{ (times)} \quad (11)$$

Note that, in the case of this third dividing and enlarging method as well, in the same way as with the above example of the second dividing and enlarging method, the geometric sizes of the short directions of the display made up of the three display panels do not match the sizes on the short sides of the enlarged image, and in this case, the personal digital assistant 1 according to the present embodiment displays, for example, a black belt image or the like on both edge portions on the short sides of the enlarged image. Specifically, the personal digital assistant 1 according to the present embodiment displays a black belt image BB2$u$ on the upper side edge portions of the three display panels MD, SD1, and SD2, and similarly displays a black belt image BB2$d$ on the lower side edge portions.

According to this third dividing and enlarging method, image division is performed with trisected division, and also, display of an image equivalent to the frame width does not have to be eliminated, and accordingly, the load of the processing at the time of division extremely is lighter. Also, according to the third dividing and enlarging method, the entire portion of the original image can be displayed while maintaining the aspect ratio of the enlarged image of the original image by displaying a black belt image or the like on the upper and lower edge portions on the short sides of the enlarged image.

Note that the above first through third dividing and enlarging methods may be applied to any of later-describing operation control examples according to the present embodiment as long as this accompanies division and enlargement of an image.

Second Operation Control Example

Figure 33:
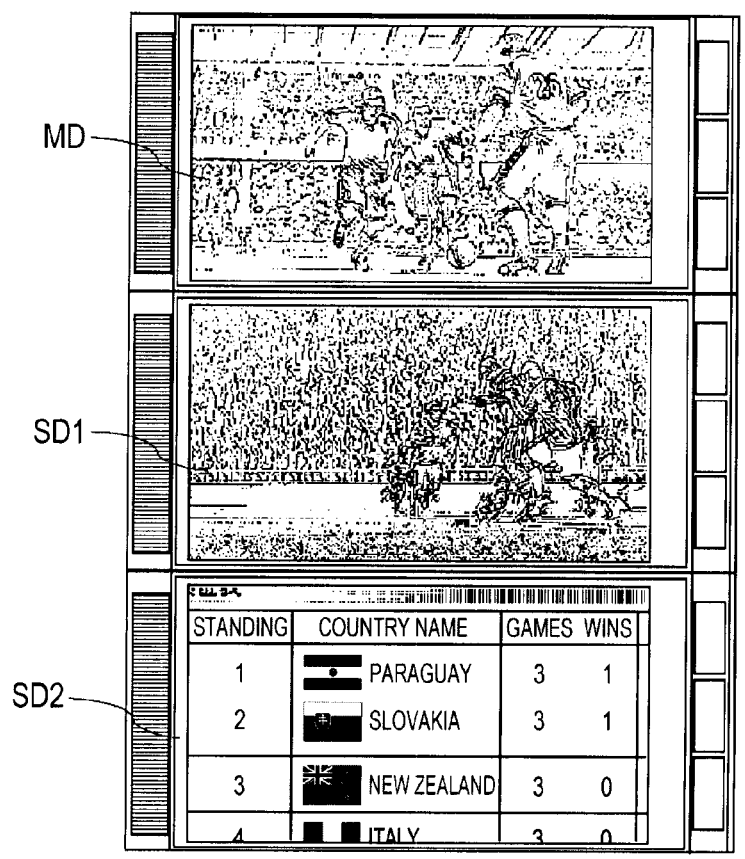
FIG. 33 is a diagram used for description of an operation control example based on the detection result of the terminal state detection sensor, and is a diagram illustrating an example wherein a moving image, and a moving image serving as related information thereof, and supplementary information are displayed on the three screens in the terminal opened state.

FIGS. 26 and 33 illustrate another example of display panel display control according to the opened/closed state of the terminal as a second operation control example based on the detection result of the terminal state detection sensor.

With this second operation control example, the personal digital assistant 1 according to the present embodiment performs one-screen display using the main display panel MD alone, for example, as illustrated in FIG. 26, in the terminal closed state. On the other hand, with this second operation control example, in the event of detecting transition from the terminal closed state to the terminal opened state, the personal digital assistant 1 according to the present embodiment obtains information relating to the displayed video on the main display panel MD, and displays, as illustrated in FIG. 33, the related information on the first and second sub display panels SD1 and SD2.

As for the related information, for example, in the event that a moving image is displayed on the main display panel MD, the related moving image and supplementary information can be exemplified. As for the related moving image, a moving image display on the main display panel MD, and a moving image taken on the same day, a moving image uploaded on the same day, a program that goes up against a popular one (program video of another channel) of a television program video displayed on the main display panel MD, a moving image of the same producer as the producer of a moving image displayed on the main display panel MD, a moving image of a theme or title similar to a moving image displayed on the main display panel MD or the like can be exemplified. As for the supplementary information, various types of data can be exemplified, which is obtained via a web based on, for example, Electronic Program Guide (EPG) data for television broadcasting programs, data multiplexed in television broadcasting, e.g., such EPG data, multiplexed data, or a user's instructions.

As an example, in the event that a television broadcasting video of a certain broadcasting channel is displayed on the main display panel MD, upon detecting transition from the terminal closed state to the terminal opened state, the personal digital assistant 1 according to the present embodiment obtains supplementary information such as television broadcasting program information of another channel relating to the display channel of the main display panel MD, Electronic Program Guide (EPG) for television broadcasting, multiplexed broadcasting data, information via a web, or the like. Subsequently, the personal digital assistant 1 at this time displays a list of the obtained related information on the second sub display panel SD2. Subsequently, upon the user selecting desired related information out of the list of the related information displayed on this second display panel SD2, the personal digital assistant 1 according to the present embodiment displays this selected related information on the first sub display panel SD1.

Note that the example in FIG. 33 illustrates an example wherein, in the event that a television relay video of a soccer game between certain teams is displayed on the main display panel MD, as an example of the above related information, a television relay video of another soccer game which affects on the rankings of the above teams is displayed on the first sub display panel SD1, and also as an example of a related information list, a ranking table of a related information list, a ranking table that represents the rankings of these teams is displayed on the second sub display panel SD2.

Note that the second operation control example and the first operation control example may be switched based on detection of transition of the terminal horizontal/vertical state. Specifically, for example, in the event that the person digital assistant 1 in the terminal closed state is a landscape screen as viewed from the user, when detecting that the array of the three screens in the terminal opened state has been changed to the horizontally lateral direction along with transition to the terminal opened state, the personal digital assistant 1 according to the present embodiment performs enlarged display using the three screens like the above first operation control. On the other hand, in the event that the person digital assistant 1 in the terminal closed state is a landscape screen as viewed from the user, for example, when detecting that the array of the three screens in the terminal opened state has been changed to the vertically longitudinal direction along with transition to the terminal opened state, the personal digital assistant 1 according to the present embodiment displays another video or information or the like relating to the displayed video of the main display panel MD, on the first and second sub display panels SD1 and SD2 like the above second operation control. Similarly, in the event that the terminal 1 in the terminal closed state is a portrait screen as viewed from the user, the personal digital assistant 1 according to the present embodiment performs enlarged display using the three screens when the array of the three screens is changed to the vertically longitudinal direction along with transition to the terminal opened state, and on the other hand, displays another video or the like related to the display video of the main display panel MD, on the first and second sub display panels SD1 and SD2 when the array of the three screens was changed to the horizontally lateral direction.

Also, with this second operation control example, in the event that any one of the three screens has been selected by the user via a touch panel sensor or pressing key, the video corresponding to the selected screen may be displayed on these three screens.

Also, with this second operation control example, in the event that transition has been made from the terminal opened state to the terminal closed state, the personal digital assistant 1 according to the present embodiment returns to one-screen display using the main display panel MD alone as illustrated in FIG. 26. Also, for example, in the event that transition from the terminal opened state to the terminal closed state has been made generally at the same time as selection of any of the three screens, the personal digital assistant 1 according to the present embodiment may perform one-screen display of the video of this selected screen on the main display panel MD in the terminal closed state.

In the case of this second operation control, the user can continuously view, for example, a live video that has to be prevented from looking aside by viewing the display on the main display panel MD, and also can view or check another video or information relating to the live video thereof by viewing the display on the first and second sub display panels SD1 and SD2.

Third Operation Control Example

Figure 34:
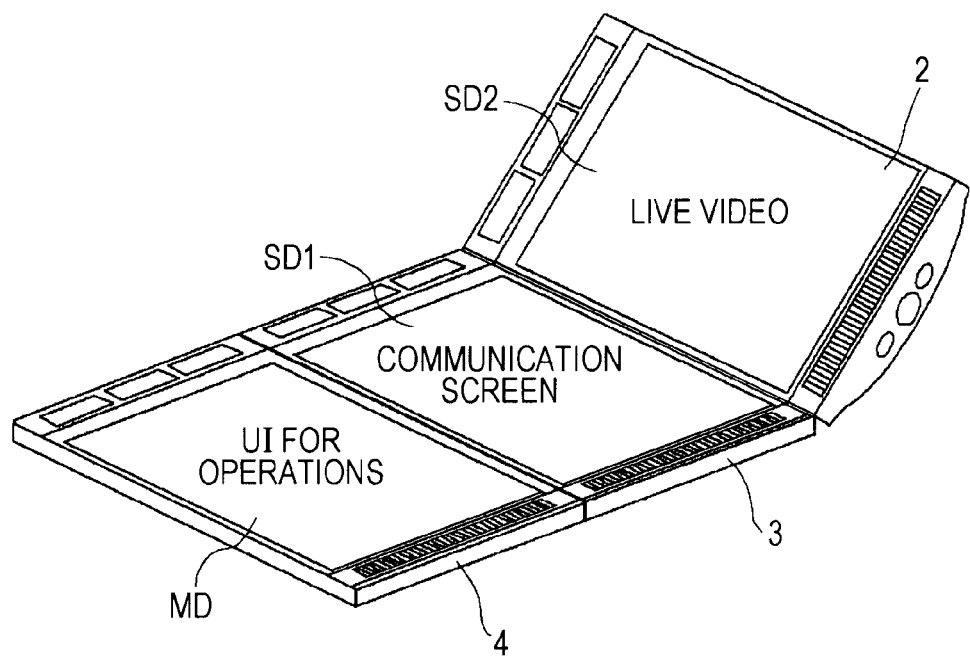
FIG. 34 is a diagram used for description of an operation control example of the personal digital assistant according to the present embodiment, and is a diagram illustrating an example wherein a live video, a screen for communication between users, and a user interface screen for input operations are displayed on the three screens in the terminal opened state.

FIG. 34 illustrates the third operation control example according to the present embodiment of the present disclosure which continues display of a desired video, and simultaneously with this, enables use of an inter-user communication tool via various types of network, for example, such as the Internet and so forth.

With this third operation control example, the personal digital assistant 1 according to the present embodiment performs, for example, one-screen display of a desired video using the main display panel MD alone as illustrated in FIG. 26 in the terminal closed state. On the other hand, with this third operation control example, in the event that transition has been made from the terminal closed state to the terminal opened state, the personal digital assistant 1 according to the present embodiment displays, as illustrated in FIG. 34, a desired video which has been displayed on the main display panel MD in the terminal closed state, on the second sub display panel SD2, for example. Also, the personal digital assistant 1 according to the present embodiment displays a screen for communication between users on the first sub display panel SD1, and displays a user interface screen for input operations for this communication between users on the main display panel MD.

Note that, as for the above inter-user communication tool, various applications for network communication such as e-mail, live chat, and Twitter (registered trademark) can be exemplified. For example, in the event of using e-mail, the personal digital assistant 1 according to the present embodiment displays, for example, a reception mail screen, a mail creation screen, or the like on the screen of the first sub display panel SD1, and displays what we might call a software keyboard on the screen of the main display panel MD. Also, in the event of employing an inter-user message exchange tool or electronic message board or the like, which take advantage of the Internet, such live chat or Twitter (registered trademark), the personal digital assistant 1 according to the present embodiment displays a screen such as a posting message board or the like on the screen of the first sub display panel SD1, and displays a software keyboard or the like on the main display panel MD.

Here, when a desired video is displayed on the main display panel MD in the terminal closed state, for example, only in the event that a notification to the effect that an incoming e-mail, or a new post has been received, and further, transition from the terminal closed state to the terminal opened state has been made, this third operation control may be executed. Specifically, for example, when a desired video is displayed on the main display panel MD in the terminal closed state, for example, in the event that transition has been made from the terminal closed state to the terminal opened state, for example, in a state in which there has been no notification of an incoming e-mail, or a new post, or the like, the personal digital assistant 1 according to the present embodiment executes the above first operation control or second operation control. On the other hand, for example, in the event that there has been a notification of an incoming e-mail, or a new post, or the like, and further, transition has been made from the terminal closed state to the terminal opened state, the personal digital assistant 1 according to the present embodiment executes this third operation control. It goes without saying that the third operation control may be executable when an explicit activation instruction is input from the user.

Also, with the personal digital assistant 1 according to the present embodiment at the time of execution of this third operation control, as described above, at the time of being changed to the terminal opened state, the desired video is displayed on the second sub display panel SD2, the communication screen is displayed on the first sub display panel SD1, and the user interface screen for operations such as the software keyboard is displayed on the main display panel MD. Here, in the case of the present embodiment, with the first casing 2 provided to the second sub display panel SD2, as described in the above FIGS. 1, 2, and others, a main texture panel MP with the long directions having a linear shape, and on the other hand the short directions having a protruding curved shape is provided. Therefore, in the event that the personal digital assistant 1 according to the present embodiment in the terminal opened state is disposed on, for example, a table or the like, for example, with the display panel surface being faced up, the second sub display panel SD2 of the first casing 2 stands up with a certain level of angle as to the table surface as illustrated in FIG. 34. That is to say, the desired video on the second sub display panel SD2 is an eye-friendly video for the user. On the other hand, the first sub display panel SD1 of the second casing 2, and the main display panel MD of the third casing 4 at this time are, as illustrated in FIG. 34, in a generally horizontal state as to the table surface. Therefore, the user can readily operate the software keyboard on the main display panel MD while viewing the communication screen on the first sub display panel SD1 without preventing the desired video on the second sub display panel SD2 from being viewed.

Figure 35:
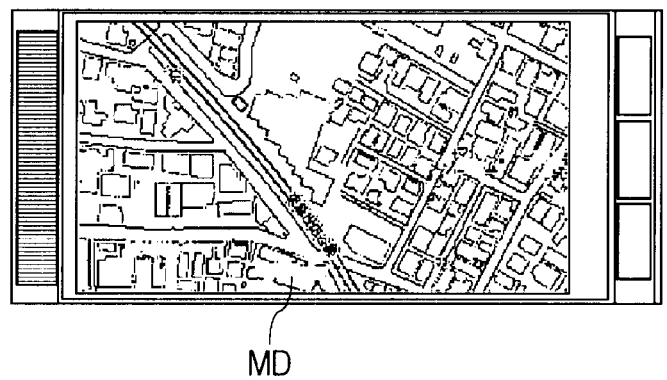
FIG. 35 is a diagram used for description of an operation control example of the personal digital assistant according to the present embodiment, and is a diagram illustrating an example wherein a map is displayed on the main display panel in the terminal closed state.
Figure 36:
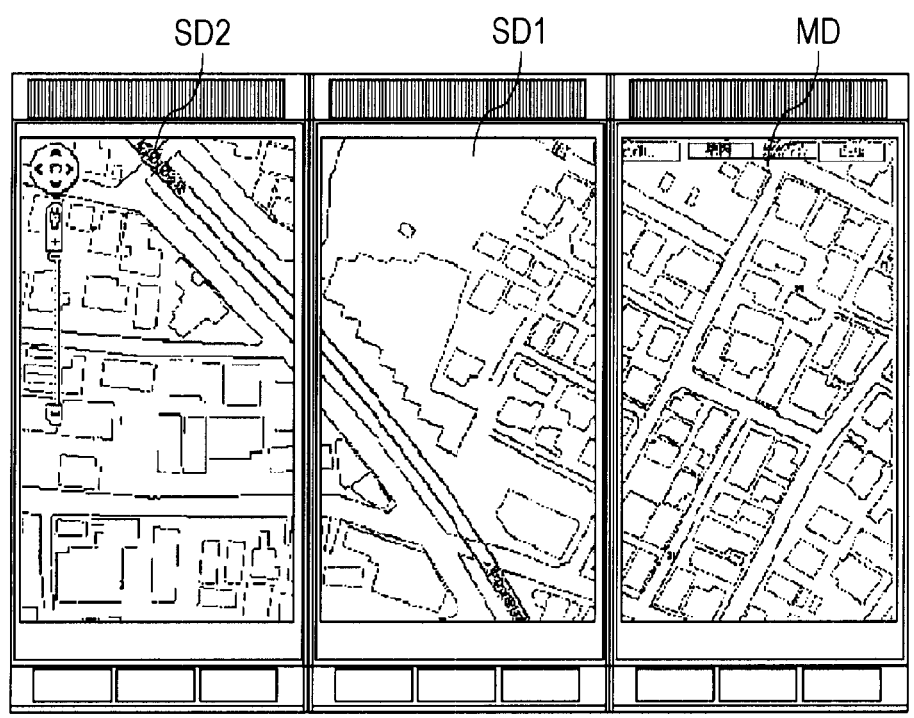
FIG. 36 is a diagram used for description of an operation control example of the personal digital assistant according to the present embodiment, and is a diagram illustrating an example wherein an enlarged detailed map including the central place is displayed on the three screens in the terminal opened state.

FIGS. 35 and 36 illustrate an example wherein enlarged display of a map is performed according to the opened/closed state of the terminal, as a fourth operation control example according to the present embodiment based on the detection result of the terminal state detection sensor. Note that map data may be stored in the personal digital assistant 1 according to the present embodiment beforehand, or may be obtained via the Internet or the like as appropriate.

With this fourth operation control example, the personal digital assistant 1 according to the present embodiment displays, for example like the above FIG. 35 in the terminal closed state, a map video including the central place on the one screen of the main display panel MD for example. Note that as for the central place, the current location, a spot specified by the user, or the like can be exemplified.

Here, with the fourth operation control example, upon detecting transition from the above terminal closed state to the terminal opened state, the personal digital assistant 1 according to the present embodiment enlarges and displays a map including the central place as illustrated in FIG. 36, for example.

Enlarged display at the time of transition from the above terminal closed state to the terminal opened state can be performed by generally the same video processing as with the first operation control. However, the enlarged map with this fourth operation control may be a map obtained by simply enlarging a map displayed on the one screen of the main display panel MD alone, but preferably a detailed map with the scale thereof being more reduced.

Specifically, with this fourth operation control example, upon detecting transition from the terminal closed state in which a map including the central place is displayed on the main display panel MD, to the terminal opened state, the personal digital assistant 1 according to the present embodiment dives the map displayed at the time of this terminal closed state into three as to the long directions thereof. Subsequently, the personal digital assistant 1 according to the present embodiment enlarges these three divided maps to the size of each display panel of one screen and reduces the scale of each to obtain detailed maps. Further, the personal digital assistant 1 according to the present embodiment distributes and displays these three divided and enlarged detailed maps on the main, first sub, and second sub display panels MD, SD1, and SD2. Specifically, in the case of the examples in FIGS. 35 and 36, the personal digital assistant 1 displays the divided and enlarge detailed map corresponding to the central region of the map before division illustrated in FIG. 35, on the screen of the first sub display panel SD1, displays the left-side divided and enlarged detailed map of the video before division on the screen of the second sub display panel SD2, and displays the right-side divided and enlarged detailed map of the video before division on the screen of the main display panel MD.

Note that, with the personal digital assistant 1 according to the present embodiment, in the event that the user has changed the situation (direction) of this terminal at the time of the above maps being displayed, the directions of the displayed maps thereof are changed based on the direction detection results by the direction detection sensors. Also, in the event that the user is moving at the time of the above maps being displayed, the personal digital assistant 1 according to the present embodiment successively changes the current position based on the position detection result by the position detection sensor.

As for a usage case of this fourth operation control example, for example, a case used for route navigation at the time of accessing a destination by road or the like can be exemplified. Specifically, for example, in the event that the user is moving, the personal digital assistant 1 is set to the terminal closed state whereby the user can ready carry the terminal 1, and a map is displayed on the one screen of the main display panel MD at this time. Subsequently, for example, upon the user arriving at the neighborhood of the destination and changing the terminal 1 to the opened state, the personal digital assistant 1 according to the present embodiment displays enlarged and detailed maps using the three screens. It goes without saying that enlarged detailed map display is performed at the time of being changed to the terminal opened state even while the user is moving even out of the neighborhood of the destination. Thus, the user can receive navigation by the personal digital assistant 1 in a handy-carrying state during movement toward the destination. Also, the user can view an enlarged and detailed understandable map by changing to the terminal opened state at the time of approaching the destination or at a desired point of time, and can know a correct destination position or the like.

Note that, with this map display, instead of the above black belt image, a map region on further outside may be displayed in the display portion equivalent to this black belt image. Let us say that this is the same as with the case of map display in the following operation control examples.

Fifth Operation Control Example

Figure 37:
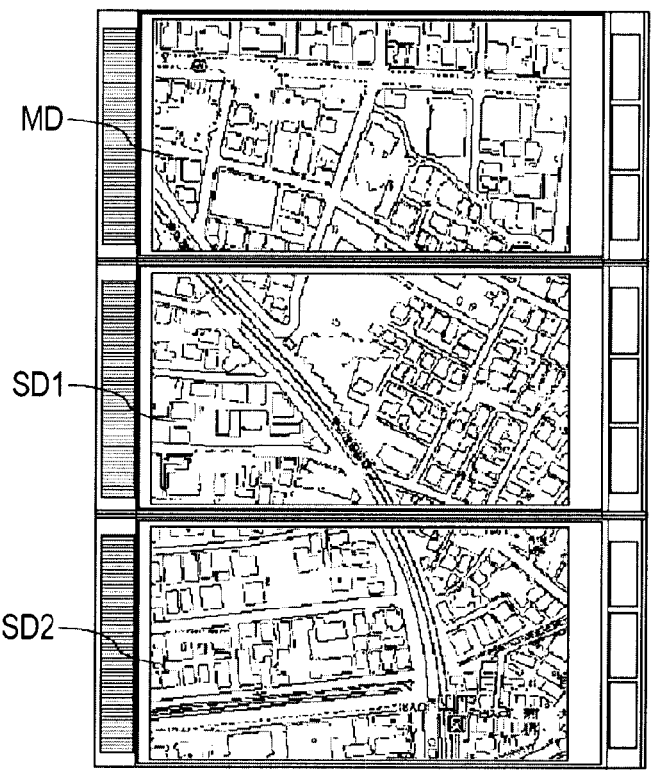
FIG. 37 is a diagram used for description of an operation control example of the personal digital assistant according to the present embodiment, and is a diagram illustrating an example wherein a wide area map including a region including the central place, and a region adjacent thereto are displayed on the three screens in the terminal opened state.

FIGS. 35 and 37 illustrate an example wherein a wide-area map is displayed according to the opened/closed state of the terminal 1, and the direction where this terminal 1 directs, as a fifth operation control example of the present embodiment. Note that, with this fifth operation control example as well, map data may be stored in the personal digital assistant 1 according to the present embodiment, or may be obtained via the Internet or the like as appropriate.

With this fifth operation control example, the personal digital assistant 1 according to the present embodiment displays, for example, the map of the central place on the one screen of the main display panel MD in the terminal closed state as illustrated in FIG. 35.

Here, with this fifth operation control example, in the event of detecting transition from the terminal closed state to the terminal opened state, the personal digital assistant 1 according to the present embodiment displays, for example as illustrated in FIG. 37, a wide-area map including the central place.

At the time of display of this wide-area map, the personal digital assistant 1 according to the present embodiment displays the map of the central place displayed on the main display panel MD in the terminal closed state, for example, on the first sub display panel SD1. Also, at this time, the personal digital assistant 1 displays the map of a region corresponding to a direction where the three screens in this terminal opened state are unfolded at the central place on the second sub display panel SD2 and the main display panel MD.

Specifically, for example, in the event that it has been detected by the above direction detection sensor that the alignment direction of the three screens in the terminal opened state matches generally a north-south direction, and also, for example, the first casing 2 is the north side, and the third casing 4 is the south side, the personal digital assistant 1 according to the present embodiment displays the map of a district adjacent to the direction of the north as to the displayed map of the first sub display panel SD1, on the second sub display panel SD2 of the first casing 2. Similarly, the personal digital assistant 1 according to the present embodiment displays the map of a district adjacent to the direction of the south as to the displayed map of the first sub display panel SD1, on the main display panel MD of the third casing 4. Also, for example, in the event that it has been detected by the above direction detection sensor that the alignment direction of the three screens in the terminal opened state matches generally an east-west direction, and also, for example, the first casing 2 is the east side, and the third casing 4 is the west side, the personal digital assistant 1 according to the present embodiment displays the map of a district adjacent to the direction of the east as to the displayed map of the first sub display panel SD1, on the second sub display panel SD2 of the first casing 2, and on the other hand, displays the map of a district adjacent to the direction of the west as to the display map of the first sub display panel SD1, on the main display panel MD of the third casing 4. With regard to a case where the alignment direction of the three screens in the terminal opened state is a direction other than the north-south direction and the east-west direction, e.g., another direction such as a southwest-northeast direction or a southeast-northwest direction, the personal digital assistant 1 according to the present embodiment also performs the same display control as above.

Note that, with regard to this fifth operation control example as well, in the same way as with the fourth operation control example, in the event that the user has changed the situation (direction) of this terminal at the time of the above map display being performed, the personal digital assistant 1 according to the present embodiment changes the direction of the display map based on the direction detection result of the direction detection sensor. Also, in the event that the user is moving at the time of the above map display being performed, the personal digital assistant 1 according to the present embodiment successively changes the current position based on the position detection result by the position detection sensor.

Also, with this fifth operation control example, in the event that any of the maps displayed on the three screens has been selected, i.e., for example, in the event that the user has selected and specified a desired map using a touch sensor panel or the like disposed on each of the display panels MD, SD1, and SD2, the personal digital assistant 1 according to the present embodiment displays an enlarged detailed map obtained by reducing the scale of the selected map, on the three screens. Note that selection of this map may be performed by depression of a predetermined pressing key of the first through third casings 2 through 4.

Here, for example, in the event that the map corresponding to the first display panel SD1 in FIG. 37 has been selected, the personal digital assistant 1 according to the present embodiment displays a detailed map obtained by enlarging that map on the three screens. More specifically, with this example, the personal digital assistant 1 according to the present embodiment divides the selected map displayed on the first sub display panel SD1 into three as to the long direction thereof in the same way as above. Subsequently, the personal digital assistant 1 according to the present embodiment enlarges these three divided maps to the size of one screen of each of the display panels, and also reduces the scale thereof to obtain detailed maps. Further, the personal digital assistant 1 according to the present embodiment distributes and displays these three divided and enlarged detailed maps on the main, first sub, and second sub display panels MD, SD1, and SD2 so as to adapt the placement relationship of these three divided and enlarged detailed maps to the map before division thereof.

As for a usage case of this fifth operation control example, in the same way as with the fourth operation control example, for example, a case used for route navigation at the time of accessing a destination by road or the like can be exemplified. Specifically, for example, in the event that the user is moving, the personal digital assistant 1 is set to the terminal closed state whereby the user can ready carry the terminal 1, and a map is displayed on the one screen of the main display panel MD at this time. Also, according to the present embodiment, the user can view a wider area map including the central place, for example, by unfolding the personal digital assistant 1 during movement, and thus, the user can recognize the rough direction and distance from the central place to the destination, and various landmarks existing between the central place and the destination. Also, in the case of the present embodiment, a wide area map adapted to the unfolding directions of the three screens is displayed, and accordingly, the user can comprehensibly recognize the direction and distance between the central place and the destination, and so forth. Also, with the present embodiment, at the time of the wide area map being displayed, by selecting the map displayed on any screen thereof, the user can view a detailed map obtained by enlarging the selected map thereof.

Note that one-screen display and three-screen enlarged display according to the terminal opened/closed operation like the above fourth operation control example, and one-screen display and three-screen enlarged display according to the terminal opened/closed operation like the fifth operation control example can also be applied, for example, at the time of journal access and book access, as well as map display. Specifically, for example, in the event that this access for a journal or the like has been applied to the fourth operation control example, the personal digital assistant 1 according to the present embodiment performs, in the terminal closed state, the above one-screen display, and enlarges, in the terminal opened state, the page displayed in the terminal closed state to three screens, and displays this. Also, for example, that access for a book has been applied to the fifth operation control example, the personal digital assistant 1 according to the present embodiment performs, in the terminal closed state, the above one-screen display, and displays, in the terminal opened state, three pages worth of the page displayed in the terminal closed state to which the previous and subsequent two pages thereof are added, on the three screens. Note that, with the example wherein the access for a book or the like has been applied to the fifth operation control example, the two pages to be newly added in the terminal opened state may be two pages worth after the page displayed in the terminal closed state, or conversely may be previous two pages worth. With any of the cases of adding pervious and subsequent two pages, subsequent two pages, and previous two pages, the personal digital assistant 1 according to the present embodiment performs three-screen display so as to maintain the contextual relationship of each page of the three pages in total.

Sixth Operation Control Example

Figure 38:
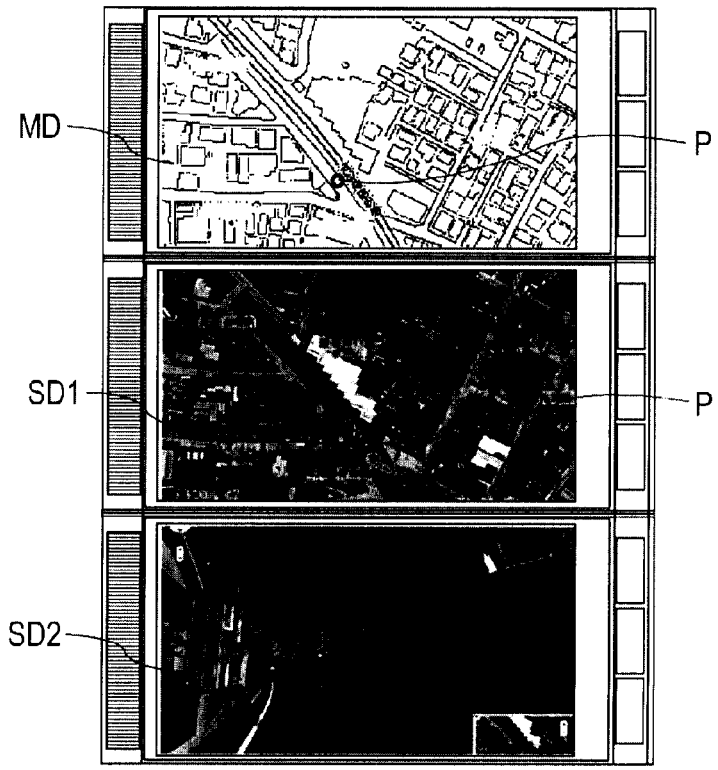
FIG. 38 is a diagram used for description of an operation control example of the personal digital assistant according to the present embodiment, and is a diagram illustrating an example wherein a map, an aerial photography, and a live scenery view video are displayed on the three screens in the terminal opened state.

FIGS. 35 and 38 illustrate an example wherein an aerial photo video or live scenery view video is displayed in addition to map display according to the opened/closed state of the terminal, as a sixth operation control example according to the present embodiment based on the detection result of the terminal state detection sensor. Note that map data, aerial photo video data, or live scenery view video data may be stored in the personal digital assistant 1 according to the present embodiment beforehand, or may be obtained via the Internet or the like as appropriate.

With this sixth operation control example, the personal digital assistant 1 according to the present embodiment displays, for example like the above FIG. 35 in the terminal closed state, a map video of the central place on the one screen of the main display panel MD for example.

Here, with this sixth operation control example, upon detecting transition from the above terminal closed state to the terminal opened state, the personal digital assistant 1 according to the present embodiment displays, for example as illustrated in FIG. 38, a map including the central place, an aerial photo video obtained by taking a region including the central place thereof from the above, and a live scenery view video at the time of the user viewing the direction where the terminal face at this central place. Note that, with the example in FIG. 38, the map including the central place is displayed on the main display panel MD, the aerial photo video including the central place is displayed on the first sub display panel SD1, the live scenery view video at the time of viewing the direction where the terminal faces at the central place is displayed on the second sub display panel SD2. Also, with the example in FIG. 38, a predetermined mark P representing the central place is also displayed on the map of the main display panel MD, and the aerial photo video of the first sub display panel SD1.

Also, with this sixth operation control example, in the event that any of the map, aerial photo video, and live scenery view video displayed on the three screens has been selected, i.e., in the event that the user has selected and specified a desired video using the touch sensor panel or the like disposed in each of the display panels for example, the personal digital assistant 1 according to the present embodiment enlarges the selected video and displays this on the three screens. Note that, in the event that the map on the main display panel MD has been selected, an enlarged detailed map such as the fourth operation control example is displayed on the three screens.

Also, for example, in the event that the aerial photo video on the first sub display panel SD1 has been selected, this aerial photo video displayed on the first sub display panel SD1 is divided into three as to the long direction thereof in the same way as above, each of these is enlarged to the size of one screen of the display panel, and the three divided videos are distributed and displayed on the three screens so as to adapt the placement relation of each of the three divided videos to the aerial photo video before division. Similarly, this live scenery view video displayed on the second sub display panel SD2 is divided into three as to the long direction thereof in the same way as above, each of these is enlarged to the size of one screen of the display panel, and the three divided videos are distributed and displayed on the three screens so as to adapt the placement relation of each of the three divided videos to the live scenery view video before division. Note that the enlarged videos of the aerial photo video and the live scenery view video is not restricted to being enlarged simply by display scale, and may be detailed videos with higher resolution.

As for a usage case of this sixth operation control example, in the same way as with the fourth operation control example, for example, a case used at the time of route navigation, or the like can be exemplified. Specifically, according to the sixth operation control example, not only the map display of the central place but also the aerial photo or live scenery view video of the central place thereof can be displayed, and accordingly, the user can know whether or not the route to the central place or a destination is correct, or the like in an intuitive and sure manner.

Seventh Operation Control Example

Figure 39:
FIG. 39 is a diagram used for description of an operation control example of the personal digital assistant according to the present embodiment, and is a diagram illustrating an example wherein the original image before effect processing is displayed on the main display panel in the terminal closed state.
Figure 40:
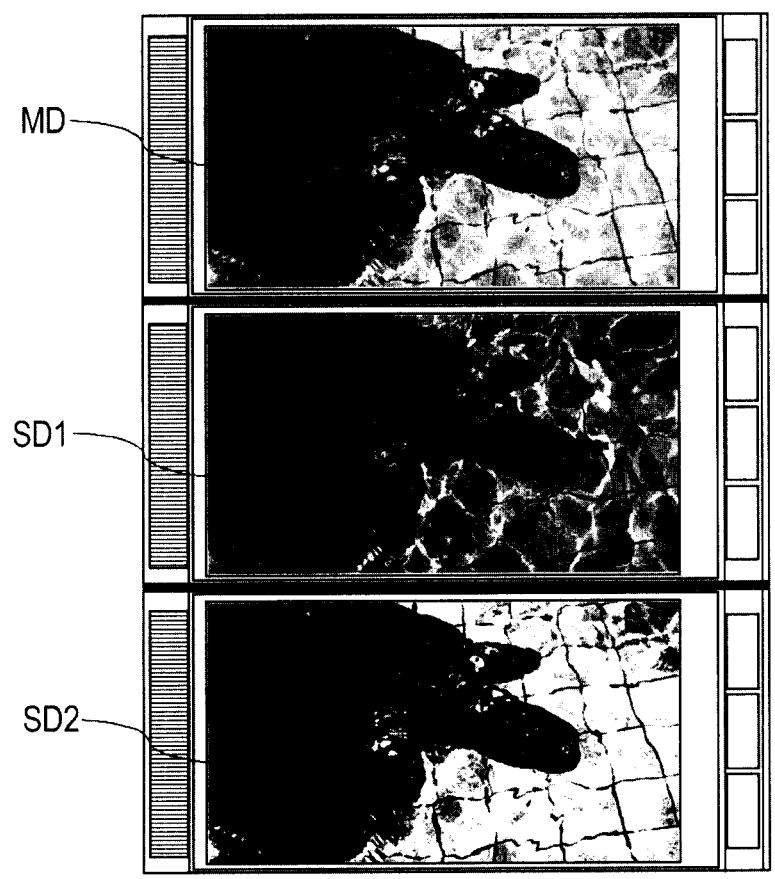
FIG. 40 is a diagram used for description of an operation control example of the personal digital assistant according to the present embodiment, and is a diagram illustrating an example wherein a minimum value image of the effect processing, an image before the effect processing at the point thereof, and a maximum value image of the effect processing are displayed on the three screens in the terminal opened state.

FIGS. 39 and 40 illustrate an example wherein videos before and after effect at the time of subjecting a desired display video to predetermined effect processing are displayed according to the opened/closed state of the casings, as a seventh operation control example according to the present embodiment based on the detection result of the terminal state detection sensor. Note that examples of the effect processing as to a video include various types of video adjustment processing recognized as image effect processing, such as brightness adjustment or hue adjustment of a video, and deformation or edge adjustment of a video, and also various types of object adjustment processing, such as deformation, size change, and enhancement as to a partial object of a video. It goes without saying that these effect processes are an example, and embodiments of the present disclosure are not restricted to these.

FIGS. 39 and 40 illustrate a display example in the event of performing brightness adjustment as an example of the above predetermined effect processing.

With this seventh operation control example, the personal digital assistant 1 according to the present embodiment displays, for example like FIG. 39 in the terminal closed state, a desired video before adjustment selected by the user beforehand on the one screen of the main display panel MD.

Here, with this seventh operation control example, upon detecting transition from the above terminal closed state to the terminal opened state, the personal digital assistant 1 according to the present embodiment displays, for example as illustrated in FIG. 40, the above video before adjustment, a video after plus adjustment wherein brightness is adjusted in the plus direction as to this video before adjustment, a video after minus adjustment wherein brightness is adjusted in the minus direction as to this video before adjustment, on the three screens. Specifically, the example in FIG. 40 illustrates an example wherein the video before adjustment is displayed on the first sub display panel SD1, the video after plus adjustment is displayed on the main display panel MD, and the video after minus adjustment is displayed on the second sub display panel SD2.

In addition, as an example of the object adjustment processing for subjecting a partial object of a video to modification or the like includes object adjustment such as lengthening the eyelashes of a face video, though not included in the drawings. In the case of this example, only a face video before adjustment being performed upon the eyelash portion object is displayed on the main display panel MD in the terminal closed state. With this example, upon detecting transition from the terminal closed state to the terminal opened state, the personal digital assistant 1 according to the present embodiment displays the face video before object adjustment, a face video after +1 object adjustment wherein the object of the eyelash portion is lengthened one step as to this face video before object adjustment, and a face video after +2 object adjustment wherein the object of the eyelash portion is lengthened two steps as to the face video before object adjustment, on the three screens. Specifically, for example, the face video before object adjustment is displayed on the second sub display panel SD2, the face video after +2 object adjustment is displayed on the main display panel MD, and the face video after +1 object adjustment is displayed on the first sub display panel SD1.

Also, with this seventh operation control example, display before and after the above effect processing, and enlarged display in the same way as above may be switched as appropriate by combining the terminal opened/closed detection, and terminal horizontal/vertical detection.

Specifically, for example, in the event that the personal digital assistant 1 in the terminal closed state is a landscape screen as viewed from the user, upon detecting transition to the terminal opened state, and also detecting that the array of the three screens at this terminal opened state is the vertically longitudinal direction, the personal digital assistant 1 according to the present embodiment displays the videos before the effect processing and before and after the effect processing as described above are displayed on the three screens. On the other hand, in the event that the personal digital assistant 1 according to the present embodiment in the terminal closed state is a landscape screen as viewed from the user, upon detecting transition to the terminal opened state, and also detecting that the array of the three screens at this terminal opened state is the horizontally lateral direction, the personal digital assistant 1 according to the present embodiment enlarges the video displayed on the main display panel MD in the terminal closed state, and display this on the three screens. Also, for example, in the event that the personal digital assistant 1 according to the present embodiment in the terminal closed state is a portrait screen as viewed from the user, upon detecting transition to the terminal opened state, and also detecting that the array of the three screens at this terminal opened state is the landscape direction, the personal digital assistant 1 according to the present embodiment displays the videos before the effect processing and before and after the effect processing as described above are displayed on the three screens. On the other hand, in the event that the personal digital assistant 1 according to the present embodiment in the terminal closed state is a portrait screen as viewed from the user, upon detecting transition to the terminal opened state, and also detecting that the array of the three screens at this terminal opened state is the vertically longitudinal direction, the personal digital assistant 1 according to the present embodiment enlarges the video displayed on the main display panel MD in the terminal closed state, and display this on the three screens.

According to the seventh operation control example, by viewing the videos before and after the adjustment processing displayed on the three screens, the user can readily compare the effects of this adjustment processing.

Also, with this seventh operation control example, in the event that any of the videos before and after adjustment displayed on the three screens has been selected, the personal digital assistant 1 according to the present embodiment enlarges the selected video thereof and displays this on the three screens in the same way as above. Thus, for example, by selecting a desired vide after adjustment, the user can view an enlarged video thereof, and can readily confirm the effects of the adjustment processing thereof.

Eighth Operation Control Example

Figure 41:
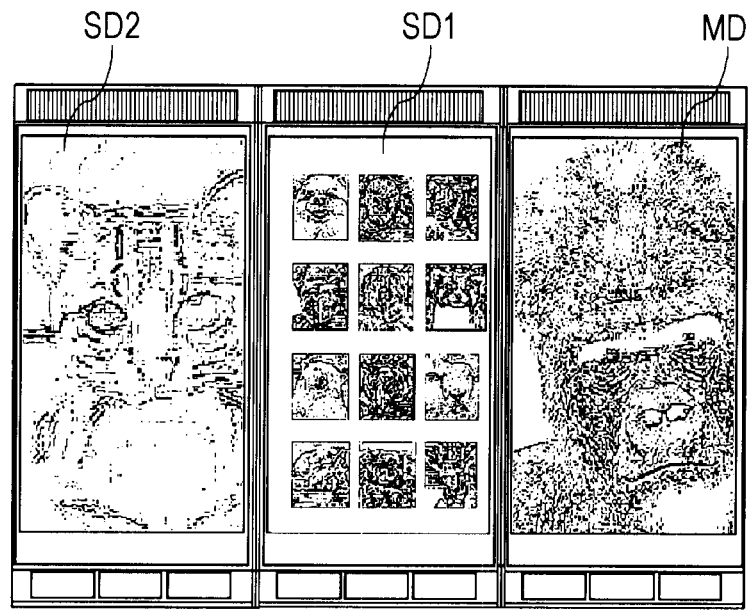
FIG. 41 is a diagram used for description of an operation control example of the personal digital assistant according to the present embodiment, and is a diagram illustrating an example wherein an image list, and two selected images before synthesizing are displayed on the three screens in the terminal opened state.
Figure 42:
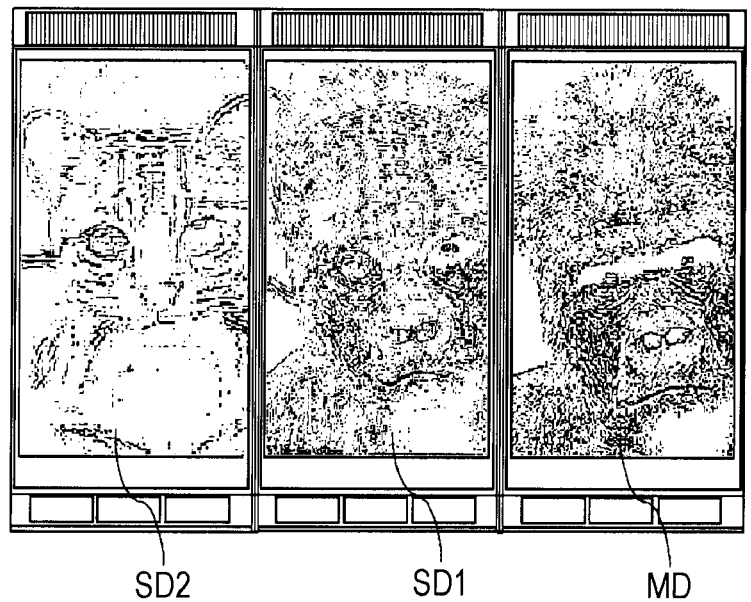
FIG. 42 is a diagram used for description of an operation control example of the personal digital assistant according to the present embodiment, and is a diagram illustrating an example wherein two selected images before synthesizing, and an image after synthesizing are displayed on the three screens in the terminal opened state.

FIGS. 41 and 42 illustrate an example wherein videos before and after synthesizing processing such as synthesizing desired two videos according to terminal opened/closed detection or vibration detection to the terminal or the like, as an eighth operation control example according to the present embodiment based on the detection result of the terminal state detection sensor. Note that, with the present embodiment, an example will be illustrated wherein video synthesizing processing is executed according to terminal opened/closed detection, but an arrangement may be made wherein the video synthesizing processing is executed according to vibration detection at the time of the user shaking this terminal while maintaining the terminal opened state. It goes without saying that these are but examples of things which trigger the video synthesizing processing, and embodiments of the present disclosure are not restricted to these.

FIGS. 41 and 42 illustrate a display example in the event of selecting two videos out of multiple videos, synthesizing the selected videos thereof, and then displaying the synthesized video.

With this eighth operation control example, the personal digital assistant 1 according to the present embodiment displays, for example like FIG. 41 in the terminal opened state, a list of multiple videos serving as candidates for synthesizing on the first sub display panel SD1. Subsequently, upon two videos being selected out of this video list by the user, the personal digital assistant 1 according to the present embodiment displays one of the two selected videos on the main display panel MD, and displays the other video on the second display panel SD2. Note that selection of the videos is performed according to selection specification, for example, by a touch panel operation as to the touch panel sensor, or the like.

Next, with this eighth operation control example, for example, upon detecting that transition from the terminal opened state to the terminal closed state has been made, the personal digital assistant 1 according to the present embodiment displays a prepared video serving as a video representing that the synthesizing processing is being executed, on the main display panel MD in the terminal closed state. Note that, as for this prepared video, a moving image such as a child stirring a bowl of wheat flour in kitchen, or the like can be given as an example.

With this eighth operation control example, upon detecting that transition has been made from the terminal closed state to the terminal opened state, the personal digital assistant 1 according to the present embodiment displays the selected videos on the main display panel MD and the second sub display panel, and displays the video after the synthesizing processing on the first sub display panel SD1.

According to this eighth operation control example, by viewing the videos before and after the synthesizing processing displayed on the three screens, the user can readily compare the effects of this synthesizing processing. Also, with this eighth operation control example, in the event that any of the videos before and after the synthesizing processing displayed on the three screens has been selected, the personal digital assistant 1 according to the present embodiment enlarges the selected video and displays this on the three screens in the same way as with the above. Thus, for example, by selecting the video after synthesizing, the user can view the enlarged video thereof, and can readily confirm the effects of the synthesizing processing thereof.

Ninth Operation Control Example

As for a ninth operation control example based on the detection result of the terminal state detection sensor, for example, control at the time of a camera shooting mode can be exemplified.

Specifically, with the camera shooting mode, an example can be exemplified wherein the personal digital assistant 1 according to the present embodiment displays, in the terminal closed state, a preview image or taken image on the main display panel MD in the terminal closed state, enlarges and displays, in the terminal opened state, the taken image on the three screens. Note that in the event that the taken image is enlarged and displayed on the three screens, the personal digital assistant 1 according to the present embodiment divides, in the same way as with the above, the taken image displayed on the main display panel MD in the terminal closed state into three as to the long direction thereof, enlarges the three divided images to the size of each of one screen of the display panel, and distributes the three divided taken images to the three screens so as to adapt the placement relationship of the three divided taken images to the taken image before division, and displays these.

Also, with the camera shooting mode, for example, in the event that the personal digital assistant 1 according to the present embodiment is used in a state in which the first casing 2 and the second casing 3 are overlaid by the second sub display panel SD2 and the first sub display panel SD1 generally fully facing to each other, and on the other hand, only the third casing 4 is opened without the first texture panel TP1 and the second texture panel TP2 generally fully facing to each other, the main display panel MD is available as a shooting angle variable monitor whereby various angles can be obtained. Specifically, in this case, with the preview screen of the main display panel MD, a shooting angle can be handled from generally zero degree serving as a side parallel to the optical axis of the camera shooting lens 7, and also serving as generally the fully opposite side as to the camera shooting direction, to generally 90 degrees serving a side orthogonal to the optical axis of the shooting lens 7, and further to generally 180 degrees serving as a side parallel to the optical axis of the shooting lens and also serving as generally the same side as the camera shooting direction. Thus, the user can perform shooting by various shooting angles as ease. Particularly, with the camera shooting mode such as this ninth operation control example, in the event that the shooting angle is set to the above generally 180 degrees, it is possible to take the user himself/herself of this terminal by the shooting lens 7, i.e., to shoot a self-portrait.

In addition, for example, in the event that the personal digital assistant 1 according to the present embodiment is used in a state in which only the first casing 2 is opened without the first sub display panel SD1 and the second sub display panel SD2 generally fully facing to each other, and on the other hand, the second casing 3 and the third casing 4 are overlaid by the first texture panel TP1 and the second texture panel TP2 generally fully facing to each other, the main display panel MD is also available as a shooting angle variable monitor. Note that, with the following description, the state in which the first casing 2 and the second casing 3 are overlaid, and on the other hand, only the third casing 4 is opened, will be referred to as "first partially opened state". Also, the state in which the second casing 3 and the third casing 4 are overlaid, and on the other hand, only the first casing 2 is opened, will be referred to as "second partially opened state". Further, when the above terminal opened state has to be distinguished from these first partially opened state and second partially opened state, the terminal opened state is referred to as "terminal fully opened state". At the time of the second partially opened state, a preview image may be displayed not only on the main display panel MD but also on the first sub display panel SD1 and second sub display panel SD2.

Note that, with this camera shooting mode, the personal digital assistant 1 according to the present embodiment is capable of taking an image even any state of the terminal closed state, first partially opened state, second partially opened state, and terminal fully opened state. For example, in the case of the terminal closed state, with the personal digital assistant 1 according to the present embodiment, shooting is executed at the time of the release button 7S being pressed by the user. Also, for example, with the first partially opened state and second partially opened state, with the personal digital assistant 1 according to the present embodiment, shooting is executed at the time of taking one of the externally exposed pressing keys K and in an operable state, as a release button, and this release button of the pressing keys K being pressed by the user. Similarly, with the terminal fully opened state as well, with the personal digital assistant 1 according to the present embodiment, shooting is executed at the time of taking one of the pressing keys K which are externally exposed and are in an operable state, as a release button, and this release button of the pressing keys K being pressed by the user. Note that shooting may be executed at the time of touching to the touch sensor panel being performed.

Tenth Operation Control Example

With the personal digital assistant 1 according to the present embodiment, for example, control for displaying three-player game screens on each of the three screens in the terminal opened state is also available as a tenth operation control example. Specifically, in the case of a chess game for example, three chess matches worth of video may be displayed on each of the three screens in the terminal opened state. It goes without saying that one chess match worth of video may be displayed on the main display panel MD in the terminal opened state. Further, for example, an arrangement may be made wherein one chess match worth of video is displayed on the main display panel MD in the terminal closed state, and the match video thereof is enlarged and displayed on the three screens in the terminal opened state.

Note that, in the event that the chess match video is enlarged and displayed on the three screens, the personal digital assistant 1 according to the present embodiment divides, in the same way as described above, the match video displayed on the main display panel MD in the terminal closed state into three as to the long direction thereof in the same way as described above, enlarges each of the divided videos to the size of one screen of display panel, and these three divided videos are distributed and displayed on the three screens so as to adapt the placement relation of the three divided videos to the video before division.

Eleventh Operation Control Example

The personal digital assistant 1 according to the present embodiment is used, for example, in the second partially opened state, the main display panel MD is directed to the user side, and on the other hand, the first sub display panel SD1 and second sub display panel SD2 are directed to the partner side, whereby control is available for displaying a video on the first and second sub display panels SD1 and SD2, and displaying narrative text thereof and so forth on the main display panel MD.

As for this usage case, for example, a case can be conceived such as what we might call a picture story show such that a picture of the story is displayed on the first and second sub display panels SD1 and SD2, and on the other hand, text representing the plot of the story thereof is displayed on the main display panel MD.

In the case of this usage case, the picture of the story displayed on the first and second sub display panels SD1 and SD2 is successively switched and displayed according to the progress of the story thereof, and the text of the plot of the story displayed on the main display panel MD is also switched and displayed according to the progress of this story. Now, let us say that the progress of the story is advanced, for example, by the user himself/herself operating the touch panel or pressing keys K of the main display panel MD.

Twelfth Operation Control Example

With the personal digital assistant 1 according to the present embodiment, for example, control for displaying a document to be shown to the partner side on the main display panel MD, displaying a document for the user himself/herself on the first display panel SD1, and displaying a user interface screen for operations such as a software keyboard or the like on the second display panel SD2, is available as a twelfth operation control example.

Figure 43:
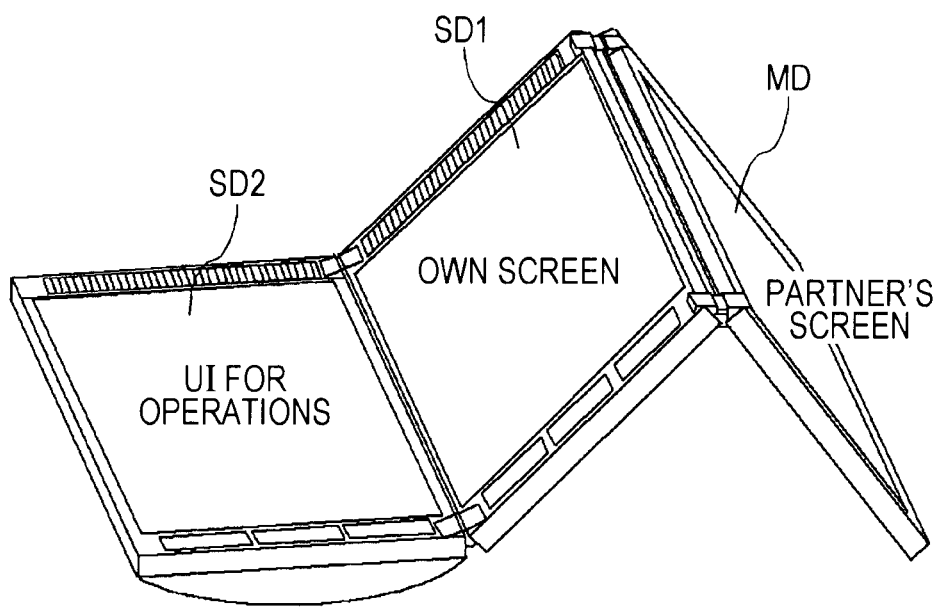
FIG. 43 is a diagram used for description of an operation control example of the personal digital assistant according to the present embodiment, and is a diagram illustrating an example wherein a document to be shown to the partner side, a document for himself/herself, and the user interface screen for input operations are displayed on the three screens in the terminal opened state.

In the case of this twelfth operation control example, it is desirable for the personal digital assistant 1 according to the present embodiment that, for example as illustrated in FIG. 43, the main display panel MD side is directed to the partner side, and on the other hand, the first display panel SD1 is directed to the user himself/herself side, and further the second display panel SD2 is generally horizontally disposed on the table surface. Note that, in this case, it is desirable that the main texture panel MP of the first casing 2 has a planar shape.

Also, with the twelfth operation control example illustrated in FIG. 43, the personal digital assistant 1 according to the present embodiment switches or edits the display content of a document for partner displayed on the main display panel MD, or the display content for a document for the user himself/herself displayed on the first display panel SD1, according to the user operations as to the software keyboard of the second display panel SD2.

According to this twelfth operation control example, the user and the partner can both view the document, and the user can operate the displayed document thereof.

Thirteenth Operation Control Example

In the event that the personal digital assistant 1 according to the present embodiment is used, for example, in the second partially opened state, control for displaying a right-side page of a book on the first sub display panel SD1, and displaying a left-side page of the book on the second display panel SD2, is available as a thirteenth operation control example.

Specifically, with this thirteenth operation control example, the personal digital assistant 1 according to the present embodiment can be used in what we might call a book style. At the time of being used as this book style, the personal digital assistant 1 according to the present embodiment switches a display page on the first sub display panel SD1 or second sub display panel SD2, for example, according to a page turning operation from the user via the touch panel sensor, or the like.

Also, for example, in the event that the main display panel MD is also opened to change the personal digital assistant 1 according to the present embodiment to the terminal opened state at the time of use with this book style, the personal digital assistant 1 according to the present embodiment can also display information relating to the pages displayed on the first and second sub display panels SD1 and SD2, on the main display panel MD. As for the information to be displayed on the main display panel MD, advertising information of this book, or the like can be exemplified, and link information to a site where this book can be purchased or the like may be added to the advertising information thereof.

Fourteenth Operation Control Example

With the personal digital assistant 1 according to the present embodiment, for example, control for displaying a desired video such as what we might call a folding screen on the three screens in the terminal opened state, or switching and displaying a desired photo video such as what we might call a digital photo frame as appropriate, is available as a fourteenth operation control example.

Specifically, the personal digital assistant 1 according to the present embodiment reads out a video stored in internal memory or external memory or the like to display the video as one screen of the three screens, or to display a different video for each screen.

Fifteenth Operation Control Example

With the personal digital assistant 1 according to the present embodiment, for example, control for displaying a game screen such as a quiz on the three screens in the terminal opened state, is available as a fifteenth operation control example.

Specifically, for example, when the three screens are arrayed in the vertically longitudinal direction by the user, the personal digital assistant 1 according to the present embodiment enlarges and displays an image for problem reference with the three screens as a single screen. Subsequently, in the event that the direction of the terminal 1 has been changed so that the three screens are arrayed in the horizontally lateral direction as viewed from the user, the personal digital assistant 1 according to the present embodiment displays a problem image obtained by a portion of the image for problem reference being changed on two screens of the three screens, and displays the same image as the problem reference image on the remaining screen.

According to this fifteenth operation control example, what we might call a "How may differences can you find?" game is available. It goes without saying that the type of a game is not restricted to the difference finding game, and may be other games.

Another External Configuration Example of Personal Digital Assistant according to Present Embodiment The personal digital assistant 1 illustrated in FIGS. 1 through 25 having a three-screen folding-type configuration whereby the first casing 2 through third casing 4 can be opened/closed by folding, but the personal digital assistant 1 according to the present embodiment may have a three-screen slide-type configuration whereby a first casing 72 through a third casing 74 can be opened/closed by sliding in generally parallel with the principal surfaces thereof as illustrated in FIGS. 44 through 49.

FIGS. 44 through 49 illustrate schematic external configuration example of the three-screen slide-type personal digital assistant 71 as another configuration example of the personal digital assistant according to the present embodiment. Note that FIGS. 44 though 49 illustrate a schematic external appearance as viewed from the side wall face direction side of the casing short side for example.

Figure 47:
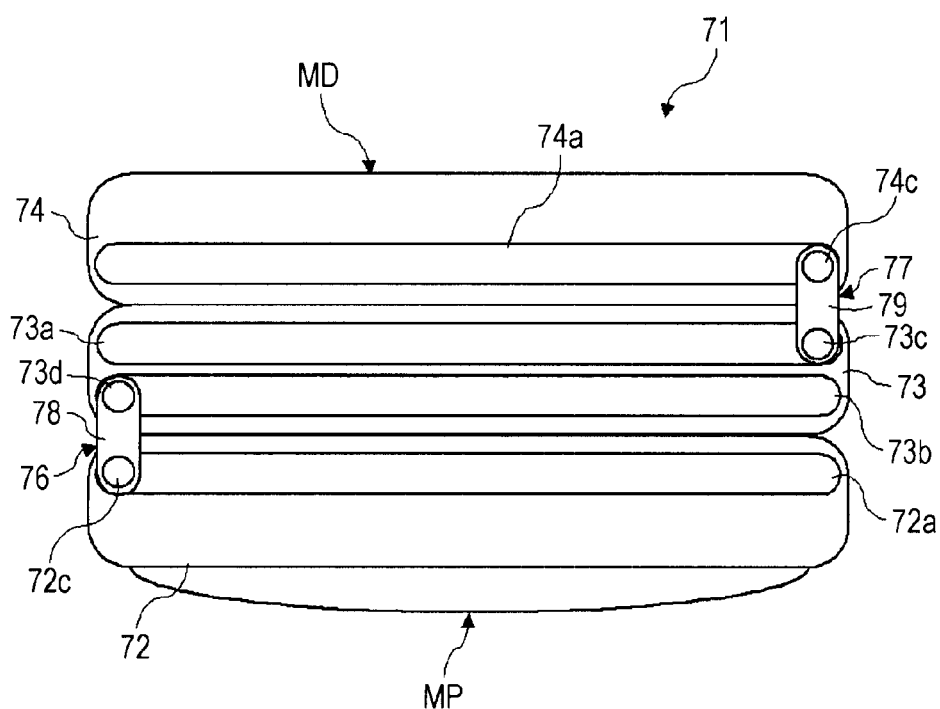
FIG. 47 is a diagram for describing slide transition between a terminal opened state and a terminal closed state, and operation of the connecting portion, at the three-screen slide-type personal digital assistant according to an embodiment of the present disclosure, and is specifically a detailed external view of the terminal in the terminal closed state as viewed from the side wall surface direction side of the casing short side.
Figure 48:
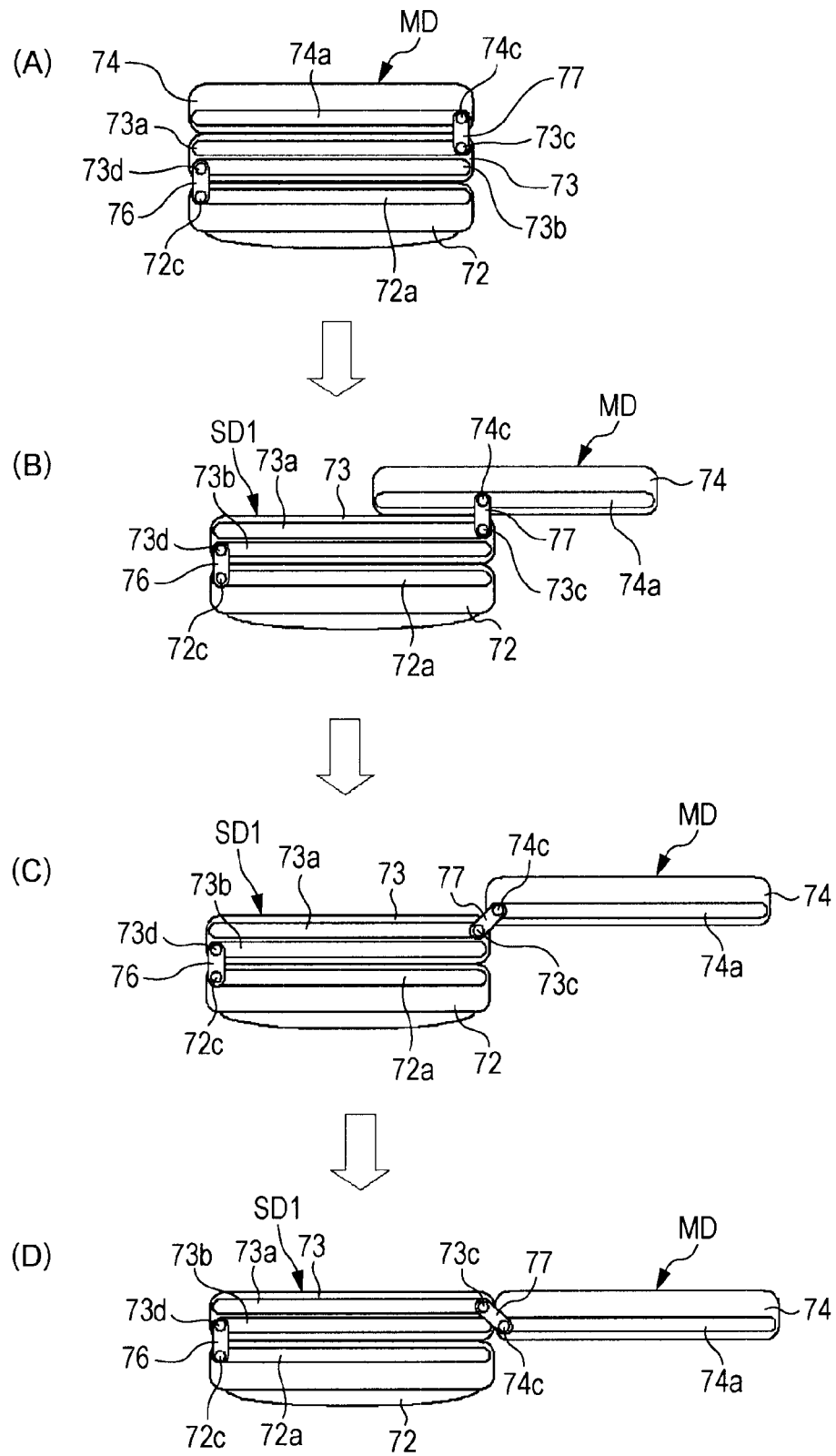
FIG. 48 is a diagram for describing transition from a terminal closed state until both display panels of the second and third casings are generally parallel and horizontally aligned at the three-screen slide-type personal digital assistant according to an embodiment of the present disclosure.
Figure 49:
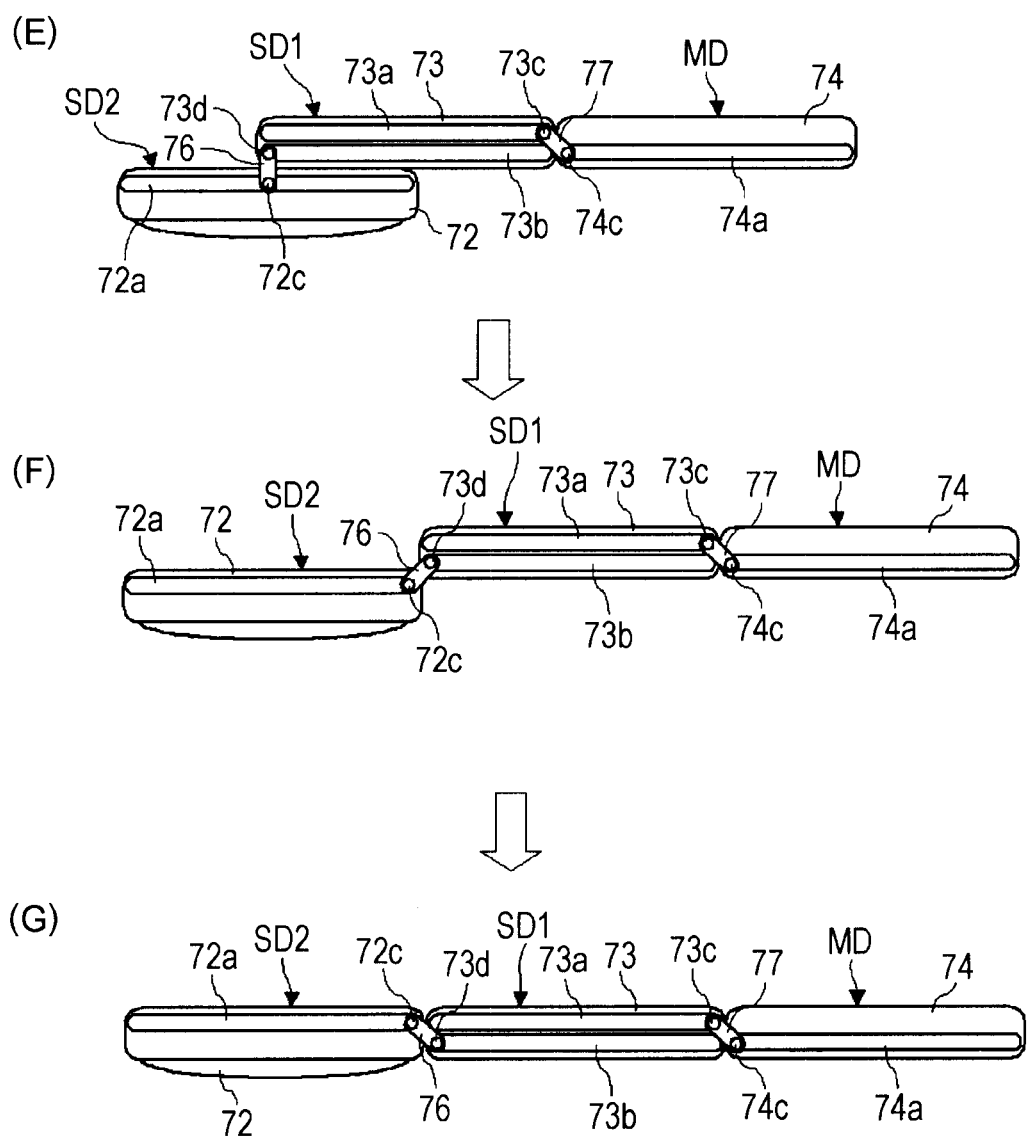
FIG. 49 is a diagram for describing transition from a terminal opened state until both display panels of the second and third casings are parallel and horizontally aligned until a terminal opened state at the three-screen slide-type personal digital assistant according to an embodiment of the present disclosure.

As illustrated in FIGS. 47 through 49, the three-screen slide-type personal digital assistant 71 according to the present embodiment is configured of three casing of a first casing 72, a second casing 73, and a third casing 74. These first casing 72, second casing 73 and third casing 74 have a rectangular plate shape each including a first principal surface, and a second principal surface mutually facing the first principal surface. Also, the first casing 72, second casing 73, and third casing 74 each have, in the same way as with the three-screen folding-type personal digital assistant 1, a display panel of a predetermined aspect ratio on the first principal surface side, and have a texture panel on the second principal surface side.

Specifically, the first casing 72 has, generally in the same way as with the example of the three-screen folding-type personal digital assistant 1, a rectangular plate shape having the first and second principal surfaces which mutually face, and also having predetermined thickness, includes the second sub display panel SD2 on the first principal surface side, and the main texture panel MP on the second principal surface side. Also, the first casing 72 also includes, in the same way as with the three-screen folding-type personal digital assistant 1, a shooting lens for digital camera, a light for providing extra light for shooting, and a release button. In the same way as above, a transparent touch sensor panel is provided to the front surface of the second sub display panel SD2.

The second casing 73 has, in the same way as above, a rectangular plate shape having the first and second two principal surfaces which mutually face, and also having predetermined thickness, includes the first sub display panel SD1 on the first principal surface side, and the first texture panel TP1 on the second principal surface side. Also, in the same way as above, a transparent touch sensor panel is provided to the front surface of the second sub display panel SD2. Note that the first texture panel TP1 has a generally flat planar shape.

The third casing 74 has, in the same way as above, a rectangular plate shape having the first and second two principal surfaces which mutually face, and also having predetermined thickness, includes the main display panel MD on the first principal surface side, and the second texture panel TP2 on the second principal surface side. Also, in the same way as above, a transparent touch sensor panel is provided to the front surface of the main display panel MD. Note that the second texture panel TP2 has a generally flat planar shape.

Note that, in the same way as described above, with the main texture panel MP, and the first and second texture panels TP1 and TP2, various pictures or photos or the like may be adhered thereto, or various ornaments or patterns may be provided thereto, and also, some thereof may have a display panel.

In addition, with this example as well, generally in the same way as with the three-screen folding-type personal digital assistant 1, the first through third casing 72 through 74 may include pressing keys K with three keys as a set in the neighborhood of edge portions 21, 22, and 23 of one of the longer sides of each display panel provided surface. Also, with the personal digital assistant 71 according to the present embodiment, an arrangement may be made wherein one speaker for channel of left and right channels for stereo output is provided to the first casing 72, the other speaker for channel is provided to the third casing 74, and further, a speaker for center channel is provided to the second casing 73. Also, in the event that the personal digital assistant 71 according to the present embodiment is a cellular phone terminal, for example, an arrangement may be made wherein a speaker for receiver is provided to the neighborhood of one edge portion on the long sides of the main display panel MD of the third casing 74, and a microphone for transmitter is provided to the neighborhood of the other edge portion on the long sides. It goes without saying that the personal digital assistant 71 according to the present embodiment may include the same various types of devices on any of the first casing 72 through third casing 74 as a common personal digital assistant includes, such as a cable connection terminal, an external memory slot, an LED lamp for outgoing/incoming notifications, an antenna for television broadcasting, and so forth.

Also, the three-screen slide-type personal digital assistant 71 according to the present embodiment includes a connecting portion which enables slide transition between a first terminal placement state in which the casings 72 through 74 are mutually overlaid by predetermined principal surfaces of the casings 72 through 74 fully facing to each other, and a second terminal placement state in which the first principal surfaces or second principal surfaces of the casing 72 through 74 are laterally arrayed in parallel with generally the same direction.

Figure 44:
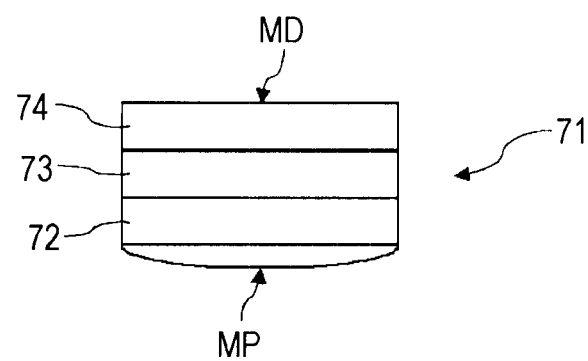
FIG. 44 is an external view illustrating a schematic external configuration example of a three-screen slide-type personal digital assistant according to an embodiment of the present disclosure, and specifically illustrating a terminal in a terminal closed state as viewed from the side wall surface direction side of the casing short side.
Figure 45:
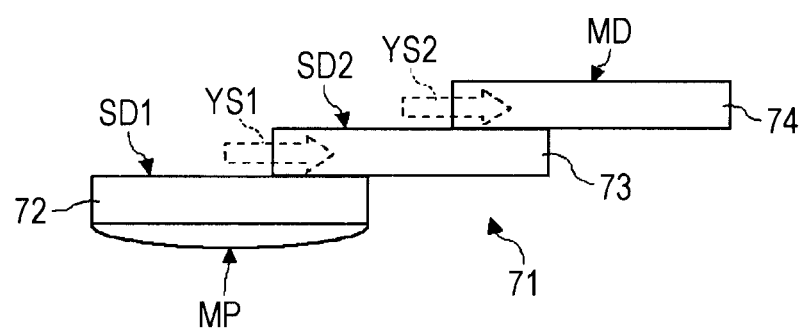
FIG. 45 is an external view illustrating a schematic external configuration example of the three-screen slide-type personal digital assistant according to an embodiment of the present disclosure, and specifically illustrating a state during the first through third casings being subjected to slide transition.
Figure 46:
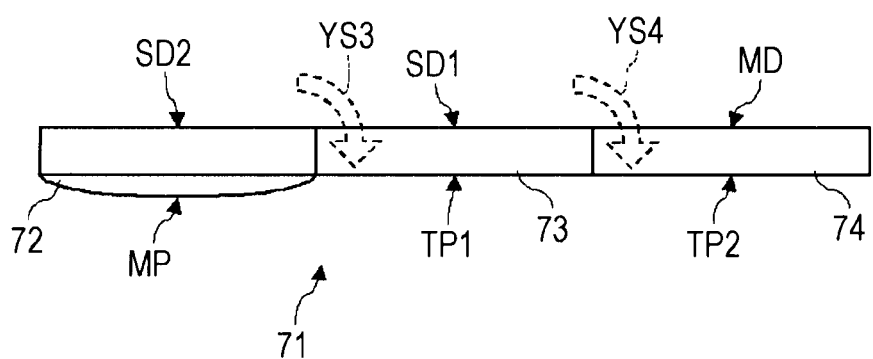
FIG. 46 is an external view illustrating a schematic external configuration example of the three-screen slide-type personal digital assistant according to an embodiment of the present disclosure, and specifically illustrating the terminal being in a terminal opened state by subjecting the first through third casings to slide transition.

Here, in the case of the personal digital assistant 71 illustrated in FIGS. 44 through 49, the above connecting portion is made up of a first connecting portion 76 and a second connecting portion 77, and connects adjacent casings of the casings 72 through 74 so as to be in parallel with the principal surfaces thereof and so as to relatively slide to the casing short directions. Specifically, this connecting portion enables the casings 72 through 74 to make slide transition from the terminal closed state in which the casings 72 through 74 connected by the connecting portion are mutually overlaid as illustrated in FIG. 44 so as to be illustrated with arrow YS1 and YS2 directions in FIG. 45, and further to the terminal opened state in which the first principal surfaces or second principal surfaces of the casings 72 through 74 are laterally arrayed in parallel with generally the same direction as illustrated in arrows YS3 and YS4 in FIG. 46.

Hereafter, description will be made in detail regarding slide transition between the terminal opened state and terminal closed state at this three-screen slide-type personal digital assistant 71, and the operation of the connecting portion, with reference to FIGS. 47 through 49. Note that the configurations illustrated in FIGS. 47 through 49 are consistently an example, and another configuration may be employed as long as this enables the casings 72 through 74 to slide.

As illustrated in FIG. 47, the first casing 72 and the second casing 73 of the personal digital assistant 71 according to the present embodiment are slidably connected by the first connecting portion 76. This first connecting portion 76 is configured of a pair of slide rails 72*a* and 73*b* provided to the first casing 72 and second casing 73, a pair of slide rotary shafts 72*c* and 73*d* which are allowed to slide within the slide rails 72*a* and 73*b*, and a connecting plate 78 which connects the pair of the slide rotary shafts 72*c* and 73*d*. The pair of the slide rails 72*a* and 73*b* are provided to both wall face portions on the short sides of each of the corresponding first casing 72 and second casing 73 respectively, and the rail length thereof is slightly shorter than the casing short length. With the slide rotary shafts 72*c* and 73*d*, one of the shaft edge portions is disposed in the corresponding slide rails 72*a* and 73*b* respectively, and the other shaft edge portion is connected by the connecting plate 78 respectively, and the slide rotary shafts 72*c* and 73*d* can slide in the slide direction within the slide rails 72*a* and 73*b*, and also can turn around the shaft direction thereof.

Also, the second casing 73 and the third casing 74 are slidably connected by the second connecting portion 77. This second connecting portion 77 is configured of a pair of slide rails 73*a* and 74*a* provided to the second casing 73 and third casing 74, a pair of slide rotary shafts 73*c* and 74*c* which are allowed to slide within the slide rails 73*a* and 74*a*, and a connecting plate 79 which connects the pair of the slide rotary shafts 73*c* and 74*c*. The pair of the slide rails 73*a* and 74*a* are provided to both wall face portions on the short sides of each of the corresponding second casing 73 and third casing 74 respectively, and the rail length thereof is slightly shorter than the casing short length. With the slide rotary shafts 73*c* and 74*c*, one of the shaft edge portions is disposed in the corresponding slide rails 73*a* and 74*a* respectively, and the other shaft edge portion is connected by the connecting plate 79 respectively, and the slide rotary shafts 73*c* and 74*c* can slide in the slide direction within the slide rails 73*a* and 74*a*, and also can turn around the shaft direction thereof.

As described above, the first casing 72 and the second casing 73 are connected by the first connecting portion 76, and the second casing 73 and the third casing 74 are connected by the first connecting portion 77, whereby the three-screen slide-type personal digital assistant 71 according to the present embodiment can relatively slide each of the first casing 72 through the third casing 74 as illustrated in FIGS. 48 and 49. Specifically, the three-screen slide-type personal digital assistant 71 according to the present embodiment slides, from the terminal closed state as illustrated in (A) in the drawing of FIG. 48, for example, as illustrated in (B) through (D) in the drawing, the third casing 74 as to the second casing 73, or slides a set of the first casing 72 and the second casing 73 as to the third casing 74, whereby the first sub display panel SD1 of the second casing 73, and the main display panel MD of the third casing 74 can laterally be arrayed generally in parallel, for example. Further, the three-screen slide-type personal digital assistant 71 according to the present embodiment slides, from the state as illustrated in (D) in the drawing of FIG. 48, for example, as illustrated in (E) through (G) in the drawing in FIG. 49, a set of the second casing 73 and the third casing 74 as to the first casing 72, or slides a set of the second casing 73 and the third casing 74 as to the first casing 72, whereby the first sub display panel SD1, second sub display panel SD2, and main display panel MD of each of the first through third casings 72 through 74 can laterally be arrayed generally in parallel.

State Detection Sensor of Three-Screen Slide-type Terminal and Placement Thereof With the three-screen slide-type personal digital assistant 71 according to the present embodiment, as for the opened/closed detection sensor, for example, a magnet and a hole element, or an MR sensor, or a limit switch, or the like can be employed, which are the same as those employed for the above three-screen folding-type terminal.

With the three-screen slide-type personal digital assistant 71 according to the present embodiment, for example, the magnet and hole element for opened/closed detection between the first casing 72 and the second casing 73 are disposed, for example, in a position where the magnet and hole element correspond to each other at the time of the closed state in which the first casing 72 and the second casing 73 are mutually overlaid. Similarly, for example, the magnet and hole element for opened/closed detection between the second casing 73 and the third casing 74 are disposed, for example, in a position where the magnet and hole element mutually face at the time of the closed state in which the second casing 73 and the third casing 74 are mutually overlaid. However, it is desirable that the disposed positions of the magnet and hole element provided to the first casing 72 and the second casing 73, and the disposed positions of the magnet and hole element provided to the second casing 73 and the third casing 74 are separated to some extent, respectively. For example, let us say that in the event that the magnet and hole element of the first casing 72 and the second casing 73 are provided to the neighborhood of one edge portion in the casing long directions, the magnet and hole element of the second casing 73 and the third casing 74 are provided to the neighborhood of the other edge portion. Thus, an erroneous situation can be prevented wherein the hole elements for opened/closed detection of the first and second casings 72 and 73 erroneously detect the magnetism of the magnets of the second and third casings 73 and 74, or conversely the hole elements for opened/closed detection of the second and third casings 73 and 74 erroneously detect the magnetism of the magnets of the first and second casings 72 and 73.

The three-screen slide-type personal digital assistant 71 according to the present embodiment can detect, for example, the state illustrated in (A) in the drawing of FIG. 48, the states illustrated in (B) through (D) in the drawing of FIG. 48, and the states illustrated in (E) through (G) in the drawing of FIG. 49 by providing such an opened/closed detection sensor.

Note that the three-screen slide-type personal digital assistant 71 according to the present embodiment also includes, in the same way as with the above three-screen folding-type personal digital assistant 1, a horizontal/vertical detection sensor, a direction detection sensor, a position detection sensor, an acceleration detection sensor, a temperature detection sensor, a humidity detection sensor, an optical detection sensor, an infrared sensor, and further other various sensors.

Also, in this case as well, in the same way as described above, for example, as for the horizontal/vertical detection sensor, a gravity sensor or acceleration sensor or magnetic field sensor or the like can be employed, and as for the direction detection sensor, a magnetic field sensor or the like, and as for the position detection sensor, a GPS sensor or the like can be employed. These various types of sensors may be provided to any one casing of the first through third casings 72 through 74, or may be provided to all casings of the first through third casings 72 through 74, or any two casings thereof. For example, in the event that a horizontal/vertical detection sensor is provided to all casings of the first through third casings 72 through 74, or an acceleration sensor is provided to all casings, detection of horizontal/vertical or acceleration or the like can be performed for each casing, whereby particular terminal control according to that, or the like can be performed.

Schematic Configuration of Personal Digital Assistant

Figure 50:
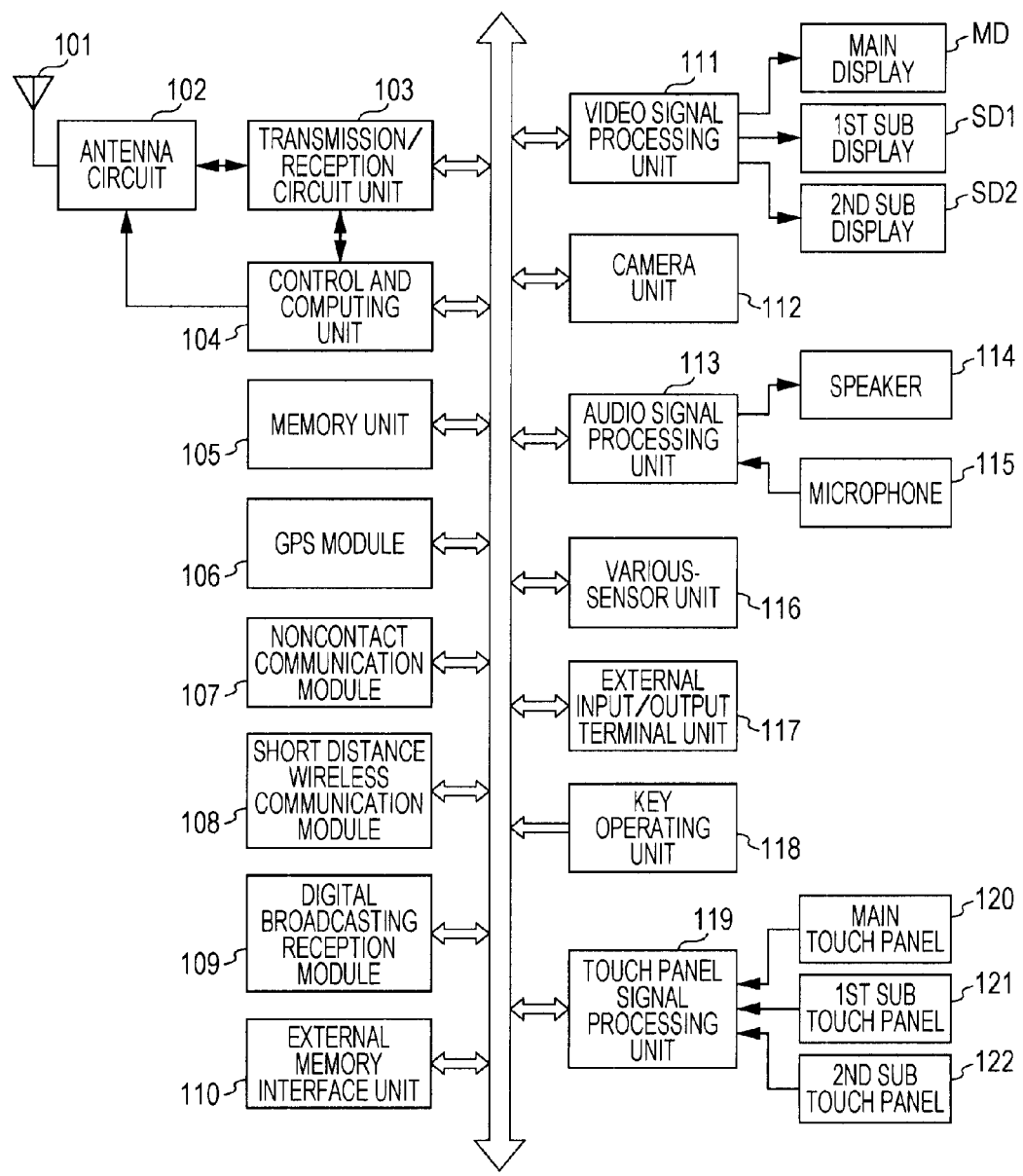
FIG. 50 is a block diagram illustrating, in a case where the personal digital assistant according to the present embodiment is, for example, a cellular phone terminal, a schematic internal configuration example of this cellular phone terminal.

FIG. 50 illustrates a schematic internal configuration example in the event that the personal digital assistant 1 according to the present embodiment is, for example, a cellular phone terminal.

In FIG. 50, a communication antenna 101 is, for example, a built-in antenna, and performs transmission/reception of telephonic communication or e-mail, downloading of various types of application programs including the display control program according to the present embodiment, and transmission/reception of signal waves for communicating with the Internet or the like via a cellular phone network. An antenna circuit 102 is made up of an antenna switcher, a matching circuit, a filter circuit, and so forth, and a transmission/reception circuit unit 103 performs frequency conversion, modulation, and demodulation of a transmission/reception signal, and so forth.

A speaker 114 is a speaker for receiver provided to the personal digital assistant 1 according to the present embodiment, a ringer (ringtone), and a speaker for output such as playback music or the like. A microphone 115 is a microphone for transmitter and for external audio collection. An audio signal processing unit 113 is configured of an amplifier circuit for the speaker 114, an amplifier circuit for the microphone 115, a decompression decoding circuit for subjecting compressed and encoded audio data supplied from a control and computing unit 104 to decompression decoding, a digital/analog conversion circuit for converting the digital audio data after the decompression decoding into an analog audio signal, an analog/digital conversion circuit for converting the analog audio signal input from the microphone 115 into digital audio data, and a compression encoding circuit for subjecting this digital audio data to compression encoding, and so forth.

A video signal processing unit 111 is configured of a decompression decoding circuit for subjecting the compressed and encoded video data supplied from the control and computing unit 104 to decompression decoding, a display panel driving circuit for displaying a digital video after the decompression decoding, a digital broadcasting video received at a digital broadcasting reception module 109, or the like on the main display panel MD, first sub display panel SD1, or second sub display panel SD2, and so forth. Also, in the case of the present embodiment, this video signal processing unit 111 generates, at the time of the above terminal closed state, a video signal for displaying a video on the one screen of the main display panel MD, and a video signal for displaying a video on the above three screens in the terminal closed state. Note that the above video signal for displaying various types of videos of one screen worth or three screens worth may be generated at the control and computing unit 104.

A key operating unit 118 is configured of the pressing keys K provided to the above first casing 2, second casing 3, and third casing 4 of the personal digital assistant 1 according to the present embodiment, and peripheral circuits thereof, the above release button 7S and peripheral circuits thereof, and so forth. This key operating unit 118 converts operation input to the pressing keys K and release button 7S into an electrical signal, amplifies the operation input signal thereof, subjects this to analog/digital conversion, and transmits operation input data after analog/digital conversion thereof to the control and computing unit 104.

An external input/output terminal unit 117 is configured of a connector for cable connection and an interface circuit for external data communication, for example, at the time of performing data communication via a cable, a charging terminal and an interface circuit for charging at the time of charging an internal battery via a power cable or the like, and so forth. The various types of application programs including the display control program according to the present embodiment may be obtained via this external input/output terminal unit 117. Also, an external memory interface unit 110 is configured of a slot for external memory to/from which a storage medium such as external memory is attached/detached, an interface circuit for this external memory data communication, and so forth. The various types of application programs including the display control program according to the present embodiment may be obtained via a storage medium such as external memory inserted into this external memory interface unit 110.

Specifically, the above storage medium stores the display control program for controlling display of the personal digital assistant according to the present embodiment. Subsequently, when the terminal state detection sensor detects that this terminal is in the terminal opened state, the display control program stored in the storage medium according to the present embodiment causes the control and computing unit 104 to execute processing for displaying a video of the predetermined aspect ratio on the main display panel MD which is in a state constantly externally exposed in the terminal closed state. Also, when the terminal state detection sensor detects that this terminal is in the terminal opened state, and also detects that the horizontal and vertical directions of this terminal are directions where an aspect ratio obtained by adding all the display panels in the terminal opened state generally matches the above predetermined aspect ratio, the display control program stored in the storage medium according to the present embodiment causes the control and computing unit 104 to execute processing for dividing the video of the predetermined aspect ratio according to the number of the displays of the casings, enlarging each of the divided videos in accordance with the display size of one display panel, and also adapting the placement relationship of each divided and enlarged video to the video of the predetermined aspect ratio before division to distribute each divided and enlarged video to the display of each casing in the terminal opened state for display. Also, when the terminal state detection sensor detects that this terminal is in the terminal opened state, and also detects that the horizontal and vertical directions of this terminal are directions where an aspect ratio obtained by adding all the display panels in the terminal opened state and the predetermined aspect ratio are rotated generally 90 degrees, the display control program stored in the storage medium according to the present embodiment causes the control and computing unit 104 to execute processing for displaying the video of the predetermined aspect ratio on any one display panel, and displaying related information of the video of the predetermined aspect ratio on the other display panels.

A short-distance wireless communication module 108 is configured of a communication antenna for short-distance wireless waves such as a wireless LAN, Bluetooth (registered trademark), or the like, and a short-distance wireless communication circuit. The various types of application programs including the display control program according to the present embodiment may be obtained via this short-distance wireless communication module 108.

The digital broadcasting reception module 109 is configured of an antenna for reception of what is called digital television broadcasting or digital radio broadcasting or the like, and a tuner. This digital broadcasting reception module 109 is configured so as to receive not only the digital broadcasting of one channel but also the digital broadcastings of multiple channels at the same time. Also, this digital broadcasting reception module 109 is also configured so as to receive data multiplexed in digital broadcasting. Note that an arrangement may be made wherein the digital broadcasting data received at the digital broadcasting reception module 109 is, for example, compressed or the like by the control and computing unit 104, and is then stored (i.e., recorded) in the memory unit 105 or the like.

A camera unit 112 is configured of an imaging device for taking a still image or moving image, an optical system or the like and peripheral circuits thereof, and a driving circuit of the light 8 for emitting extra light for shooting, and so forth. The still image data or moving image data at the time of shooting by this camera unit 112 is transmitted to the video signal processing unit 111 as preview video data. Thus, a preview image is displayed on the display panel at the time of this camera shooting. Note that details regarding how to display the preview video on the display panel at the time of camera shooting will be described later. Also, in the event of recording the still image data or moving image data taken at the camera unit 112, this taken still image data or moving image data is transmitted to the control and computing unit 104 and compressed, and then stored in the memory unit 105 or the external memory connected to the memory interface unit 110.

A noncontact communication module 107 performs noncontact communication used for, for example, RFID (Radio Frequency-Identification) or noncontact type IC card or the like via a noncontact communication antenna.

A GPS (Global Positioning System) module 106 includes a GPS antenna, and uses a GPS signal from a GPS geodetic satellite to obtain the latitude and longitude of the current position of the terminal itself. The GPS data (information representing latitude and longitude) obtained by this GPS module 106 is transmitted to the control and computing unit 104. Thus, the control and computing unit 104 can know the current position and movement and so forth of the terminal.

A various-sensor unit 116 is configured of various detection sensors such as the above terminal state detection sensor and so forth for detecting the state of the personal digital assistant 1 according to the present embodiment, and peripheral circuits thereof. Detection signals from the various-sensor unit 116 are sent to the control and computing unit 104. Thus, the control and computing unit 104 can know the state of this personal digital assistant 1.

A main touch panel 120 is a transparent touch sensor panel disposed on the entire surface of the above main display panel MD, a first sub touch panel 121 is a transparent touch sensor panel disposed on the entire surface of the above first sub display panel SD1, and a second sub touch panel 122 is a transparent touch sensor panel disposed on the entire surface of the above second sub display panel SD2. A touch panel signal processing unit 119 measures the touch detection position, touch path, touch time interval, and so forth from the touch panels 121 and 122, and transmits the measured data thereof to the control and computing unit 104 as touch detection data.

The memory unit 105 is configured of built-in memory provided to the inner portion of this terminal, and detachable card-shaped memory which stores so-called SIM (Subscriber Identity Module) information and so forth. The built-in memory 105 is made up of ROM (Read Only Memory) and RAM (Random Access Memory). The ROM stores an OS (Operating System), the control program for the control and computing unit 104 controlling each unit, various types of initialization values, dictionary data, various types of audio data, the various types of application programs including the display control program according to the present embodiment, and so forth. This ROM includes rewritable ROM such as NAND-type flash memory or EEPROM (Electrically Erasable Programmable Read-Only Memory), and can store e-mail data, the data of a phone book or mail address book, the data of a still image or moving image content, or otherwise, various types of user setting values, and so forth. The RAM stores successively stores data serving as a work area and a buffer area at the time of the control and computing unit 104 performing various types of data processing.

The control and computing unit 104 is made up of a CPU (Central Processing Unit), controls each unit such as the transmission/reception circuit unit 103, video signal processing unit 111, audio signal processing unit 113, GPS module 106, noncontact communication module 107, short-distance wireless communication module 108, digital broadcasting reception module 109, external memory interface unit 110, camera unit 112, various-sensor unit 116, external input/output terminal unit 117, key operating unit 118, touch panel signal processing unit 119, and so forth, and also performs various types of computation as appropriate. Also, the control and computing unit 104 executes the control program or various types of application programs stored in the memory unit 105. Description will be made later regarding the flow of the operation control of this personal digital assistant 1 according to the control and computing unit 104 executing the control program or application program.

In addition, the personal digital assistant 1 according to the present embodiment also naturally includes various components provided to a common personal digital assistant, such as a clock unit for measuring time duration and point-in-time, a battery for supplying power to each unit, a power management IC for controlling the power thereof, and so forth.

Processing Flow at Control and Computing Unit at the Time of Various Operation Control of the Present Embodiment FIGS. 51 through 63 illustrate a processing flow when the three-screen folding-type personal digital assistant 1 according to the present embodiment executes principal some operation controls of various operation controls based on each application program including the display control program according to the present embodiment of the present disclosure. Note that the control processing of the flowchart illustrated in FIGS. 51 through 63 is realized by the control and computing unit 104 executing the corresponding application program stored in the memory unit 105. It goes without saying that the flow illustrated in later-described each flowchart is an example, and embodiments of the present disclosure are not restricted to this. Also, generally the same processing is performed in the case of the above three-screen slide-type personal digital assistant 71.

Processing Flow of First Operation Control Through Third Operation Control

FIGS. 51 through 54 illustrate a processing flow at the time of executing an application program that realizes the above first operation control, second operation control, and third operation control.

Figure 51:
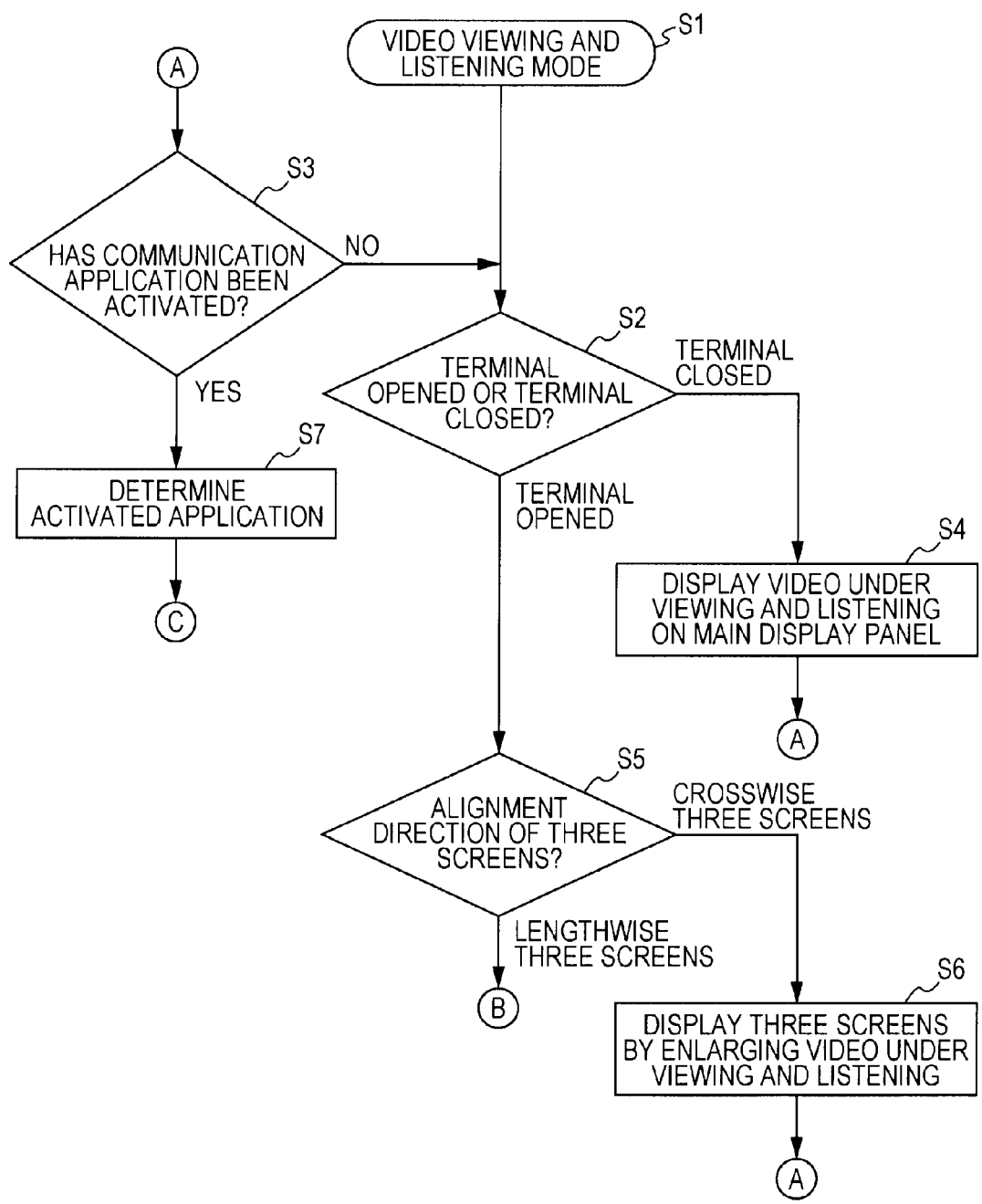
FIG. 51 is a flowchart illustrating a flow of processing at the time of the personal digital assistant executing an application program for realizing first operation control through third operation control, and specifically illustrating a flow of a processing portion for performing one-screen display and three-screen enlarged display of a video according to terminal opening/closing operation.

First, in FIG. 51, as step S1, for example, upon the operation mode of the personal digital assistant 1 according to the present embodiment being set to a video viewing and listening mode by the instruction from the user, the control and computing unit 104 activates an application program for video viewing and listening.

Upon activating the application program for video viewing and listening, the control and computing unit 104 determines whether the state of the terminal is the terminal closed state or terminal opened state based on the detection output of the terminal state detection sensor as step S2. In the event that determination is made in step S2 that the state of the terminal is the terminal closed state, the control and computing unit 104 advances the processing to step S4, and displays a video on the one screen of the main display panel MD. Subsequently, the control and computing unit 104 advances the processing to step S3. Note that, with this flowchart, let us say that the video displayed on the one screen of the main display panel MD in this step S4 is a video of an aspect ratio of 16:9 that is a landscape video as viewed from the user like the example in FIG. 26.

On the other hand, in the event that determination is made in step S2 that the state of the terminal is the terminal opened state, the control and computing unit 104 advances the processing to step S5.

Upon proceeding to the processing in this step S5, the control and computing unit 104 determines, based on the detection output of the terminal state detection sensor, whether the alignment direction of the three screens according to the three display panels of the main, first sub, and second sub display panels is in a state arrayed in the horizontally lateral direction as viewed from the user, or in a state arrayed in the vertically longitudinal direction.

In the event that determination is made in this step S5 that the three screens are arrayed in the horizontally lateral direction as viewed from the user, the control and computing unit 104 advances the processing to step S6, and uses, as illustrated in the example in FIG. 27, the three screens arrayed in the horizontally lateral direction to display the enlarged video of the aspect ratio of 16:9. Subsequently, the control and computing unit 104 advances the processing to step S3.

Figure 52:
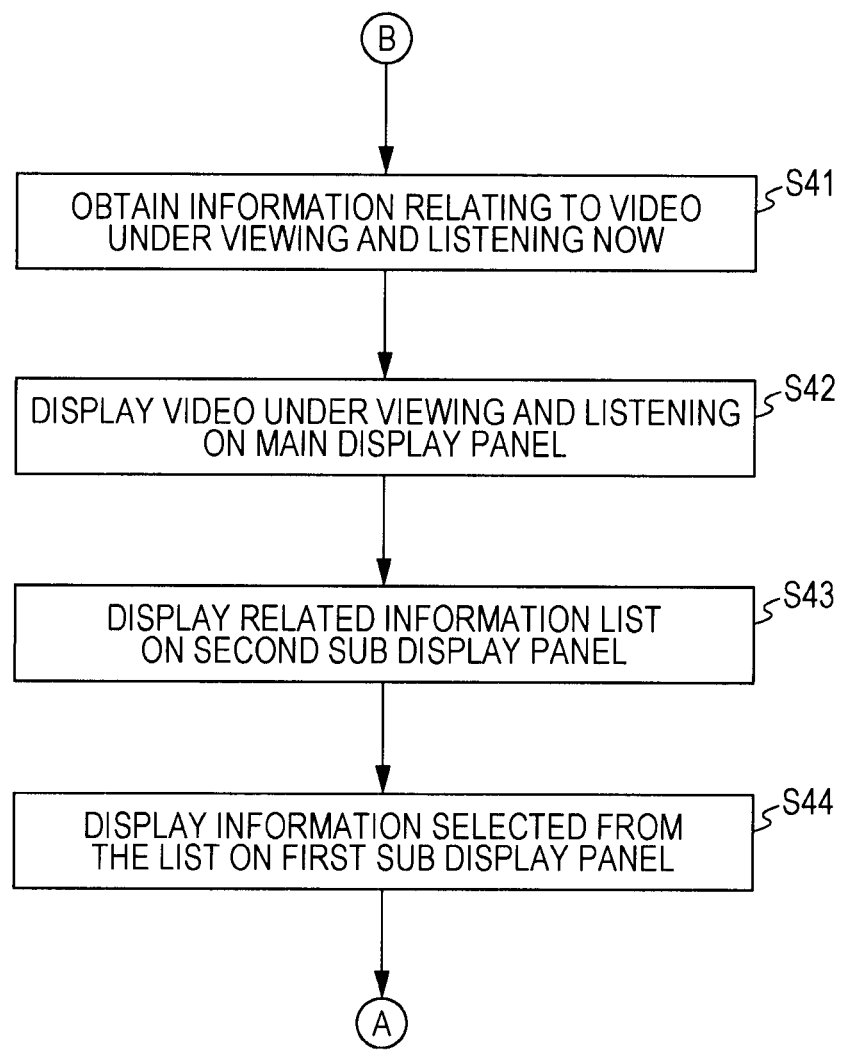
FIG. 52 is a flowchart illustrating a flow of processing at the time of the personal digital assistant executing an application program for realizing the first operation control through third operation control, and specifically illustrating a flow of a processing portion for displaying a moving image, a moving image of related information thereof, and supplementary information on the three screens.

Also, in the event that determination is made in the determination in step S5 that three screens are arrayed in the vertically longitudinal direction as viewed from the user, the control and computing unit 104 advances the processing to step S41 in the flowchart in FIG. 52.

Upon proceeding to the processing in step S41 in FIG. 52, the control and computing unit 104 obtains information relating to the video currently under viewing and listening.

Also, as illustrated in the example in FIG. 33, as the processing in step S42, the control and computing unit 104 displays the video currently under viewing and listening on the main display panel MD, and also displays a list of the related information obtained in step S41 on the second sub display panel SD2 as the processing in step S43.

Subsequently, upon the user selecting desired related information out of the list of the related information displayed on the second sub display panel SD2, for example, through the touch sensor panel or the like, the control and computing unit 104 displays, as illustrated in the example in FIG. 33, this selected related information (e.g., the video of another channel) on the first sub display panel SD1.

After the processing in step S44, the control and computing unit 104 advances the processing to the processing in step S3 in FIG. 51.

Upon proceeding to the processing in step S3 in FIG. 51, the control and computing unit 104 determines whether or not an activation instruction of the above application program for communication between users such as an e-mail or the like has been made. Note that the activation instruction at this time also includes an automatic activation instruction, for example, such as periodical detection of incoming e-mails in addition to a case where explicit activation instruction input is performed by the user. In the event that determination is made in the determination in step S3 that no activation instruction has been performed regarding any of the application programs for communication between users, the control and computing unit 104 returns the processing to step S2.

On the other hand, in the event that determination is made that the activation instruction has been made regarding one of the application programs for communication between users, the control and computing unit 104 advances the processing to step S7, and determines which application of various applications, for example, such as the above-mentioned e-mail, live chat, Twitter (registered trademark) and so forth, the application activation instruction thereof is. Subsequently, the control and computing unit 104 which has determined the type of this application proceeds to a processing flow of activation of the application program subjected to activation instruction thereof, and execution thereof.

Figure 53:
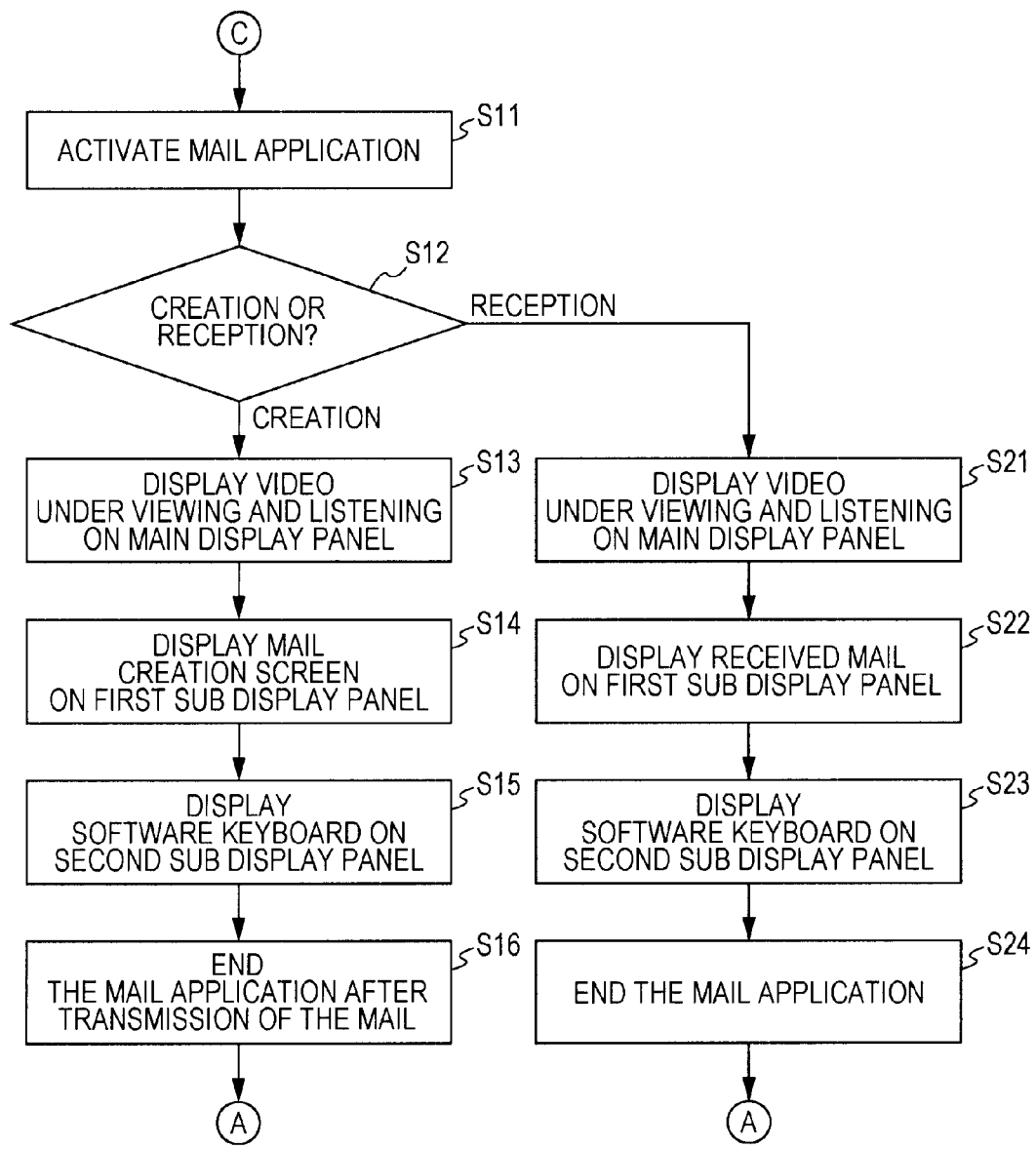
FIG. 53 is a flowchart illustrating a flow of processing at the time of the personal digital assistant executing an application program for realizing the first operation control through third operation control, and specifically illustrating a flow of a processing portion after activation of an e-mail application program.

Here, when the application subjected to the activation instruction in step S7 is an e-mail application program, the control and computing unit 104 proceeds to the processing flow in FIG. 53.

With the flowchart in FIG. 53, first, the control and computing unit 104 activates this e-mail application program as step S11. Next, the control and computing unit 104 determines as step S12 whether activation of this e-mail application program is activation for creating an e-mail by the user, or activation due to reception of an e-mail by automatic incoming detection.

In the event that determination is made in step S12 that this activation is activation for creating an e-mail, the control and computing unit 104 advances the processing to step S13 and thereafter.

Note that creation of an e-mail during execution of the above application program for video viewing and listening is performed at the time of the personal digital assistant 1 according to the present embodiment being in a state as illustrated in FIG. 34. Therefore, the processing in step S13 and thereafter is processing to be executed at the time of the personal digital assistant 1 according to the present embodiment being in the state in FIG. 34.

Upon proceeding to the processing in step S13, the control and computing unit 104 displays the video under viewing and listening by execution of the application program for video viewing and listening, on the main display panel MD.

Also, the control and computing unit 104 at this time displays a screen for e-mail creation on the first sub display panel SD1 as the processing in step S14, and also displays the software keyboard on the second sub display panel SD2 as the processing in step S15.

Subsequently, upon creation of an e-mail being completed, and a transmission instruction of the e-mail thereof being input from the user, the control and computing unit 104 transmits the e-mail thereof as the processing in step S16, and then ends this e-mail application program. After end of this e-mail application program, the control and computing unit 104 returns the processing to step S3 in FIG. 51.

Also, upon determination being made in step S12 that this activation is activation due to a an incoming e-mail, and further, the user changing this terminal 1 to the terminal opened state due to this incoming e-mail, the control and computing unit 104 advances the processing to step S21 and thereafter.

Upon proceeding to the processing in step S21, the control and computing unit 104 displays the video under viewing and listening by execution of the application for video viewing and listening, on the main display panel MD.

Also, the control and computing unit 104 at this time displays the screen of a received e-mail on the first sub display panel SD1 as the processing in step S22, and also displays the software keyboard on the second sub display panel SD2 as the processing in step S23.

Subsequently, upon viewing of this received e-mail being completed, and an end instruction for this e-mail display being input from the user, the control and computing unit 104 ends this e-mail application program as the processing in step S24. After end of this e-mail application program, the control and computing unit 104 returns the processing to step S3 in FIG. 51.

Figure 54:
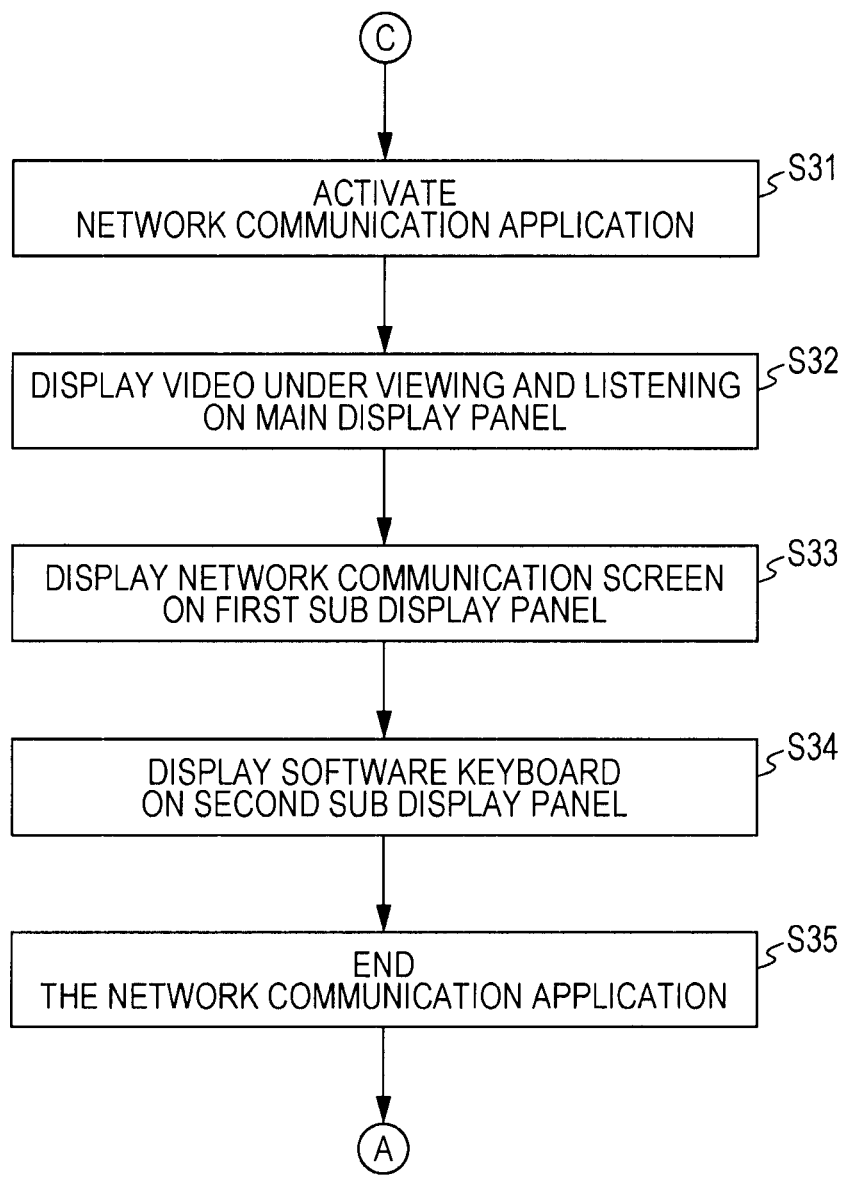
FIG. 54 is a flowchart illustrating a flow of processing at the time of the personal digital assistant executing an application program for realizing the first operation control through third operation control, and specifically illustrating a flow of a processing portion after activation of a network communication application program.

Also, in the event that determination is made in step S7 that the application subjected to activation instruction is an application program for network communication, for example, such as live chat, Twitter (registered trademark), or the like, the control and computing unit 104 proceeds to the processing flow in FIG. 54.

With the flowchart in FIG. 54, the control and computing unit 104 first activates the application program for network communication thereof as step S31.

Note that communication between users due to execution of the network application program during execution of the application program for video viewing and listening is performed at the time of the personal digital assistant 1 according to the present embodiment being in a state as illustrated in FIG. 34. Therefore, the processing in step S31 and thereafter is processing to be executed at the time of the personal digital assistant 1 according to the present embodiment being in a state as illustrated in FIG. 34.

Upon proceeding to the processing in step S32, the control and computing unit 104 displays the video under viewing and listening due to execution of the application program for video viewing and listening on the main display panel MD.

Also, the control and computing unit 104 at this time displays the screen for network communication between users on the first sub display panel SD1 as the processing in step S33, and also displays the software keyboard on the second sub display panel SD2 as the processing in step S34.

Subsequently, for example, upon end of the network communication between users being instructed by the user, the control and computing unit 104 ends this application program for network communication as the processing in step S35. After end of this application program, the control and computing unit 104 returns the processing to step S3 in FIG. 51.

Processing Flow of Fourth Operation Control Through Sixth Operation Control

Figure 55:
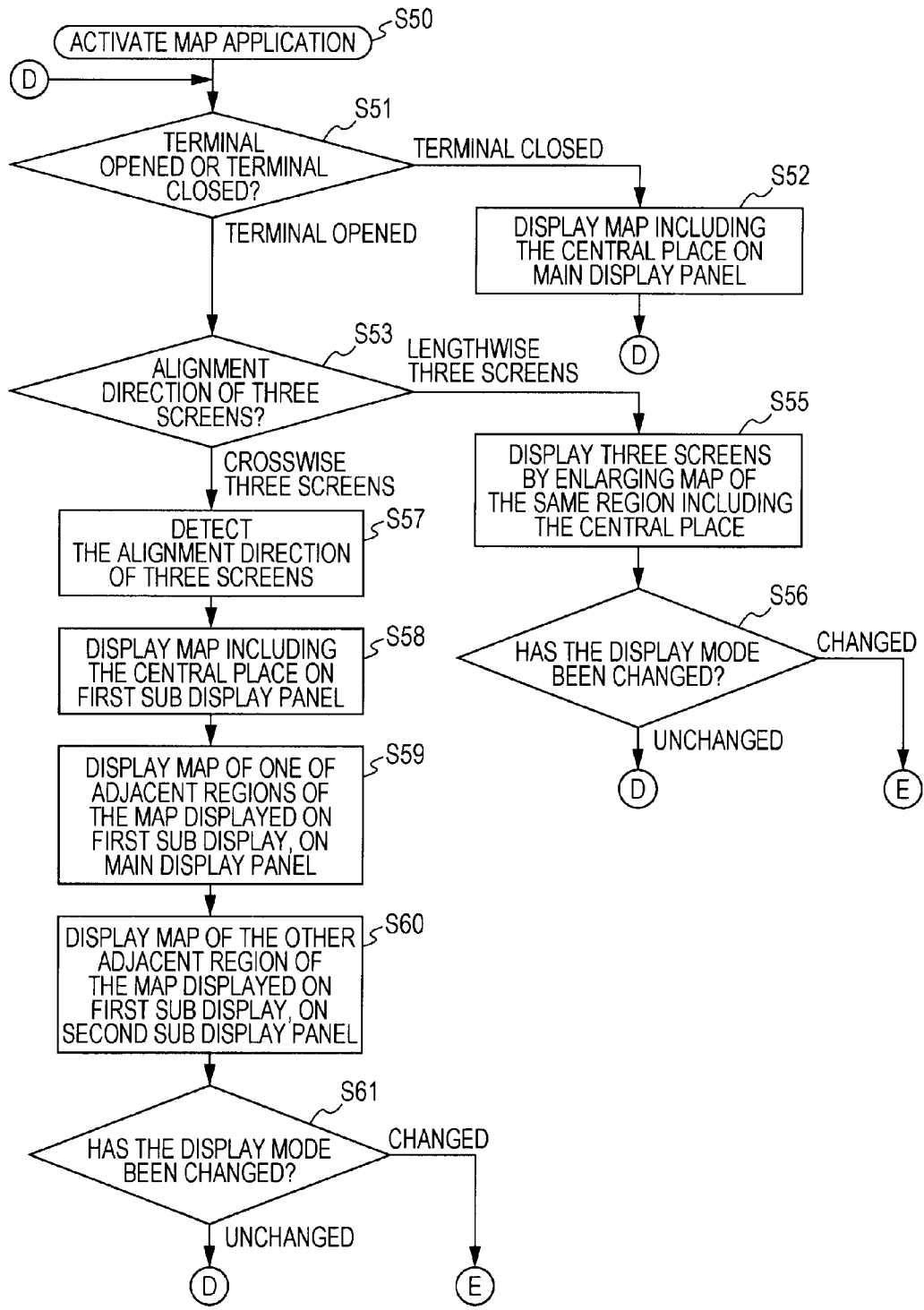
FIG. 55 is a flowchart illustrating a flow of processing at the time of the personal digital assistant executing an application program for realizing fourth operation control through sixth operation control, and specifically illustrating a flow of a processing portion for performing one-screen map display, three-screen enlarged map display, or three-screen wide area map display according to terminal opening/closing operation.
Figure 56:
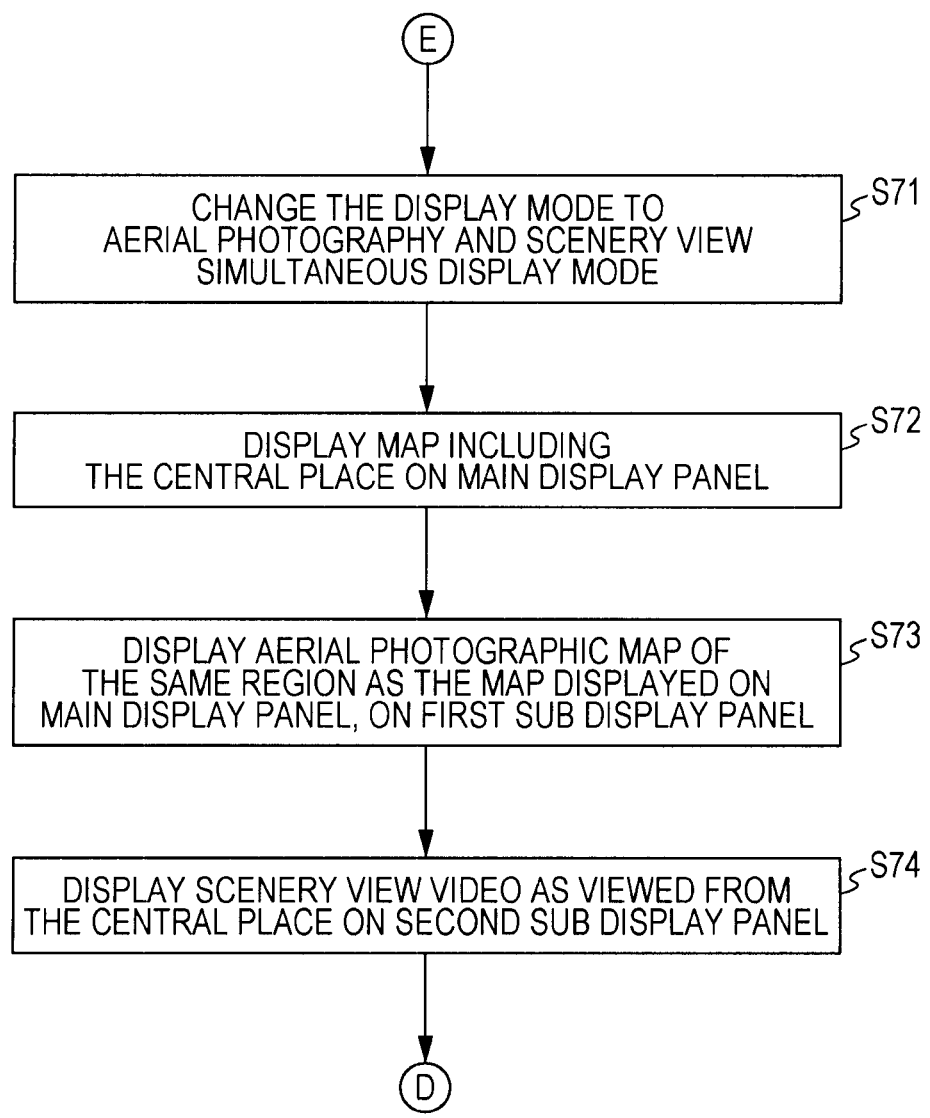
FIG. 56 is a flowchart illustrating a flow of processing at the time of the personal digital assistant executing an application program for realizing the fourth operation control through sixth operation control, and specifically illustrating a flow of a processing portion for displaying a map, an aerial photographic video, and a live scenery view video on the three screens.

FIGS. 55 and 56 illustrate a processing flow at the time of execution of an application program for realizing the above fourth operation control, fifth operation control, and sixth operation control.

First, in FIG. 55, upon the operation mode of the personal digital assistant 1 according to the present embodiment being set to a map display mode, for example, by the instruction from the user, the control and computing unit 104 activates an application program for map display as step S50.

Upon the application program for map display being activated, the control and computing unit 104 determines whether the state of the terminal is the terminal closed state or terminal opened state, based on the detection output of the terminal state detection sensor, as step S51. In the event that determination is made in the determination in step S51 that the terminal is the terminal closed state, the control and computing unit 104 advances the processing to step S52, and displays a map including the central place on the one screen of the main display panel MD. Subsequently, the control and computing unit 104 returns the processing to step S51.

On the other hand, in the event that determination is made in the determination in step S51 that the state of the terminal is in the terminal opened state, the control and computing unit 104 advances the processing to step S53.

Upon proceeding to the processing in step S53, the control and computing unit 104 determines whether the alignment direction of the three screens according to the three display panels of the main, first sub, and second sub display panels is in a state arrayed in the horizontally lateral direction or a state arrayed in the vertically longitudinal direction, based on the detection output of the terminal state detection sensor.

In the event that determination is made in step S53 that the three screens are arrayed in the horizontally lateral direction, the control and computing unit 104 advances the processing to step S57.

Upon proceeding to the processing in step S57, the control and computing unit 104 detects the direction where the three screens are arrayed, based on the detection output of the terminal state detection sensor.

Subsequently, the control and computing unit 104 displays a map including the central place on the first sub display panel SD1 as the processing in step S58.

Also, the control and computing unit 104 at this time displays the map of a region adjacent to the map displayed on the first sub display panel SD1, and also matching the direction of the main display panel MD in the alignment direction of the three screens, on the main display panel MD, as the processing in step S59.

Similarly, the control and computing unit 104 displays the map of a region adjacent to the map displayed on the first sub display panel SD1, and also matching the direction of the second sub display panel SD2 in the alignment direction of the three screens, on the second sub display panel SD2, as the processing in step S60.

Subsequently, the control and computing unit 104 determines whether or not a switching instruction from the mode of the fifth operation control example between step S57 and step S60 to the mode of the sixth operation control example has been input from the user, and in the event of determining that the mode switching instruction has been input, advances the processing to step S71 and thereafter in FIG. 56, and on the other hand, in the event of determining that the mode switching instruction has not been input, returns the processing to step S51.

Also, in the event that determination is made in the determination in step S53 that the three screens are arrayed in the vertically longitudinal direction as viewed from the user, the control and computing unit 104 advances the processing to step S55.

Upon proceeding to the processing in step S55, the control and computing unit 104 displays a detailed map obtained by enlarging the map of the same region including the central place as with the fourth operation control example on the three screens.

After the processing in step S55, the control and computing unit 104 determines whether or not a switching instruction from the mode of the fourth operation control example to the mode of the sixth operation control example has been input from the user, and in the event of determining that the mode switching instruction has been input, advances the processing to step S71 and thereafter in FIG. 56, and on the other hand, in the event of determining that the mode switching instruction has not been input, returns the processing to step S51.

Upon the mode switching instruction to the sixth operation control example being input, and the processing proceeding to the processing in step S71 in FIG. 56, the control and computing unit 104 switches the display mode of the three screens of this terminal 1 to a mode for simultaneously displaying the above map, aerial photo, and live scenery view on the three screens.

Subsequently, the control and computing unit 104 advances the processing to step S72, and displays the map including the central place on the main display panel MD.

Also, the control and computing unit 104 at this time displays the video of the aerial photo map of the same region as the map displayed on the main display panel MD on the first sub display panel SD1 as the processing in step S73.

Also, the control and computing unit 104 displays the video of the live scenery view as viewed from the central place on the second sub display panel SD2 as the processing in step S74.

Subsequently, upon an instruction for ending the display mode between step S71 and step S74 being input from the user, the control and computing unit 104 returns the processing to step S51 in FIG. 55.

Processing Flow of Seventh Operation Control

Figure 57:
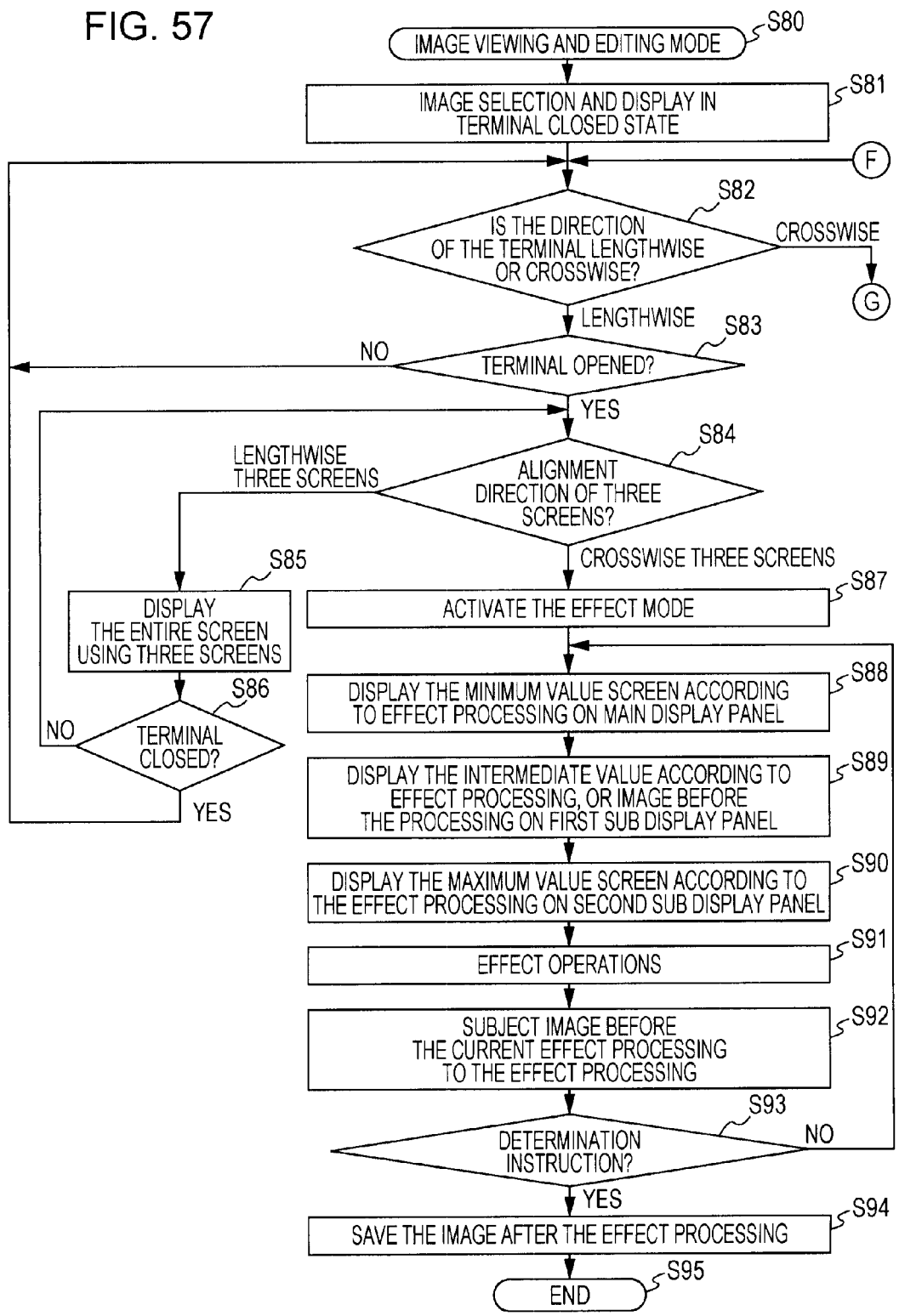
FIG. 57 is a flowchart illustrating a flow of processing at the time of the personal digital assistant executing an application program for realizing seventh operation control, and specifically illustrating a flow of a processing portion for displaying an effect processed image on the three screens at the time of transition being made from a terminal closed state to a terminal opened state in the vertically longitudinal direction.
Figure 58:
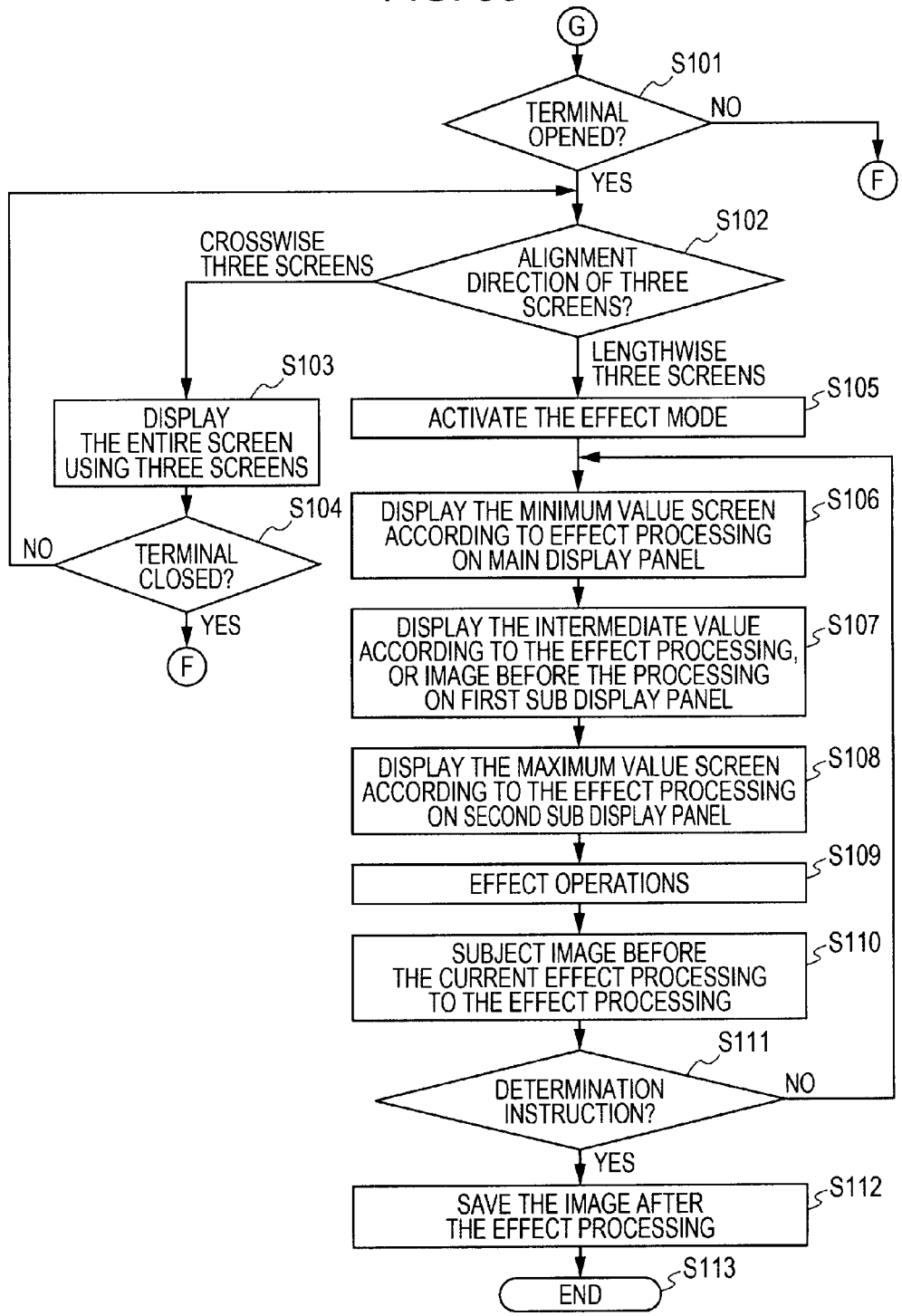
FIG. 58 is a flowchart illustrating a flow of processing at the time of the personal digital assistant executing an application program for realizing the seventh operation control, and specifically illustrating a flow of a processing portion for displaying an effect processed image on the three screens at the time of transition being made from a terminal closed state to a terminal opened state in the horizontally lateral direction.

FIGS. 57 and 58 illustrate a processing flow at the time of execution of an application program for realizing the above seventh operation control.

First, in FIG. 58, upon the operation mode of the personal digital assistant 1 according to the present embodiment being set to an image viewing and editing mode, for example, by the instruction from the user, the control and computing unit 104 activates an application program for image viewing and editing as step S80. Note that, with the following description, let us say that the personal digital assistant 1 according to the present embodiment at this time is in the terminal closed state.

Upon the application program for image viewing and editing being activated, the control and computing unit 104 displays a list of images internally stored on the main display panel MD, and further upon a desired image being selected out of the image list thereof by the user, displays this selected image on the main display panel MD.

Next, the control and computing unit 104 determines whether the direction of the terminal in the terminal closed state is either the horizontally lateral direction or the vertically longitudinal direction, based on the detection output of the terminal state detection sensor as step S82. In the event that determination is made in the determination in step S82 that the direction of the terminal is the horizontally lateral direction, the control and computing unit 104 advances the processing to step S101 in FIG. 58, and on the other hand, in the event of determining that the direction of the terminal is the vertically longitudinal direction, advances the processing to step S83.

Upon proceeding to the processing in step S83, the control and computing unit 104 determines whether or not the terminal has been changed from the terminal closed state to the terminal opened state, based on the detection output of the terminal state detection sensor. Subsequently, in the event that determination is made in step S83 that the terminal is still in the terminal closed state, the control and computing unit 104 returns the processing to step S82, and in the event of determining that the terminal has been changed to the terminal opened state, advances the processing to step S84.

Upon proceeding to the processing in step S84, the control and computing unit 104 determines whether the alignment direction of the three screens in the terminal opened state is a state arrayed in the horizontally lateral direction or a state arrayed in the vertically longitudinal direction, based on the detection output of the terminal state detection sensor.

In the event that determination is made in step S84 that the three screens are arrayed in the vertically longitudinal direction, the control and computing unit 104 advances the processing to step S85.

Upon proceeding to the processing in step S85, the control and computing unit 104 enlarges and displays the above selected image using the three screens. Subsequently, the control and computing unit 104 determines in step S86 whether or not the terminal has been returned to the terminal closed state, based on the detection output of the terminal state detection sensor, and in the event that the terminal is still in the terminal opened state, returns the processing to step S84, and in the event that the terminal has been returned to the terminal closed state, returns the processing to step S82.

Also, in the event that determination is made in step S84 that the three screens are arrayed in the horizontally lateral direction, the control and computing unit 104 advances the processing to step S87 and thereafter.

Upon proceeding to the processing in step S87, the control and computing unit 104 awaits that an activation instruction of an effect mode wherein desired effect processing can be executed from the user has been input, and in the event that the activation instruction of this effect mode has been input, advances the processing to step S88. Note that, with the image viewing and editing mode, for example, an arrangement may be made wherein in the event that the state of the terminal has been changed from the terminal closed state to the terminal opened state, and further, in the event that the alignment of the three screens has been changed to the horizontally lateral direction, a predetermined desired effect mode is automatically activated.

Upon proceeding to the processing in step S88, the control and computing unit 104 displays an effect minimum value image obtained by the effect processing when a parameter for determining effect amount is set to the minimum value, on the main display panel MD.

Also, the control and computing unit 104 at this time displays an effect intermediate value image obtained by effect processing when the parameter for determining the effect amount is set to an intermediate value for example, or an image before the current effect processing that is an image at present before the effect processing is performed thereupon, on the first sub display panel SD1, as the processing in step S89.

Also, the control and computing unit 104 displays an effect maximum value image obtained by the effect processing when the parameter for determining the effect amount is set to the maximum value, on the second sub display panel SD2.

Note that the values of the parameter for determining the effect amount in steps S88, S89, and S90 are not restricted to the minimum value, intermediate value, and maximum value, and the user may determine desired parameter values beforehand, or the terminal itself may determine the parameter values based on a predetermined rule, or may randomly change the parameter values.

After the processing in step S90, the control and computing unit 104 advances the processing to step S91, and upon an effect operation being performed by the user so as to select one of effect images displayed on the three screens respectively, subjects an image at present before effect processing to effect processing according to the parameter corresponding to the selected effect image thereof. Subsequently, the control and computing unit 104 displays this image after the effect processing on the first sub display panel SD1.

Subsequently, the control and computing unit 104 determines whether or not a determination instruction for determining the above effect processing has been input from the user as the processing in step S93, and in the event that no determination instruction has been input, returns the processing to step S88. That is to say, in this case, in steps S88 through S91, the image after the effect processing in step S90 becomes a new image at the present before the effect processing.

Upon the determination instruction for the effect processing being input from the user in step S93, the control and computing unit 104 advances the processing to step S94, and stores the image after the effect processing in step S90.

Upon storage processing in step S94 being completed, the control and computing unit 104 ends the processing of this flowchart in step S95.

Also, upon determination being made in step S82 that the direction of the terminal in the terminal closed state is the horizontally lateral direction, and the processing proceeding to the processing in step S101 in FIG. 58, the control and computing unit 104 determines whether or not the terminal has been changed from the terminal closed state to the terminal opened state, based on the detection output of the terminal state detection sensor.

In the event that determination is made in step S101 that the terminal is still in the terminal closed state, the control and computing unit 104 returns the processing to step S82 in FIG. 57, and in the event of determining that the terminal has been changed to the terminal opened state, advances the processing to step S102.

Upon proceeding to the processing in step S102, the control and computing unit 104 determines whether the alignment direction of the three screens in the terminal opened state is a state arrayed in the horizontally lateral direction, or a state arrayed in the vertically longitudinal direction, as viewed from the user, based on the detection output of the terminal state detection sensor.

In the event that determination is made in step S102 that the three screens are arrayed in the horizontally lateral direction, the control and computing unit 104 advances the processing to step S103.

Upon proceeding to the processing in step S103, the control and computing unit 104 enlarges and displays the above selected image using the three screens. Subsequently, the control and computing unit 104 determines in step S104 whether or not the terminal has been returned to the terminal closed state, based on the detection output of the terminal state detection sensor, and in the event that the terminal is still in the terminal opened state, returns the processing to step S102, and in the event that the terminal has been returned to the terminal closed state, returns the processing to step S82 in FIG. 57.

Also, in the event that determination is made in step S102 that the three screens are arrayed in the vertically longitudinal direction, the control and computing unit 104 advances the processing to step S105 and thereafter.

Upon proceeding to the processing in step S105, the control and computing unit 104 awaits that an activation instruction of an effect mode wherein desired effect processing can be executed from the user has been input, and in the event that the activation instruction of this effect mode has been input, advances the processing to step S106. Note that, with the image viewing and editing mode, for example, an arrangement may be made wherein in the event that the state of the terminal has been changed from the terminal closed state to the terminal opened state, and further, in the event that the alignment of the three screens has been changed to the vertically longitudinal direction, a predetermined desired effect mode is automatically activated.

Upon proceeding to the processing in step S106, the control and computing unit 104 displays an effect minimum value image obtained by the effect processing when the parameter for determining the effect amount is set to the minimum value, on the main display panel MD.

Also, the control and computing unit 104 at this time displays an effect intermediate value image obtained by effect processing when the parameter for determining the effect amount is set to an intermediate value for example, or an image before the current effect processing that is an image at present before the effect processing is performed thereupon, on the first sub display panel SD1, as the processing in step S107.

Also, the control and computing unit 104 displays an effect maximum value image obtained by the effect processing when the parameter for determining the effect amount is set to the maximum value, on the second sub display panel SD2.

Note that, in this case as well, in the same way as described above, the values of the parameter for determining the effect amount in steps S106, S107, and S108 are not restricted to the minimum value, intermediate value, and maximum value, and the user may determine desired parameter values beforehand, or the terminal may determine the parameter values based on a predetermined rule, or may randomly change the parameter values.

After the processing in step S108, the control and computing unit 104 advances the processing to step S109, and upon an effect operation being performed by the user so as to select one of effect images displayed on the three screens respectively, subjects an image at present before effect processing to effect processing according to the parameter corresponding to the selected effect image thereof. Subsequently, the control and computing unit 104 displays this image after the effect processing on the first sub display panel SD1.

Subsequently, the control and computing unit 104 determines whether or not a determination instruction for determining the above effect processing has been input from the user as the processing in step S111, and in the event that no determination instruction has been input, returns the processing to step S106. That is to say, in this case, in steps S106 through S109, the image after the effect processing in step S110 becomes a new image at the present before the effect processing.

Upon the determination instruction for the effect processing being input from the user in step S111, the control and computing unit 104 advances the processing to step S112, and stores the image after the effect processing in step S110.

Upon storage processing in step S112 being completed, the control and computing unit 104 ends the processing of this flowchart in step S113.

Processing Flow of Eighth Operation Control

Figure 59:
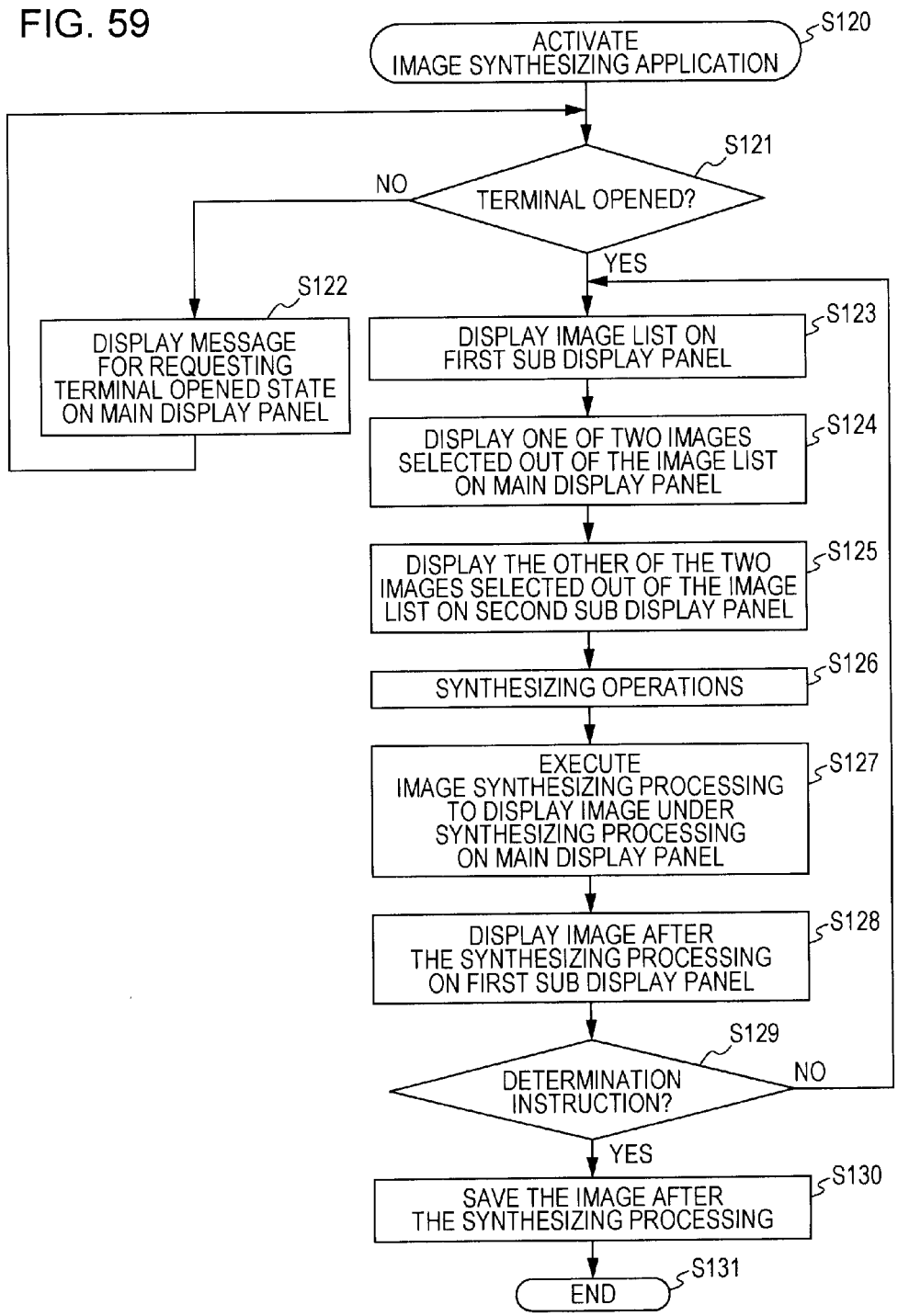
FIG. 59 is a flowchart illustrating a flow of processing at the time of the personal digital assistant executing an application program for realizing eighth operation control, and specifically illustrating a flow of processing from activation to end of an image synthesizing application program.

FIG. 59 illustrates a processing flow at the time of execution of an application program for realizing the above eighth operation control.

In FIG. 59, upon the operation mode of the personal digital assistant 1 according to the present embodiment being set to an image synthesizing mode, for example, by the instruction from the user, the control and computing unit 104 activates an image synthesizing application program in step S120.

Upon the image synthesizing application program being activated, the control and computing unit 104 determines whether the state of the terminal is either the terminal closed state or the terminal opened state, based on the detection output of the terminal state detection sensor as the processing in step S121. Subsequently, in the event that determination is made in step S121 that the state of the terminal is the terminal closed state, the control and computing unit 104 advances the processing to step S122.

Upon proceeding to the processing in step S122, the control and computing unit 104 displays, for example, a message for requesting to change the state of the terminal to the terminal opened state on the main display panel MD in the terminal closed state, and returns the processing to step S121.

In the event that determination is made in the determination in step S121 that the state of the terminal is the terminal opened state, the control and computing unit 104 advances the processing to step S123.

Upon proceeding to the processing in step S123, the control and computing unit 104 displays a list of internally stored images on the first sub display panel SD1. Also, the control and computing unit 104 at this time may display a message for requesting to select two desired images to be subjected to synthesizing processing from the image list, on the first sub display panel SD1 or the other two display panels.

Next, upon two images being selected out of the image list displayed on the first sub display panel SD1 by the user, the control and computing unit 104 displays one image of the selected two images on the main display panel MD as a synthesizing candidate as the processing in step S124. Also, the control and computing unit 104 at this time displays the other image of the selected two images on the second sub display panel SD2 as a synthesizing candidate as the processing in step S125.

Next, the control and computing unit 104 awaits that a synthesizing operation such as instructing start of image synthesizing processing has been input from the user, and advances the processing to step S127 where this synthesizing processing is performed. Note that, as for the synthesizing operation at this time, an operation can be exemplified such that the terminal 1 is changed from the terminal opened state to the terminal closed state, for example.

Upon proceeding to the processing in step S127, the control and computing unit 104 displays, as described above, a video representing that the synthesizing processing is being executed on the main display panel MD in the terminal closed state, for example.

Subsequently, upon the state of the terminal being returned to the terminal opened state from the terminal closed state, the control and computing unit 104 displays the image after this synthesizing processing on the first sub display panel SD1 as the processing in step S128. Note that, with regard to the synthesizing amount at the synthesizing processing, only a half may be synthesized respectively, or the user may determine desired synthesizing amount beforehand respectively, or the terminal itself may determine the synthesizing amount based on a predetermined rule, or may randomly change the synthesizing amount.

Subsequently, the control and computing unit 104 determines whether or not a determination instruction for determining the synthesizing processing has been input from the user as the processing in step S129, and in the event that the determination instruction has not been input, returns the processing to step S123.

Upon the determination instruction for the synthesizing processing being input from the user in step S129, the control and computing unit 104 advances the processing to step S130, and stores the image after the synthesizing processing in step S128.

Upon the storage processing in step S130 being completed, the control and computing unit 104 ends the processing of this flowchart in step S131.

Processing Flow of Ninth Operation Control

Figure 60:
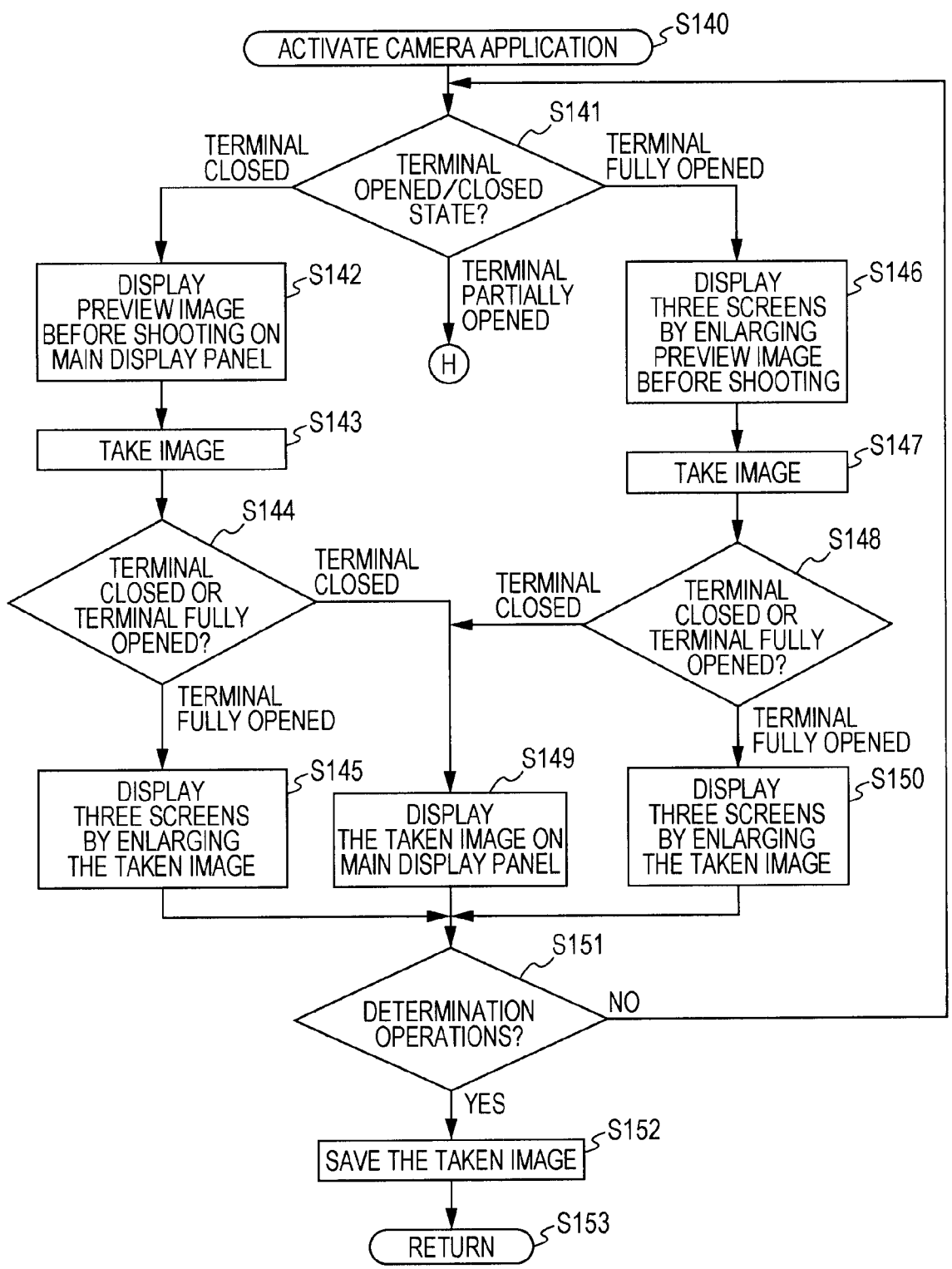
FIG. 60 is a flowchart illustrating a flow of processing at the time of the personal digital assistant executing an application program for realizing ninth operation control, and specifically illustrating a flow of a processing portion from shooting to saving at the time of a terminal opened state and a terminal closed state after activation of a camera application program.
Figure 61:
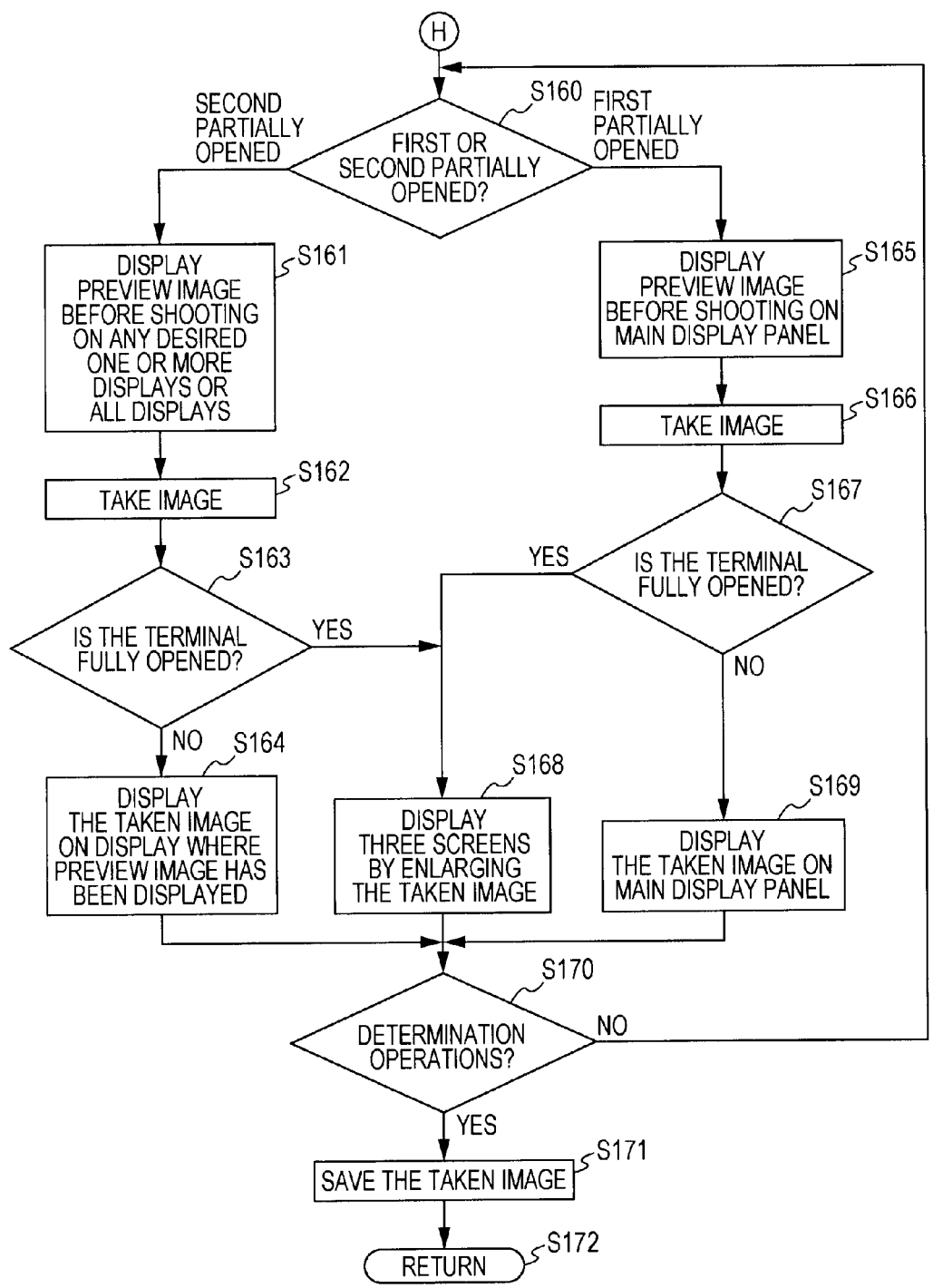
FIG. 61 is a flowchart illustrating a flow of processing at the time of the personal digital assistant executing an application program for realizing the ninth operation control, and specifically illustrating a flow of a processing portion from shooting to saving at the time of a terminal partially opened state after activation of the camera application program.

FIGS. 60 and 61 illustrate a processing flow at the time of execution of an application program for realizing the above ninth operation control.

First, in FIG. 60, upon the operation mode of the personal digital assistant 1 according to the present embodiment being set to a camera shooting mode, for example, by the instruction from the user, the control and computing unit 104 activates a camera application program in step S140.

Upon the camera application program being activated, the control and computing unit 104 determines whether the state of the terminal is either the terminal closed state or the terminal opened state, based on the detection output of the terminal state detection sensor as the processing in step S141.

Subsequently, in the event that determination is made in step S141 that the state of the terminal is the terminal closed state, the control and computing unit 104 advances the processing to step S142.

Upon proceeding to the processing in step S142, the control and computing unit 104 displays a preview image at the time of camera shooting on the main display panel MD in the terminal closed state.

Subsequently, in the event that the release button 7S has been pressed by the user in step S143, the control and computing unit 104 executes shooting processing by the camera.

Next, the control and computing unit 104 determines whether the state of the terminal is either the terminal closed state or the terminal fully opened state, based on the detection output of the terminal state detection sensor as the processing in step S144.

In the event that determination is made in step S144 that the state of the terminal is the terminal fully opened state, the control and computing unit 104 advances the processing to step S145, and enlarges and displays the shot image on the three screens as described above. Subsequently, the control and computing unit 104 advances the processing to step S151.

Also, in the event that determination is made in step S144 that the state of the terminal is the terminal closed state, the control and computing unit 104 advances the processing to step S149, and displays the shot image on the main display panel MD. Subsequently, the control and computing unit 104 advances the processing to step S151.

On the other hand, in the event that determination is made in step S141 that the state of the terminal is the terminal fully opened state, the control and computing unit 104 advances the processing to step S146.

Upon proceeding to the processing in step S146, the control and computing unit 104 enlarges and displays a preview image at the time of camera shooting on the three screens at the time of the terminal fully opened state.

Subsequently, in the event that one of the pressing keys K serving as the release button has been pressed by the user in step S147, the control and computing unit 104 executes shooting processing by the camera.

Next, the control and computing unit 104 determines whether the state of the terminal is either the terminal closed state or the terminal fully opened state, based on the detection output of the terminal state detection sensor, as the processing in step S148.

In the event that determination is made in step S148 that the state of the terminal is the terminal fully opened state, the control and computing unit 104 advances the processing to step S150, and displays the shot image on the three screens. Subsequently, the control and computing unit 104 advances the processing to step S151.

Also, in the event that determination is made in step S148 that the state of the terminal is the terminal closed state, the control and computing unit 104 advances the processing to step S149, and displays the shot image on the main display panel MD. Subsequently, the control and computing unit 104 advances the processing to step S151.

Upon proceeding to the processing in step S151, the control and computing unit 104 determines whether or not the determination instruction for determining whether to store the shot image has been input form the user, and in the event that no determination instruction has been input, returns the processing to step S141.

Upon the storage determination instruction being input from the user in step S151, the control and computing unit 104 advances the processing to step S152, and stores the shot image.

Upon the storage processing in step S152 being completed, the control and computing unit 104 returns the processing to the beginning.

On the other hand, in the event that determination is made in step S141 that the state of the terminal is the partially opened state, the control and computing unit 104 advances the processing to step S160 in FIG. 61.

Upon proceeding to the processing in step S160, the control and computing unit 104 determines whether this terminal partially opened state is either the first partially opened state or the second partially opened state.

In the event that determination is made in step S160 that the state of the terminal is the first partially opened state, the control and computing unit 104 enlarges and displays a preview image at the time of the camera shooting on the main display panel MD as the processing in step S165.

Subsequently, in the event that one of the pressing keys K serving as the release button has been pressed by the user in step S166, the control and computing unit 104 executes the shooting processing by the camera.

Next, the control and computing unit 104 determines whether the state of the terminal is either the terminal closed state or the terminal fully opened state, based on the detection output of the terminal state detection sensor, as the processing in step S167.

In the event that determination is made in step S167 that the state of the terminal is the terminal fully opened state, the control and computing unit 104 advances the processing to step S168, and displays the shot image on the three screens. Subsequently, the control and computing unit 104 advances the processing to step S170.

Also, in the event that determination is made in step S167 that the state of the terminal is the terminal closed state, the control and computing unit 104 advances the processing to step S169, and displays the shot image on the main display panel MD. Subsequently, the control and computing unit 104 advances the processing to step S170.

On the other hand, in the event that determination is made in step S160 that the state of the terminal is the second partially opened state, the control and computing unit 104 displays a preview image at the time of the camera shooting on one or more display panel or all of the display panels which the user desires of the three display panels, as the processing in step S161.

Subsequently, in the event that one of the pressing keys K serving as the release button has been pressed by the user in step S162, the control and computing unit 104 executes the shooting processing by the camera.

Next, the control and computing unit 104 determines whether the state of the terminal is either the terminal closed state or the terminal fully opened state, based on the detection output of the terminal state detection sensor, as the processing in step S163.

In the event that determination is made in step S163 that the state of the terminal is the terminal fully opened state, the control and computing unit 104 advances the processing to step S168, and displays the shot image on the three screens. Subsequently, the control and computing unit 104 advances the processing to step S170.

Also, in the event that determination is made in step S163 that the state of the terminal is the terminal closed state, the control and computing unit 104 advances the processing to step S164, and displays the shot image on the display panel where the preview image has been displayed. Subsequently, the control and computing unit 104 advances the processing to step S170.

Upon proceeding to the processing in step S170, the control and computing unit 104 determines whether or not the determination instruction for determining whether to store the shot image has been input from the user, and in the event that no determination instruction has been input, returns to the processing in step S160.

In the event that the storage determination instruction has been input from the user in step S170, the control and computing unit 104 advances the processing to step S171, and stores the shot image.

Upon the storage processing in step S171 being completed, the control and computing unit 104 returns the processing to the beginning in step S172.

Processing Flow of Twelfth Operation Control

Figure 62:
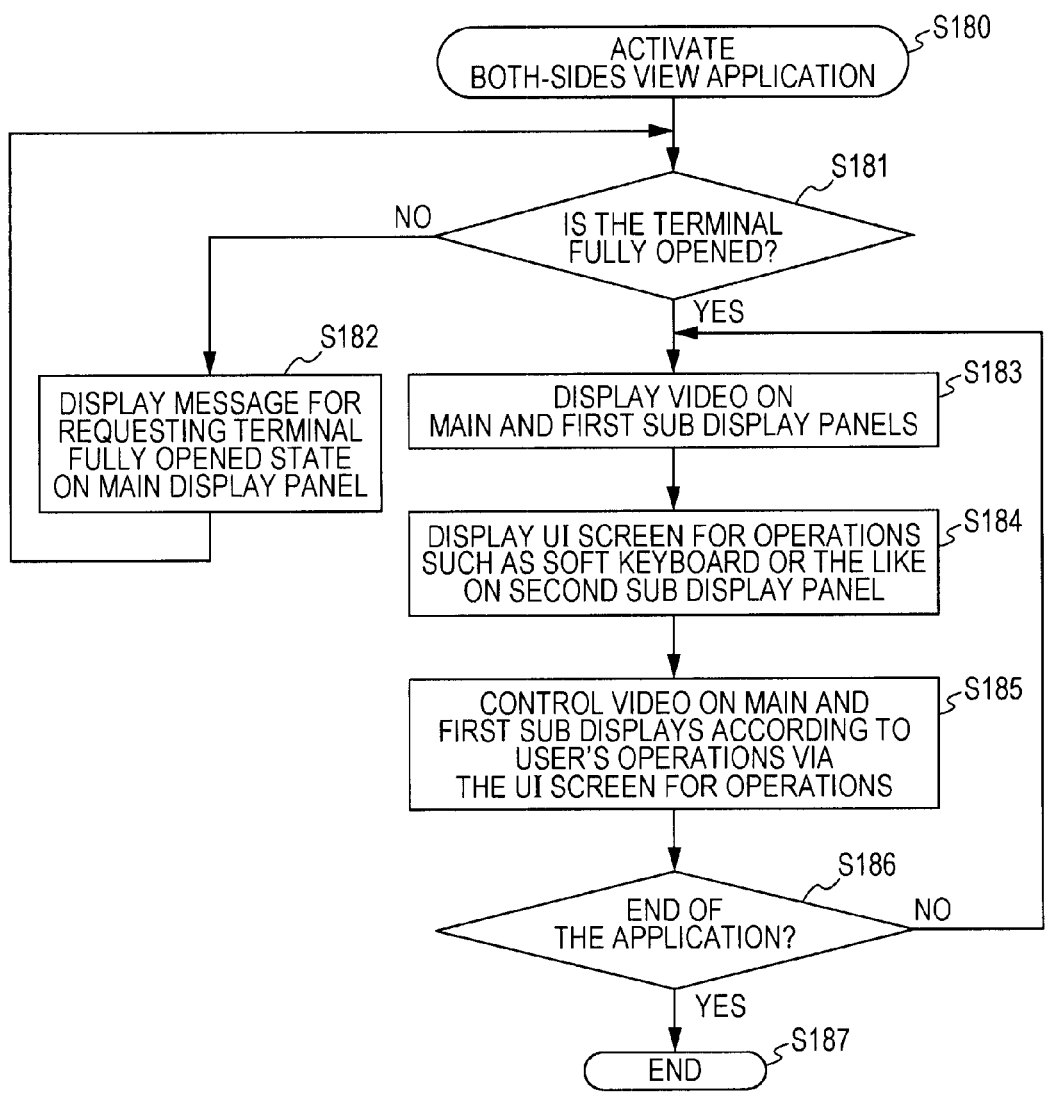
FIG. 62 is a flowchart illustrating a flow of processing at the time of the personal digital assistant executing an application program for realizing twelfth operation control, and specifically illustrating a flow of processing at the time of execution of a both-side view application program.

FIG. 62 illustrates a processing flow at the time of execution of a both-side viewer application program for realizing the above twelfth operation control.

In FIG. 62, upon the operation mode of the personal digital assistant 1 according to the present embodiment being set to a both-side viewer mode that allows both of the user and the partner to view a video, for example, by the instruction from the user as illustrated in FIG. 28, the control and computing unit 104 activates the both-side viewer application program in step S180.

Upon the both-side viewer application program being activated, the control and computing unit 104 determines whether the state of the terminal is either the terminal closed state or the terminal opened state, based on the detection output of the terminal state detection sensor, as the processing in step S181.

Subsequently, in the event that determination is made in step S181 that the state of the terminal is the terminal closed state, the control and computing unit 104 advances the processing to step S182.

Upon proceeding to the processing in step S182, the control and computing unit 104 displays, for example, a message for requesting to change the state of the terminal to the terminal opened state on the main display panel MD in the terminal closed state, and returns the processing to step S181.

In the event that determination is made in the determination in step S181 that the state of the terminal is the terminal opened state, the control and computing unit 104 advances the processing to step S183.

Upon proceeding to the processing in step S183, the control and computing unit 104 displays the video of a document for the partner on the main display panel MD, and displays the video of a document for the user on the first sub display panel SD1.

Also, the control and computing unit 104 displays a user interface screen for operations such as the software keyboard or the like on the second display panel SD2 as the processing in step S184.

Subsequently, upon operation input being performed from the user via the user interface screen for operations, the control and computing unit 104 controls display of the main display panel MD and the first sub display panel SD1 according to the user's operations thereof as the processing in step S185.

Subsequently, the control and computing unit 104 determines whether or not an end instruction for this application program has been input from the user, and in the event that no end instruction has been input, returns the processing to step S183, and in the event that the end instruction has been input, ends this application program as step S187.

Processing Flow of Thirteenth Operation Control

FIG. 63 illustrates a processing flow at the time of execution of a book-style application program for realizing the above thirteenth operation control.

In FIG. 63, upon the operation mode of the personal digital assistant 1 according to the present embodiment being set to a book style mode used for a book style like the above thirteenth operation control example, for example, in accordance with the instruction from the user, the control and computing unit 104 activates the book-style application program in step S190.

Upon the book-style application program being activated, the control and computing unit 104 determines whether the state of the terminal is either the terminal fully opened state or the partially opened state, based on the detection output of the terminal state detection sensor, as the processing in step S191.

Subsequently, in the event that determination is made in step S191 that the state of the terminal is the terminal closed state, the control and computing unit 104 advances the processing to step S193, and on the other hand, in the event of determining that the state of the terminal is the terminal fully opened state, advances the processing to step S198 and thereafter, and in the event of determining that the state of the terminal is the partially opened state, advances the processing to step S192.

Upon determining that the state of the terminal is the terminal partially opened state, and proceeding to step S192, the control and computing unit 104 determines whether this terminal partially opened state is either the first partially opened state or second partially opened state, and when the terminal partially opened state is the first partially opened state, advances the processing to step S193, and when the terminal partially opened state is the second partially opened state, advances the processing to step S194 and thereafter.

Upon proceeding to the processing in step S193, the control and computing unit 104 displays a message for requesting to change the state of the terminal to the second partially opened state in which the first sub display panel SD1 and the second sub display panel SD2 are opened, on the main display panel MD, and then returns the processing to step S191.

Also, upon proceeding to the processing in step S194, the control and computing unit 104 displays a right page of a book on the first sub display panel SD1.

Also, the control and computing unit 104 at this time displays the left page of the book on the second sub display panel SD2.

Subsequently, the control and computing unit 104 determines whether a page turning operation has been input from the user, for example, via an operation for the touch sensor panel on the first and second sub display panels as the processing in step S196, and in the event that page turning operation input has been performed, advances the processing to step S197, and in the event that no turning operation input has been performed, advances the processing to step S203.

In the event that determination is made in step S196 that the page turning operation input has been performed, in step S197 the control and computing unit 104 executes page turning operation according to this page turning operation input to display each page after the page turning thereof on the first and second sub display panels SD1 and SD2. After the processing in step S197, the control and computing unit 104 returns the processing to step S194.

Also, upon proceeding to the processing in step S198, the control and computing unit 104 displays a right page of the book on the first sub display panel SD1.

Also, the control and computing unit 104 at this time displays the left page of the book on the second sub display panel SD2 as the processing in step S199.

Further, the control and computing unit 104 displays, for example, advertising information on the main display panel MD as the processing in step S200.

Subsequently, the control and computing unit 104 determines whether a page turning operation has been input from the user, for example, via an operation for the touch sensor panel on the first and second sub display panels as the processing in step S201, and in the event that page turning operation input has been performed, advances the processing to step S202, and in the event that no turning operation input has been performed, advances the processing to step S203.

In the event that determination is made in step S201 that the page turning operation input has been performed, in step S202 the control and computing unit 104 executes page turning operation according to this page turning operation input to display each page after the page turning thereof on the first and second sub display panels SD1 and SD2. After the processing in step S202, the control and computing unit 104 returns the processing to step S198.

Note that, in the event that selection of advertising information or the like displayed on the main display panel MD has been performed by the user, the control and computing unit 104 executes connection processing as to the Internet or the like to display a website and so forth linked to this advertising information.

Upon proceeding to the processing in step S203, the control and computing unit 104 determines whether or not an end instruction for this application program has been input from the user, and while this end instruction is not input, returns the processing to step S191, and when this end instruction is input, ends this application program as step S204.

Comparison Between Personal Digital Assistant According to Present Embodiment and Another-type Terminal FIG. 64 illustrates a list for comparing each effect realized by the three-screen folding-type personal digital assistant 1 and three-screen slide-type personal digital assistant 71 according to the present embodiment, and a realizable effect or unrealizable effect by various types of personal digital assistants of other formats. Note that, in FIG. 64, a the symbols "Y" represent where the effect of the corresponding item is realizable, the symbols "N" and the hyphens represent where the effect of the corresponding item is not realizable, and the symbol "P" represents that the effect of the corresponding item is partially realizable, albeit imperfectly.

With the list illustrated in FIG. 64, an effect item E1 indicates that the personal digital assistant is available as a large screen. Specifically, in the event that large screen use is available, the personal digital assistant can perform eye-friendly display of books, photos, moving images, for example, and also easily viewable videos can be realized to aid those with poor eyesight. Also, with a personal digital assistant capable of large screen use, for example, fine characters of a book, multiple windows as a multi-window, or the like are displayed, whereby information amount to be displayed at a time can be increased, and character input can also be readily performed. Also, the personal digital assistant capable of large screen use allows multiple persons to view photos, moving images, presentation documents, or the like, and in addition, enables a software keyboard or the like to be displayed.

An effect item E2 in FIG. 64 indicates that an easily portable compact size can be realized as the projection size of the terminal. That is to say, with a personal digital assistant of which the terminal projection size is compact, for example, at the time of shooting being performed using the mounted camera, the user is allowed to take an image by holding this terminal in his/her hand in a natural manner. Also, for example, with this personal digital assistant in which a noncontact communication function has been loaded, the user is allowed to hold this personal digital assistant in his/her hand in a natural manner to bring this near a noncontact reader/writer. Also, in the event that this personal digital assistant is a cellular phone as well, similarly, the user can perform a phone call by holding this personal digital assistant in a naturally held manner.

An effect item E3 indicates that display using at least one screen can be performed even in the terminal closed state in which the projection size is compact. That is to say, a personal digital assistant whereby one screen can be used even in the terminal closed state facilitates the user to operate this personal digital assistant in one hand. Therefore, the user can operate this personal digital assistant even in a state holding an umbrella or baggage, or hanging on a strap of a train.

An effect item E4 indicates that display with an aspect ratio being maintained can be performed in either the terminal closed state or the terminal opened state. In this way, a personal digital assistant whereby an aspect ratio can be maintained in the terminal closed state and terminal opened state enables the same information to be displayed both in the terminal closed state and in the terminal opened state. Also, with the personal digital assistant in this case, user interfaces are generally integrated between both in the terminal closed state and in the terminal opened state, which is easy to use for the user. Also, like the personal digital assistant according to the present embodiment, in the event that one-screen display is performed in the terminal closed state, and three-screen display is performed in the terminal opened state, the same information as with the terminal closed state can be displayed with a size of 1.78 times thereof in the terminal opened state.

An effect item E5 indicates that each effect from the effect items E1 through E4 can be realized with a casing of compact thickness.

An effect item E6 indicates that transition between the terminal closed state and the terminal opened state can be realized by a simple operation.

An effect item E7 indicates that the user can view one screen or more constantly including during transition between the terminal closed state and the terminal opened state.

An effect item E8 indicates that the size of the display surface as to the principal surface of the terminal can sufficiently be secured, and the frame portion can be narrowed maximally.

An effect item E9 indicates that when the personal digital assistant is used in the terminal closed state, display panels other than a display panel externally exposed are protected.

An effect item E10 indicates that a generally flat large screen is formed with each display panel surface in the terminal opened state.

An effect item E11 indicates that a mode peculiar to the three-screen folding-type personal digital assistant 1 according to the present embodiment is available. Specifically, the personal digital assistant 1 according to the present embodiment can realize, for example, what we might call a digital folding screen style wherein a video is displayed on each of the three screens, in the terminal opened state. Also, the personal digital assistant 1 according to the present embodiment can realize a public view style wherein the three screens can stand alone in the terminal opened state, and large screen display is performed using the stand-alone three screens in this terminal opened state. Also, the personal digital assistant 1 according to the present embodiment can realize what we might call a self-portrait style, for example, by using the above first partially opened state or the like at the time of camera shooting. Also, the personal digital assistant 1 according to the present embodiment can realize a book style, for example, such that double pages of a book are displayed on the two sub display panels at the time of the second partially opened state. Also, the personal digital assistant 1 according to the present embodiment can realize a both-side view style such that a document for himself/herself is displayed on the first sub display panel SD1, a document for the partner is displayed on the main display panel MD, and then, the user interface screen for operations is displayed on the second sub display panel SD2. Also, the personal digital assistant 1 according to the present embodiment can realize a before-and-after and upper-and-lower limit display style such that an intermediate value image of the effect processing is displayed on the first sub display panel SD1, and the maximum value image or minimum value image is displayed on the second sub display panel SD2 and main display panel MD. Further, the personal digital assistant 1 according to the present embodiment can realize a desktop keyboard style such that a moving image or the like is displayed on the main display panel MD, the user communication screen is displayed on the first sub display panel SD1, and the user interface screen for operations is displayed on the second sub display panel SD2.

As can be understood from the list in FIG. 64, with the personal digital assistant 1 according to the present embodiment, the corresponding effect can be realized regarding all of the items from the effect items E1 through E11.

Note that, with the three-screen slide-type personal digital assistant 71 according to the present embodiment, the effect item E5 is realizable to some extent, and on the other hand, the effect item E11 includes some unrealizable portions, but other effect items are generally realizable.

On the other hand, no personal digital assistants of other forms can realize all of the corresponding effects of the effect items E1 through E11, particularly like the personal digital assistant 1 according to the present embodiment can.

For example, with a three-screen double-door terminal of which the three casings each include a display panel, and the two casings disposed from side to side are opened/closed such as what we might call double doors as to the central casing, the effect items E3 through E7, and the effect item E10 are unrealizable, and the effect item E11 is realizable albeit imperfectly.

Hereafter, similarly, with a three-screen inverse-double-door terminal which opens/closes in the reverse direction as to the above double-door terminal, the effect items E6, E9, and E10 are unrealizable, and also the effect items E5 and E11 are realizable albeit imperfectly.

For example, with a 9.7-inch touch panel terminal made up of one casing having a 9.7-inch large display panel, the effect items E2 through E7, E9, and E11 are unrealizable.

For example, with a 3.5-inch touch panel terminal made up of one casing having a 3.5-inch small display panel, the effect items E1, E4 through E7, E9, and E11 are unrealizable.

With a two-screen folding terminal of which the two casings each have a display panel, which closes these display panels so as to face to each other, the effect items E3 through E5, and E7 are unrealizable, and the effect item E11 is also realizable albeit imperfectly.

For example, with a two-screen slide terminal wherein the two casings each include a display panel, and each casing is slid generally in parallel as to the corresponding principal surface, the effect items E4, E5, and E11 are unrealizable. Particularly, with regard to the effect item E4, in the event of enlarging and displaying an image of an aspect ratio of 16:9, this two-screen slide terminal enlarges the image only 1.1 times of the case of one screen even using the two screens.

For example, with a four-screen folding terminal wherein the four screens each have a display panel, for example, the long sides of two casings are connected so as to be turned, similarly the long sides of the other two casings are connected so as to be turned, and one short sides of the two sets of the casings are connected so as to be turned, the effect items E5, E6, E8, and E9 are unrealizable, and the effect items E10 and E11 are also realizable albeit imperfectly.

For example, with a two-screen slide three-screen folding terminal wherein the four screens each have a display panel, two casings can be slid generally in parallel as to the corresponding principal surface, the long sides of the other two casings are connected so as to be turned, and one short sides of the two sets of the casings are connected so as to be turned, the effect items E5, E6, and E8 are unrealizable, and the effect items E10 and E11 are also realizable albeit imperfectly.

For example, with a four-screen slide terminal wherein the four screens each have a display panel, two casings can be slid generally in parallel as to the corresponding principal surface, the other two casings can be slid generally in parallel as to the corresponding principal surface, and further the two sets of the casings thereof can be slid generally in parallel as to the corresponding principal surface, the effect items E5, E6, E8, and E11 are unrealizable, and the effect items E10 is also realizable albeit imperfectly.

Conclusion

As described above, with the three-screen folding-type personal digital assistant 1 and three-screen slide-type personal digital assistant 71 according to the present embodiment, the first casing through third casing can be unfolded and folded, a compact size can be realized at the time of being folded, a large screen according to the three screens can be realized at the time of being unfolded, the aspect ratio of a screen can generally maintained even at the time of the terminal opened/closed state, and further, the display screen can be changed, enlarged, or reduced in accordance with the terminal being opened/closed. Particularly, with the personal digital assistant 1 according to the present embodiment, all of the effect items E1 through E11 as listed in FIG. 64 are realizable.

Specifically, with the three-screen folding-type personal digital assistant 1 and three-screen slide-type personal digital assistant 71 according to the present embodiment, a great number of information can be displayed, or enlarged and displayed using multiple screens, optimal display can be performed as to various contents while satisfying the user's various applications, and opening/closing of screens can be realized by a simple operation. Further, with the personal digital assistant according to the present embodiment, those can be realized with low cost without providing a complicated mechanism.

Note that description of the above embodiment is an example of the present disclosure. Therefore, the present disclosure is not restricted to the above embodiment, and it goes without saying that various modifications can be made according to design or the like without departing from the scope of the technical idea according to the present disclosure.

With the above embodiment, an example has been exemplified wherein the three casings can be opened or closed such as a folding screen, but the present disclosure may be applied to a terminal which can be unfolded or folded such as a folding screen by connecting an odd number of casings such as five casings, seven casings, or the like so as to be each turned in the same way as described above.

It should be understood by those skilled in the art that various modifications, combinations, sub-combinations and alterations may occur depending on design requirements and other factors insofar as they are within the scope of the appended claims or the equivalents thereof.

What is claimed is:
1. An information processing device comprising:
a plurality of rectangular-shaped casings including a first rectangular-shaped casing, a second rectangular-shaped casing and a third-rectangular shaped casing, which are disposed in sequential order and each include
a first principal surface, and
a second principal surface opposing the first principal surface and including a display panel having a predetermined aspect ratio;
a connecting portion connecting each of the plurality of rectangular-shaped casings in a closed state in which each of the plurality of rectangular-shaped casings are mutually overlaid and a display panel of at least one of the plurality of rectangular-shaped casings is externally exposed, and in an open state in which wall portions of mutually adjacent rectangular-shaped casings abut and the display panels of each of the plurality of rectangular-shaped casings face a substantially similar direction; and circuitry configured to
   detect the closed state and the opened state; and
   control display of each of the display panels, wherein
the display panel of the first rectangular-shaped casing is externally exposed in the closed state,
the display panels of each of the first rectangular-shaped casing, second rectangular-shaped casing and third rectangular-shaped casing face the substantially similar direction in the open state, and
the circuitry is configured to
   control displaying a first map image corresponding to a central geographic location on the display panel of the first rectangular-shaped casing in the closed state; and
   control displaying the first map image corresponding to the central geographic location on the display panel of the second rectangular-shaped casing in the open state.

2. The information processing device of claim 1, wherein the connecting portion is configured to rotatably connect each of the plurality of rectangular-shaped casings.

3. The information processing device of claim 1, wherein the connecting portion is configured to slidably connect each of the plurality of rectangular-shaped casings.

4. The information processing device of claim 1, wherein an aspect ratio obtained by adding each of the plurality display panels in the open state matches the predetermined aspect ratio.

5. The information processing device of claim 1, wherein the circuitry is configured to control displaying an image on the display panel of the at least one of the plurality of rectangular-shaped casings that is externally exposed in the closed state.

6. The information processing device of claim 5, wherein the circuitry is configured to control dividing, enlarging and displaying the image across the plurality of the display panels of each of the plurality of rectangular-shaped casings in the open state.

7. The information processing device of claim 1, wherein the circuitry is configured to control displaying second and third map images each corresponding to geographic locations adjacent to the central geographic location on the display panels of the first and third rectangular-shaped casings in the open state.

8. The information processing device of claim 1, wherein the circuitry is configured to control displaying the first map image corresponding to the central geographic location on the display panel of the first rectangular-shaped casing, displaying a photographic aerial view of the central geographic location of on the display panel of the second rectangular-shaped casing, and displaying a photographic street-level view corresponding to the central geographic location of on the display panel of the third rectangular-shaped casing in the open state.

9. The information processing device of claim 1, wherein the circuitry is configured to control displaying an image on the display panel of the third rectangular-shaped casing in the open state.

10. The information processing device of claim 9, wherein the first principal surface of the third rectangular-shaped casing includes a protruding shape that causes the display panel of the third rectangular-shaped casing to be disposed at an angle relative to the display panels of the first and second rectangular-shaped casings when the information processing device is placed on a flat surface.

11. The information processing device of claim 9, wherein the circuitry is configured to display a first user interface on the display panel of the first rectangular-shaped casing and a second user interface on the display panel of the first rectangular-shaped casing in the open state.

12. The information processing device of claim 11, wherein the first user interface corresponds to a communication application executed at the information processing device.

13. The information processing device of claim 11, wherein the second user interface corresponds to a graphical user interface for receiving input commands.

14. An information processing device comprising:
a plurality of rectangular-shaped casings including a first rectangular-shaped casing, a second rectangular-shaped casing and a third-rectangular shaped casing, which are disposed in sequential order and each include
   a first principal surface, and
   a second principal surface opposing the first principal surface and including a display panel of a predetermined aspect ratio;
means for connecting each of the plurality of rectangular-shaped casings in a closed state in which each of the plurality of rectangular-shaped casings are mutually overlaid and a display panel of at least one of the plurality of rectangular-shaped casings is externally exposed, and in an open state in which wall portions of mutually adjacent rectangular-shaped casings abut and the display panels of each of the plurality of rectangular-shaped casings face a substantially same direction;
means for detecting the closed state and the opened state;
means for controlling display of each of the display panels, wherein
the display panel of the first rectangular-shaped casing is externally exposed in the closed state,
the display panels of each of the first rectangular-shaped casing, second rectangular-shaped casing and third rectangular-shaped casing face the substantially similar direction in the open state, and
means for controlling displaying a first map image corresponding to a central geographic location on the display panel of the first rectangular-shaped casing in the closed state; and
means for controlling displaying the first map image corresponding to the central geographic location on the display panel of the second rectangular-shaped casing in the open state.

15. An information processing device comprising:
a plurality of rectangular-shaped casings including a first rectangular-shaped casing, a second rectangular-shaped casing and a third-rectangular shaped casing, which are disposed in sequential order and each include
   a first principal surface, and
   a second principal surface opposing the first principal surface and including a display panel having a predetermined aspect ratio;
a connecting portion connecting each of the plurality of rectangular-shaped casings in a closed state in which each of the plurality of rectangular-shaped casings are mutually overlaid and a display panel of at least one of the plurality of rectangular-shaped casings is externally exposed, and in an open state in which wall portions of mutually adjacent rectangular-shaped casings abut and the display panels of each of the plurality of rectangular-shaped casings face a substantially similar direction; and
circuitry configured to
   detect the closed state and the opened state; and control display of each of the display panels, wherein
the display panel of the first rectangular-shaped casing is externally exposed in the closed state,
the display panels of each of the first rectangular-shaped casing, second rectangular-shaped casing and third rectangular-shaped casing face the substantially similar direction in the open state, and
the circuitry is configured to
control displaying a first map image corresponding to a geographic location on the display panel of the first rectangular-shaped casing in the closed state; and
control displaying an enlarged version of the first map image corresponding to the geographic location across the display panels of the first, second and third rectangular-shaped casings in the open state.

* * * * *